(12) United States Patent
Lieb et al.

(10) Patent No.: US 10,476,827 B2
(45) Date of Patent: Nov. 12, 2019

(54) SHARING IMAGES AND IMAGE ALBUMS OVER A COMMUNICATION NETWORK

(71) Applicant: Google Inc., Mountain View, CA (US)

(72) Inventors: David Lieb, San Francisco, CA (US); James Gallagher, Sunnyvale, CA (US); Kedar Jayant Kanitkar, Mountain View, CA (US); Teresa Ko, Los Angeles, CA (US); Loren Puchalla Fiore, Saratoga, CA (US); Jason Chang, Mountain View, CA (US); Nan Wang, Mountain View, CA (US); Jingyu Cui, Milpitas, CA (US); Shengyang Dai, Mountain View, CA (US)

(73) Assignee: Google LLC, Mountain View, CA (US)

( * ) Notice: Subject to any disclaimer, the term of this patent is extended or adjusted under 35 U.S.C. 154(b) by 114 days.

(21) Appl. No.: 15/277,927

(22) Filed: Sep. 27, 2016

(65) Prior Publication Data

US 2017/0093780 A1    Mar. 30, 2017

Related U.S. Application Data

(60) Provisional application No. 62/234,009, filed on Sep. 28, 2015.

(51) Int. Cl.
*H04L 12/58* (2006.01)
*G06F 16/58* (2019.01)
(Continued)

(52) U.S. Cl.
CPC ............. *H04L 51/18* (2013.01); *G06F 16/50* (2019.01); *G06F 16/58* (2019.01); *G06T 3/40* (2013.01); *H04L 67/22* (2013.01)

(58) Field of Classification Search
CPC ......... G06F 17/30244; G06F 17/30265; G06F 17/30247; G06F 17/3025; G06F 17/30253;
(Continued)

(56) References Cited

U.S. PATENT DOCUMENTS

D451,536 S     12/2001   Cornille et al.
6,421,358 B1    7/2002   Stimmel et al.
(Continued)

FOREIGN PATENT DOCUMENTS

CN    101167066    4/2008
CN    102265649   11/2011
(Continued)

OTHER PUBLICATIONS

Chandramouli, et al., "Semantic Structuring and Retrieval of Event Chapters in Social Photo Collections," Proceedings of the International Conference on Multimedia Information Retrieval, MIR, New York, New York, Jan. 1, 2010, pp. 507-515.
(Continued)

*Primary Examiner* — Greg C Bengzon
(74) *Attorney, Agent, or Firm* — IP Spring

(57) ABSTRACT

Implementations relate to sharing images and image albums over a communication network. In some implementations, a computer-implemented method includes determining that a shared album data structure is accessible by a device and includes references to album images. The device determines one or more suggested images from a collection of stored images associated with a user, based on determining sharing scores for the stored images. The sharing scores are based on comparing one or more characteristics of the stored images to one or more corresponding characteristics of the album images. The method includes causing display of the one or more suggested images by the device, receiving a selection
(Continued)

of at least one selected image of the suggested images based on received user input, and causing an update of the shared album data structure with the at least one selected image to be accessible over a communication network by recipient users.

18 Claims, 14 Drawing Sheets

(51) Int. Cl.
    *G06T 3/40*          (2006.01)
    *G06F 16/50*        (2019.01)
    *H04L 29/08*        (2006.01)

(58) Field of Classification Search
CPC ......... G06F 17/30256; G06F 17/30259; G06F 17/302562; G06F 17/30268; G06F 17/30271; G06F 17/30274; G06F 17/30277; G06F 17/3028; G06F 17/30283; G06F 17/30286; G06F 17/30312; G06F 17/30321; G06F 17/30908; G06F 17/30911; G06T 3/40; H04L 51/18; H04L 67/22; H04L 51/32; H04L 51/34; H04L 51/36; H04L 51/38; H04L 51/046; H04L 51/08; H04L 51/10; H04L 51/20; H04L 51/04; H04L 67/2819; G06Q 50/01; H04W 4/12; H04W 88/184; H04W 92/02; H04W 4/14; G06K 2009/00328; G06K 9/00677; G06K 9/00221; G06K 9/00684; H04M 1/72552; H04M 1/72555
See application file for complete search history.

(56) References Cited

U.S. PATENT DOCUMENTS

| | | |
|---|---|---|
| 6,557,041 B2 | 4/2003 | Mallart |
| 6,917,703 B1 | 7/2005 | Steffens et al. |
| 7,099,510 B2 | 8/2006 | Jones et al. |
| 7,512,829 B2 | 3/2009 | Mital et al. |
| 7,539,747 B2 | 5/2009 | Lucovsky et al. |
| 7,620,902 B2 | 11/2009 | Manion et al. |
| 7,668,405 B2 | 2/2010 | Gallagher |
| 7,804,426 B2 | 9/2010 | Etcheson |
| 7,812,998 B2 | 10/2010 | Miers |
| 7,844,482 B1 | 11/2010 | Larson |
| 7,849,481 B2 | 12/2010 | Moon et al. |
| 7,903,904 B1 | 3/2011 | Loeb et al. |
| 8,085,982 B1 | 12/2011 | Kim et al. |
| 8,194,940 B1 | 6/2012 | Kiyohara et al. |
| 8,270,684 B2 | 9/2012 | Kiyohara |
| 8,332,512 B1 | 12/2012 | Wu et al. |
| 8,358,811 B2 | 1/2013 | Adams et al. |
| 8,359,285 B1 | 1/2013 | Dicker et al. |
| 8,359,540 B2 | 1/2013 | Darling |
| 8,370,639 B2 | 2/2013 | Azar et al. |
| 8,380,039 B2 | 2/2013 | Luo et al. |
| 8,385,950 B1 | 2/2013 | Wagner |
| 8,412,773 B1 | 4/2013 | Chapweske et al. |
| D687,461 S | 8/2013 | Tyler et al. |
| 8,571,331 B2 | 10/2013 | Cifarelli |
| D696,266 S | 12/2013 | D'Amore et al. |
| 8,630,494 B1 | 1/2014 | Svendsen |
| 8,634,603 B2 | 1/2014 | Kiyohara et al. |
| 8,730,397 B1 | 5/2014 | Zhang |
| 8,761,523 B2 | 6/2014 | Cok et al. |
| 8,798,336 B2 | 8/2014 | Nechyba et al. |
| 8,914,483 B1 | 12/2014 | Dixon et al. |
| D729,846 S | 5/2015 | Lee |
| D730,381 S | 5/2015 | Zhong et al. |
| 9,122,645 B1 | 9/2015 | Amidon et al. |
| 9,195,912 B1 | 11/2015 | Huang et al. |
| D750,131 S | 2/2016 | Perez et al. |
| 9,311,310 B2 | 4/2016 | Ioffe et al. |
| D756,377 S | 5/2016 | Connolly et al. |
| D757,749 S | 5/2016 | Butcher |
| D757,790 S | 5/2016 | Ostrowski et al. |
| 9,391,792 B2 | 7/2016 | Yeskel et al. |
| 9,418,370 B2 | 8/2016 | Jackson et al. |
| 10,051,103 B1* | 8/2018 | Gordon .................. G06F 21/36 |
| 2003/0171930 A1 | 9/2003 | Junqua |
| 2003/0214128 A1 | 11/2003 | Roberts et al. |
| 2004/0073615 A1 | 4/2004 | Darling |
| 2004/0174434 A1 | 9/2004 | Walker et al. |
| 2005/0010470 A1 | 1/2005 | Marino |
| 2005/0105396 A1 | 5/2005 | Schybergson |
| 2005/0187943 A1 | 8/2005 | Finke-Anlauff et al. |
| 2006/0048059 A1 | 3/2006 | Etkin |
| 2006/0112080 A1 | 5/2006 | Chen et al. |
| 2006/0125930 A1 | 6/2006 | Mindrum et al. |
| 2006/0159007 A1 | 7/2006 | Frutiger et al. |
| 2007/0043583 A1 | 2/2007 | Davulcu et al. |
| 2007/0219949 A1 | 9/2007 | Mekikian |
| 2007/0250901 A1 | 10/2007 | McIntire et al. |
| 2007/0266047 A1 | 11/2007 | Cortes et al. |
| 2007/0294177 A1 | 12/2007 | Volk et al. |
| 2008/0005761 A1 | 1/2008 | Repasi et al. |
| 2008/0086511 A1 | 4/2008 | Takao |
| 2008/0114844 A1 | 5/2008 | Sanchez et al. |
| 2008/0133526 A1 | 6/2008 | Haitani et al. |
| 2008/0133697 A1 | 6/2008 | Stewart et al. |
| 2008/0136930 A1 | 6/2008 | Nagai |
| 2008/0144135 A1 | 6/2008 | Miers |
| 2008/0184139 A1 | 7/2008 | Stewart et al. |
| 2008/0186926 A1 | 8/2008 | Baio et al. |
| 2008/0201299 A1 | 8/2008 | Lehikoinen et al. |
| 2008/0209010 A1 | 8/2008 | Zitnick, III et al. |
| 2008/0301736 A1 | 12/2008 | Heilbron et al. |
| 2009/0070412 A1 | 3/2009 | D'Angelo et al. |
| 2009/0199093 A1 | 6/2009 | Chakravarty |
| 2009/0171873 A1 | 7/2009 | Dolin et al. |
| 2009/0191902 A1 | 7/2009 | Osborne |
| 2009/0234876 A1* | 9/2009 | Schigel ............ G06F 17/30873 |
| 2009/0248692 A1 | 10/2009 | Tsukagoshi et al. |
| 2009/0248703 A1 | 10/2009 | Tsukagoshi et al. |
| 2009/0276531 A1 | 11/2009 | Myka et al. |
| 2009/0279794 A1 | 11/2009 | Brucher et al. |
| 2009/0319472 A1 | 12/2009 | Jain et al. |
| 2010/0063961 A1 | 3/2010 | Guiheneuf et al. |
| 2010/0088336 A1 | 4/2010 | Johnston et al. |
| 2010/0124378 A1 | 5/2010 | Das et al. |
| 2010/0158315 A1 | 6/2010 | Martin |
| 2010/0169389 A1 | 7/2010 | Weber et al. |
| 2010/0198880 A1 | 8/2010 | Petersen |
| 2010/0223663 A1 | 9/2010 | Morimoto et al. |
| 2010/0232656 A1 | 9/2010 | Ryu |
| 2010/0241945 A1 | 9/2010 | Chen et al. |
| 2010/0262916 A1 | 10/2010 | Jones et al. |
| 2010/0315664 A1 | 12/2010 | Miers |
| 2010/0318611 A1 | 12/2010 | Curtin et al. |
| 2011/0066743 A1 | 3/2011 | Hurley et al. |
| 2011/0072035 A1 | 3/2011 | Gaucas et al. |
| 2011/0080424 A1 | 4/2011 | Peters et al. |
| 2011/0099199 A1 | 4/2011 | Stalenhoef et al. |
| 2011/0137709 A1 | 6/2011 | Mayer et al. |
| 2011/0138003 A1 | 6/2011 | Yoon et al. |
| 2011/0150324 A1 | 6/2011 | Ngan et al. |
| 2011/0161423 A1 | 6/2011 | Pratt et al. |
| 2011/0167136 A1 | 7/2011 | Naimark et al. |
| 2011/0197200 A1 | 8/2011 | Huang |
| 2011/0211737 A1 | 9/2011 | Krupka et al. |
| 2011/0238631 A1 | 9/2011 | Cortes et al. |
| 2011/0270923 A1 | 11/2011 | Jones et al. |
| 2011/0276513 A1 | 11/2011 | Erhart et al. |
| 2011/0295667 A1 | 12/2011 | Butler |
| 2011/0296536 A1 | 12/2011 | Muller et al. |
| 2012/0007995 A1 | 1/2012 | Barrett |
| 2012/0016948 A1 | 1/2012 | Sinha |
| 2012/0023129 A1 | 1/2012 | Vedula et al. |
| 2012/0027256 A1 | 2/2012 | Kiyohara |

(56) References Cited

U.S. PATENT DOCUMENTS

| | | |
|---|---|---|
| 2012/0030194 A1 | 2/2012 | Jain |
| 2012/0038665 A1 | 2/2012 | Strietzel |
| 2012/0047147 A1 | 2/2012 | Redstone et al. |
| 2012/0072428 A1 | 3/2012 | Kao et al. |
| 2012/0079396 A1 | 3/2012 | Neer et al. |
| 2012/0082378 A1 | 4/2012 | Peters et al. |
| 2012/0092685 A1 | 4/2012 | Barrett |
| 2012/0100869 A1 | 4/2012 | Liang et al. |
| 2012/0102409 A1 | 4/2012 | Fan et al. |
| 2012/0109901 A1 | 5/2012 | Mase |
| 2012/0114296 A1 | 5/2012 | Luo et al. |
| 2012/0122554 A1 | 5/2012 | Paquet et al. |
| 2012/0123867 A1 | 5/2012 | Hannan |
| 2012/0124630 A1 | 5/2012 | Wellen |
| 2012/0136689 A1 | 5/2012 | Ickman et al. |
| 2012/0153016 A1 | 6/2012 | Slaby et al. |
| 2012/0158871 A1 | 6/2012 | Amano et al. |
| 2012/0179664 A1 | 7/2012 | Auerbach et al. |
| 2012/0213404 A1 | 8/2012 | Steiner |
| 2012/0214568 A1 | 8/2012 | Herrmann |
| 2012/0220314 A1 | 8/2012 | Altman et al. |
| 2012/0221687 A1 | 8/2012 | Hunter et al. |
| 2012/0246003 A1 | 9/2012 | Hart et al. |
| 2012/0251011 A1 | 10/2012 | Gao et al. |
| 2012/0278387 A1 | 11/2012 | Garcia et al. |
| 2012/0324589 A1 | 12/2012 | Nukala et al. |
| 2013/0006882 A1 | 1/2013 | Galliani |
| 2013/0013683 A1 | 1/2013 | Elliott |
| 2013/0066963 A1 | 3/2013 | Odio et al. |
| 2013/0101220 A1 | 4/2013 | Bosworth et al. |
| 2013/0114865 A1 | 5/2013 | Azar et al. |
| 2013/0117365 A1 | 5/2013 | Padmanabhan et al. |
| 2013/0117692 A1 | 5/2013 | Padmanabhan et al. |
| 2013/0124311 A1 | 5/2013 | Sivanandan et al. |
| 2013/0129232 A1 | 5/2013 | Cok et al. |
| 2013/0141529 A1 | 6/2013 | Sathish |
| 2013/0156275 A1 | 6/2013 | Amacker et al. |
| 2013/0166639 A1 | 6/2013 | Shaffer et al. |
| 2013/0167212 A1 | 6/2013 | Azar et al. |
| 2013/0223696 A1 | 8/2013 | Azar et al. |
| 2013/0232251 A1 | 9/2013 | Pauley |
| 2013/0305287 A1 | 11/2013 | Wong et al. |
| 2013/0339180 A1* | 12/2013 | LaPierre ............... G06Q 50/01 705/26.7 |
| 2014/0002342 A1* | 1/2014 | Fedorovskaya ... G06F 17/30247 345/156 |
| 2014/0002644 A1* | 1/2014 | Fedorovskaya .. H04N 21/25883 348/143 |
| 2014/0016837 A1 | 1/2014 | Nechyba et al. |
| 2014/0033072 A1* | 1/2014 | Zheng ................... G06F 17/276 715/752 |
| 2014/0095637 A1* | 4/2014 | Cropper ................ H04L 67/22 709/206 |
| 2014/0123275 A1 | 5/2014 | Azar et al. |
| 2015/0005010 A1 | 1/2015 | Zhang et al. |
| 2015/0036000 A1 | 2/2015 | Cho et al. |
| 2015/0081783 A1* | 3/2015 | Gong ..................... H04L 65/60 709/204 |
| 2015/0135337 A1 | 5/2015 | Fushman et al. |
| 2015/0143256 A1* | 5/2015 | Panchawagh-Jain ........................ H04L 51/08 715/752 |
| 2015/0262208 A1 | 9/2015 | Bjontegard |
| 2015/0288632 A1* | 10/2015 | Zheng ..................... H04L 51/08 709/206 |
| 2015/0338915 A1 | 11/2015 | Publicover et al. |
| 2016/0063313 A1 | 3/2016 | Sandholm et al. |
| 2016/0149956 A1 | 5/2016 | Birnbaum et al. |
| 2016/0203699 A1 | 7/2016 | Mulhern et al. |
| 2016/0359957 A1* | 12/2016 | Laliberte ............... H04L 51/32 |
| 2017/0063852 A1 | 3/2017 | Azar et al. |
| 2017/0318077 A1 | 11/2017 | Borse et al. |

FOREIGN PATENT DOCUMENTS

| | | |
|---|---|---|
| JP | 2000-067057 | 3/2000 |
| JP | 2004-222056 | 8/2004 |
| JP | 2006-101095 | 4/2006 |
| JP | 2007-249821 | 9/2007 |
| JP | 2008-077445 | 4/2008 |
| JP | 2008-146174 | 6/2008 |
| JP | 2008-146230 | 6/2008 |
| JP | 2008-225586 | 9/2008 |
| JP | 2009-146079 | 7/2009 |
| JP | 2009-259238 | 11/2009 |
| JP | 2010-237751 | 10/2010 |
| JP | 2010-263621 | 11/2010 |
| JP | 2011-526013 | 9/2011 |
| JP | 2012-514276 | 6/2012 |
| JP | 2009-009204 | 1/2015 |
| KR | 10-2009-0080063 | 7/2009 |
| KR | 10-2010-0120282 | 11/2010 |
| KR | 10-2012-0029861 | 3/2012 |
| KR | 10-2012-0034600 | 4/2012 |
| WO | 2007113462 | 10/2007 |
| WO | 2007/135871 | 11/2007 |
| WO | 2007/135971 | 11/2007 |
| WO | 2008/045701 | 4/2008 |
| WO | 2009/076555 | 6/2009 |
| WO | 2009/082814 | 7/2009 |
| WO | 2010/075049 | 7/2010 |
| WO | 2010/108157 | 9/2010 |
| WO | 2011/001587 | 1/2011 |
| WO | 2011/149961 | 12/2011 |
| WO | 2012/015919 | 2/2012 |
| WO | 2014/178853 | 11/2014 |

OTHER PUBLICATIONS

EPO, Summons to Attend Oral Proceedings Pursuant to Rule 115(1) EPC for European Patent Application No. 11741726.1, dated May 29, 2017, 7 pages.

Hayakawa, "Remarkable Software at the Cutting Edge," MacPeople. ASCII Media Works Inc., vol. 15, No. 8, Aug. 1, 2009, p. 176.

Huang, et al., "Agent-mediated Personal Photo Sharing," International Journal of Electronic Business management, vol. 5, No. 1, Electronic Business management Society, Taiwan, Mar. 1, 2007, pp. 11-18.

KIPO, Notice of Preliminary Rejection (with English translation) for Korean Patent Application No. 10-2013-7004789, dated May 1, 2017, 10 pages.

Liu, et al., "Video-Based Face Recognition Using Adaptive Hidden Markov Models," Proceedings of the IEEE Computer Society Conference on Computer Vision and Pattern Recognition 1, CVPR, USA, Jun. 2003, pp. 340-345.

SIPO, Second Office Action (with English translation) for Chinese Patent Application No. 201180046353.X, dated Apr. 1, 2016, 14 pages.

SIPO, Notification of First Office Action dated in Chinese application No. 201380040026.2, dated Nov. 28, 2016, 25 pages.

SIPO, Notification on Grant of Patent Right and Notification for Patent Registration Formalities for Chinese Patent Application No. 201180046353.X, dated Jul. 1, 2016, 4 pages.

Ting-Hsiang, et al., "Agent-Mediated Personal Photo Sharing," International Journal of Electronic Business management, vol. 5, Issue 1, Mar. 2007, pp. 11-18.

USPTO, Non-final Office Action for U.S. Appl. No. 13/188,879, dated Dec. 16, 2011, 10 pages.

USPTO, Non-final Office Action for U.S. Appl. No. 13/246,628, dated Dec. 16, 2011, 10 pages.

USPTO, Final Office Action for U.S. Appl. No. 14/149,483, dated Dec. 21, 2016, 10 pages.

USPTO, Final Office Action for U.S. Appl. No. 13/346,385, dated Feb. 5, 2016, 11 pages.

USPTO, Non-final Office Action for U.S. Appl. No. 13/346,385, dated Jun. 30, 2016, 12 pages.

USPTO, Final Office Action for U.S. Appl. No. 13/346,385, dated Oct. 20, 2016, 15 pages.

(56) References Cited

OTHER PUBLICATIONS

USPTO, Non-final Office Action for U.S. Appl. No. 13/346,385, dated Apr. 7, 2017, 18 pages.
USPTO, Non-final Office Action for U.S. Appl. No. 13/590,354, dated Apr. 18, 2013, 6 pages.
USPTO, Notice of Allowance for U.S. Appl. No. 13/246,628, dated Apr. 11, 2012, 7 pages.
USPTO, First Action Interview, Office Action Summary for U.S. Appl. No. 14/149,483, dated Jul. 26, 2016, 7 pages.
USPTO, Notice of Allowance for U.S. Appl. No. 13/188,879, dated May 22, 2012, 7 pages.
USPTO, Notice of Allowance for U.S. Appl. No. 13/590,354, dated Sep. 13, 2013, 8 pages.
USPTO, Non-final Office Action in U.S. Appl. No. 13/929,498, dated Feb. 13, 2017, 32 pages.
USPTO, Non-final Office Action for U.S. Appl. No. 29/540,842, dated Jun. 30, 2016, 6 pages.
USPTO, Notice of Allowance for Design U.S. Appl. No. 29/540,842, dated Mar. 8, 2017, 7 pages.
USPTO, International Search Report and Written Opinion for International Patent Application No. PCT/US2013/077726, dated Apr. 6, 2015, 7 pages.
WIPO, International Preliminary Report on Patentabilty for International Patent Application No. PCT/US2013/077726, dated Jun. 30, 2015, 5 pages.
KIPO, Notice of Allowance for Korean Patent Application No. 10-2015-7002159, dated Jun. 19, 2017, 2 pages.
KIPO, Notice of Final Rejection (with English translation) for Korean Patent Application No. 10-2015-7002159, dated Feb. 10, 2017, 7 pages.
EPO, Communication Pursuant to Article 94(3) EPC for European Patent Application No. 13737075.5, dated Jul. 6, 2017, 5 pages.
USPTO, Final Office Action for U.S. Appl. No. 13/929,498, dated Jul. 13, 2017, 16 pages.
USPTO, Non-final Office Action for U.S. Appl. No. 15/205,602, dated Jul. 13, 2017, 6 pages.
USPTO, International Search Report and Written Opinion for International Patent Application No. PCT/US2013/048318, dated Dec. 9, 2014, 5 pages.
USPTO, Final Office Action for U.S. U.S. Appl. No. 13/346,385, dated Feb. 14, 2014, 23 pages.
USPTO, Notice of Allowance for U.S. Appl. No. 13/050,195, dated Jan. 24, 2014, 21 pages.
USPTO, Non-final Office Action for U.S. Appl. No. 13/050,195, dated Jan. 29, 2013, 14 pages
WIPO, International Preliminary Report on Patentability for International Patent Application No. PCT/US2013/048318, dated Jan. 8, 2015, 4 pages.
USPTO, Non-final Office Action for U.S. Appl. No. 13/929,498, dated Jul. 15, 2015, 29 pages.
USPTO, Non-final Office Action for U.S. Appl. No. 13/346,385, dated Jul. 22, 2015, 43 pages
USPTO, Notice of Allowance for U.S. Appl. No. 13/534,555, dated Jun. 11, 2015, 15 pages.
USPTO, Non-final Office Action for U.S. Appl. No. 13/050,195, dated Mar. 28, 2014, 23 pages.
USPTO, Non-final Office Action for U.S. Appl. No. 13/542,379, dated Oct. 3, 2014, 14 pages.
USPTO, Non-final Office Action for U.S. Appl. No. 13/050,195, dated Sep. 10, 2013, pages.
USPTO, Non-final Office Action for U.S. Appl. No. 13/346,385, dated Sep. 20, 2013, 16 pages.
USPTO, Non-final Office Action for U.S. Appl. No. 13/534,555, dated Sep. 30, 2014, 21 pages.
KIPO, Notice of Preliminary Rejection (with English translation) for Korean Patent Application No. 10-2015-7002159, dated Jan. 26, 2016, 11 pages.
USPTO, Non-final Office Action for U.S. Appl. No. 14/571,213, dated Sep. 24, 2015, 21 pages.
USPTO, Notice of Allowance for U.S. Appl. No. 13/050,195, dated Aug. 15, 2014, 27 pages.
SIPO, First Office Action for Chinese Patent Application No. 201180046353.X, dated Aug. 31, 2015, 29 pages.
SIPO, Notification of Grant for Chinese Patent Application No. 201380040026.2, dated Jul. 27, 2017, 3 pages.
USPTO, Notice of Allowance for U.S. Appl. No. 13/534,555, dated Oct. 23, 2015, 31 pages.
EPO, International Search Report for International Patent Application No. PCT/US2011/045532, dated Jan. 19, 2012, 4 pages.
USPTO, Non-final Office Action for U.S. Appl. No. 13/542,379, dated Nov. 19, 2015, 42 pages.
JPO, Office Action/Rejection (with English translation) for Japanese Patent Application No. 2013-521938, dated Mar. 10, 2015, 8 pages.
JPO, Decision of Rejection and Decision to Reject the Amendments for Japanese Patent Application No. 2015-520534, dated Aug. 7, 2017, 6 pages.
EPO, Examination Report for European Patent Application No. 11741726.1, dated Jan. 23, 2015, 6 pages.
EPO, Revised Office Action for European Patent Application No. 11741726.1, dated May 28, 2015, 6 pages.
JPO, Notice of Reasons for Rejection for Japanese Patent Application No. 2015-520534, dated Jan. 16, 2017, 8 pages.
EPO, Extended European Search Report for European Patent Application No. 13737075.5, dated Jan. 13, 2016, 8 pages.
"Flickr-Photo Sharing," URL:http://www.flickr.com/, accessed on Sep. 27, 2011, 7 pages.
KIPO, Notice of Last Preliminary Rejection for Korean Patent Application No. 10-2015-7002159, dated Aug. 10, 2016, 11 pages.
JPO, Notice of Reasons for Rejection for Japanese Patent Application No. 2015-520534, dated Mar. 7, 2016, 9 pages.
"Picasa Web Albums," Retrieved from URL:http//picasa.google.com/, accessed on Sep. 27, 2011, 1 page.
USPTO, Notice of Allowance for U.S. Appl. No. 13/534,555, dated Mar. 8, 2016, 28 pages.
USPTO, Non-Final Office Action for U.S. Appl. No. 13/929,498, dated Feb. 13, 2017, 32 pages.
USPTO, Final Office Action for U.S. Appl. No. 13/929,498, dated Feb. 25, 2016, 48 pages.
Alt, et al., "Location-based Crowdsourcing: Extending Crowdsourcing to the Real World," Proceedings NordiCHI, Oct. 16-20, 2010, pp. 13-22.
European Patent Office, International Search Report and Written Opinion for International Patent Application No. PCT/US2016/054024, dated Dec. 7, 2016, 19 pages.
USPTO, Restriction Requirement for U.S. Appl. No. 29/540,842, dated Nov. 28, 2016, 5 pages.
EPO, International Search Report for International Patent Application No. PCT/US2018/018447, dated May 24, 2018, 4 pages.
EPO, Written Opinion for International Patent Application No. PCT/US2018/018447, dated May 24, 2018, 6 pages.
EPO, Written Opinion of the International Preliminary Examining Authority for International Patent Application No. PCT/US2018/018447, dated Apr. 10, 2019, 5 pages.
USPTO, Notice of Allowance for U.S. Appl. No. 15/898,182, dated May 22, 2019, 23 pages.

* cited by examiner

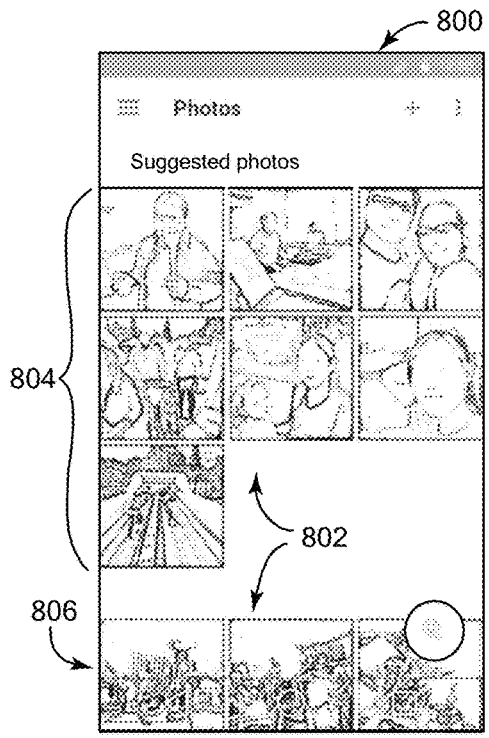
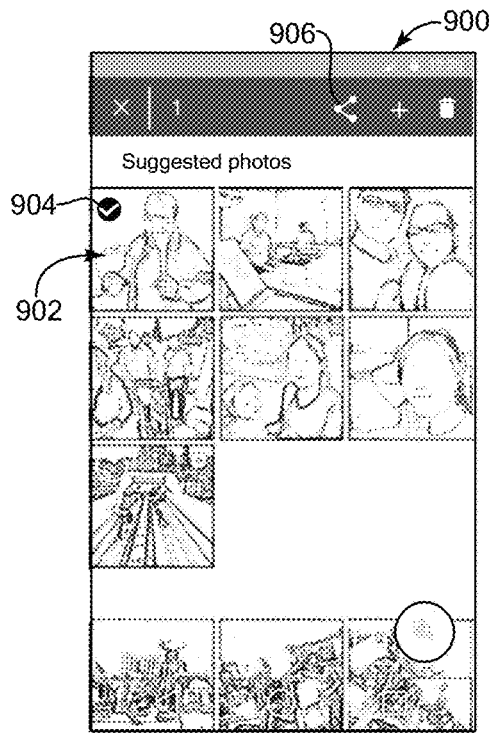
FIG. 8     FIG. 9
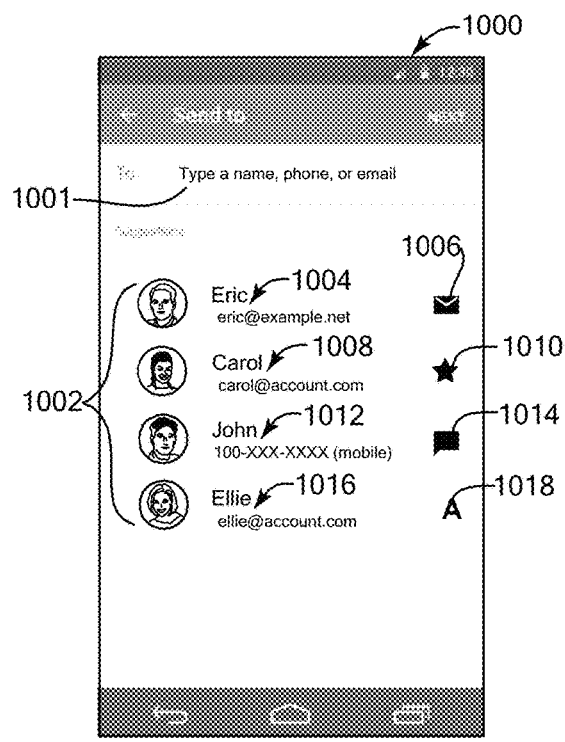
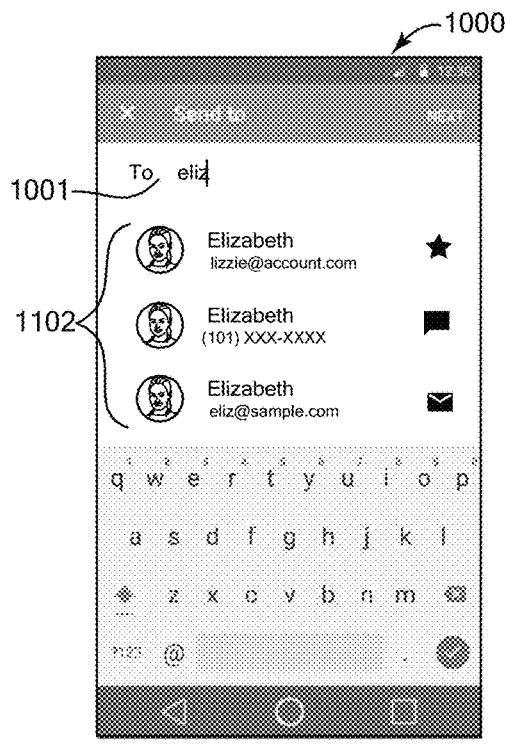
FIG. 10     FIG. 11

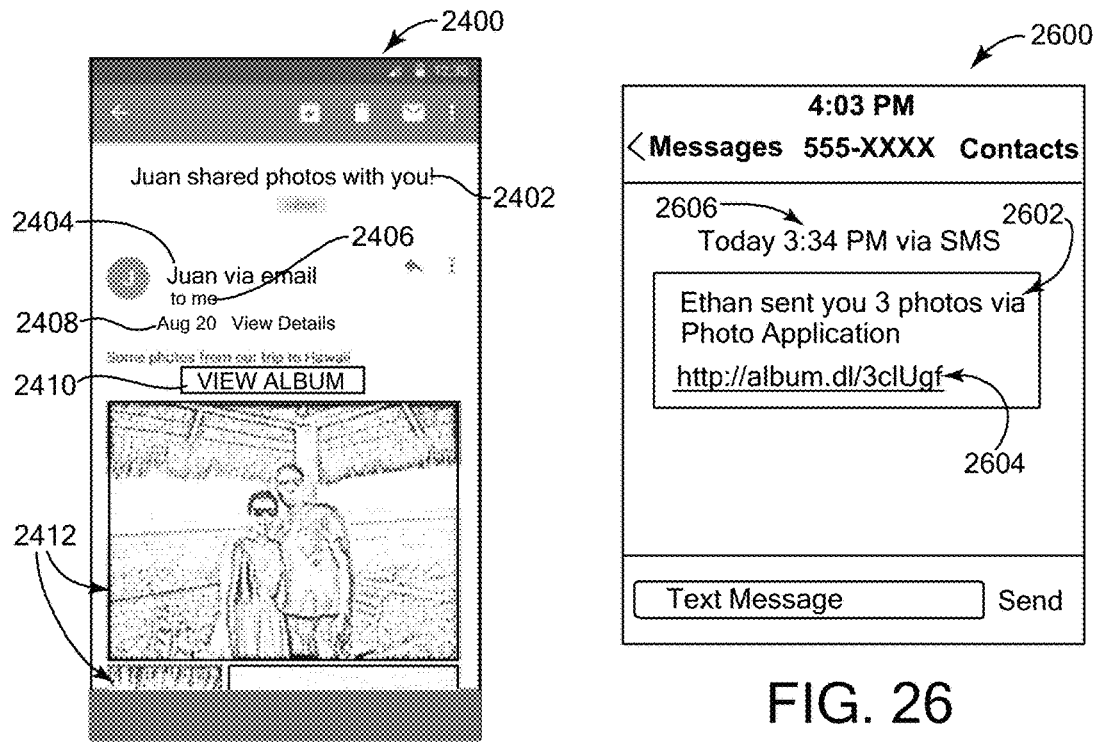
FIG. 24
FIG. 26
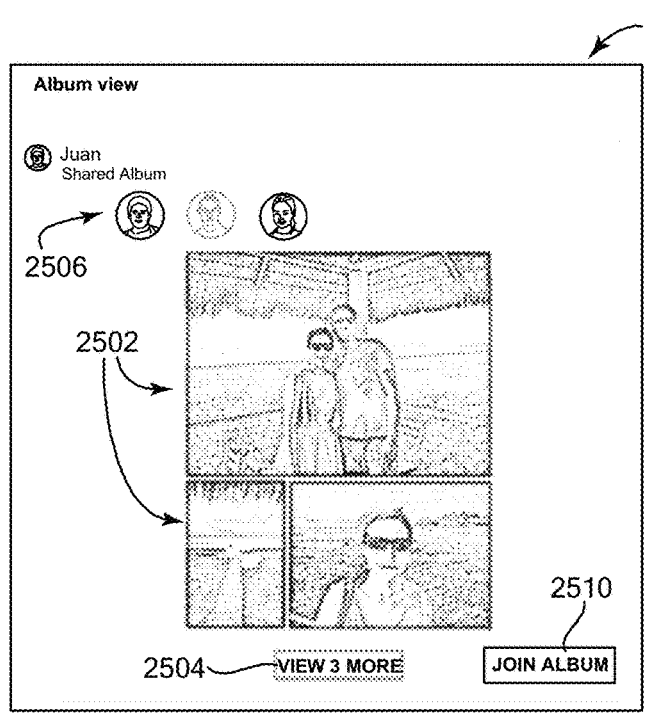
FIG. 25

SHARING IMAGES AND IMAGE ALBUMS OVER A COMMUNICATION NETWORK

CROSS REFERENCE TO RELATED APPLICATION

The present application claims priority to U.S. Provisional Patent Application No. 62/234,009, filed Sep. 28, 2015 and titled SHARING IMAGES AND IMAGE ALBUMS, the entire contents of which are hereby incorporated by reference.

BACKGROUND

The popularity and convenience of digital cameras as well as the widespread of use of Internet communications have caused user-produced images such as photographs to become ubiquitous. For example, users of Internet platforms and services such as email, forums, photograph repositories, and network services post images for themselves and others to view. Images can be posted by users to a network service for private viewing (e.g., friends or other small groups of users) and/or public viewing by many users.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations generally relate to sharing content such as images and image albums over a communication network. In some implementations, a computer-implemented method to share images over a communication network includes determining that a shared album data structure representing a shared album is accessible by a device, where the shared album data structure includes references to one or more album images included in the shared album. In response to determining that the shared album data structure is accessible by the device, the method includes determining, by the device, one or more suggested images from a collection of stored images associated with a particular user, where determining the one or more suggested images is based on determining sharing scores by the device for the stored images, where the sharing scores are based on, at least in part, comparing one or more characteristics of the stored images to one or more corresponding characteristics of the one or more album images. The method includes causing display of the one or more suggested images by the device, receiving a selection of at least one selected image of the one or more suggested images based on user input received by the device, and causing an update of the shared album data structure with the at least one selected image, such that the at least one selected image is accessible via the shared album data structure over a communication network by one or more recipient users.

Various implementations and examples of the method are described. For example, the method further can include determining, by the device, one or more suggested recipient users for the at least one selected image, where the one or more suggested recipient users can be determined based on recipient scores determined by the device for a plurality of users stored in a contact list associated with the particular user, where the recipient scores are based on, at least in part, comparing one or more determined content features of the at least one selected image to one or more content features of images previously shared by the particular user to one or more of the plurality of the users; and receiving a second selection of at least one selected recipient user of the one or more suggested recipient users, where the at least one selected recipient user is included in the one or more recipient users to which the at least one selected image is accessible. For example, in response to receiving the second selection of at least one of the one or more suggested recipient users, the method can determine one or more additional suggested recipient users based on the at least one selected recipient user.

The sharing scores can be based on general user sharing data describing historical sharing activities of multiple users, where the historical sharing activities include sharing of shared images associated with the multiple users with one or more other users over the communication network, and the sharing scores can be based on particular user sharing data describing historical sharing activities of the particular user of the device including sharing of shared images associated with the particular user with at least one other user over the communication network. Determining the one or more suggested images can further include determining one or more patterns in the historical sharing activities of the multiple users, where the one or more patterns include one or more correlations between the historical sharing activities and at least one of: types of image features depicted in the shared images associated with the multiple users, and types of events depicted in the shared images associated with the multiple users.

The method can further include receiving the shared album data structure by the device, causing a display on the device of at least one of the one or more album images of the shared album data structure, and causing a display of one or more identifications of the one or more recipient users, where the one or more recipient users are associated with the shared album. The method can further include, in response to causing the update, sending a respective message to each of a plurality of the recipient users, where the message enables a recipient user to access the at least one selected image using an associated recipient device, and where sending the respective message includes sending a first message to a first recipient user using a first communication channel, where the first message includes a first link to the album data structure and a first type of information associated with the first communication channel; and sending a second message to a second recipient user using a second communication channel, where the second message includes a second link to the album data structure and a second type of information associated with the second communication channel, where the second type of information is different than the first type of information.

In some examples, the first communication channel can include an image management application used by the first recipient user, where the first message includes a particular type of link associated with the image management application and notification data for use by the image management application to cause a notification to be output on a first recipient device of the first recipient user. In further examples, the first communication channel can include an email communication channel, and the first message can include a web link configured to cause a web page to be displayed on a first recipient device of the first recipient user in response to user input selecting the web link, and one or more pointers to one or more stored preview images corresponding to at least one album image in the shared album, where the one or more pointers enable the one or more preview images to be displayed on the first recipient device. In further examples, the first communication channel can include an image management application executing on the device and on a first recipient device of the first recipient user, where the first message includes a particular type of link associated with the image management application, and notification data used by the image management application to cause a notification to be output on the first recipient device; and the second communication channel can include an account of the second recipient user provided by a network service and the image management application is not running on a second recipient device used by the second recipient user, where the second message includes a web link and one or more pointers to one or more stored preview images. In another example, the first communication channel can include an email communication channel and the first message can include a link and one or more pointers to one or more stored preview images, and the second communication channel can include a short message service (SMS) communication channel, where the second message includes the link and no pointers to the one or more stored preview images.

The method can further include receiving data over a communication network identifying the one or more album images, causing at least one of the one or more album images to be displayed in a shared album viewing interface on a display of the device, receiving view status data associated with the shared album and associated with one or more member users of the shared album, where the one or more member users include the recipient users, and, based on the view status data, causing display of an indication of each member user of the member users in the shared album viewing interface and an indication of a view status of each associated member user, where the view status indicates whether the associated member user has viewed one or more images of the shared album.

In some implementations, a device includes a display, a storage device, and at least one processor operative to access the storage device and the display and configured to receive a sharing message over a communication network identifying a shared album that includes one or more album images and implemented as a shared album data structure in storage. The processor is configured to, in response to receiving the sharing message, cause at least one of the album images to be displayed in a shared album viewing interface on the display, receive view status data associated with the shared album data structure and associated with one or more member users of the shared album, cause an indication of each member user of the one or more member users to be displayed in the shared album viewing interface, and, based on the view status data, cause a view status indication for each associated member user to be displayed on the display, where the view status indication indicates whether the associated member user has viewed one or more images of the shared album.

Various implementations and examples of the device are described. For example, in response to the sharing message being received while the device is running an image management application, the shared album viewing interface can be displayed by the image management application, and the processor can be further configured to cause one or more controls to be displayed in the shared album viewing interface that are selectable by user input to enable one or more content contributions designated by a user to be added to the shared album. In some examples, in response to the sharing message being received over an email communication channel or a short message service (SMS) communication channel, the shared album viewing interface can be displayed in a browser program, where the shared album viewing interface disallows at least one of: adding user images to the shared album using the shared album viewing interface, adding content contributions to the shared album, downloading of the album images to the device using the shared album viewing interface, and inviting, using the shared album viewing interface, one or more other users to view and/or join the shared album.

The device processor can be further configured to obtain content contribution data associated with the one or more album images and contributed by at least one of the member users of the shared album, where the content contribution data includes at comments and/or ratings associated with at least one of the album images; and the processor can be configured to cause a display of the content contribution data in the shared album viewing interface. In some examples, the processor can be further configured to cause a display of an add member control in the shared album viewing interface, receive user input designating one or more users to add to the shared album as member users, and cause a second sharing message to be sent to the one or more users. In further examples, the processor can be configured to determine one or more suggested images from a collection of stored images associated with a user of the device, based on the processor determining sharing scores for the stored images, where the sharing scores are based on, at least in part, comparing one or more characteristics of the one or more suggested images to one or more corresponding characteristics of the one or more album images. The processor can also be configured to cause the one or more suggested images to be displayed by the display, receive a selection of at least one selected image of the one or more suggested images based on user input received by the device from the user, and cause an update of the shared album data structure to include the at least one selected image, where the at least one selected image is accessible via the shared album data structure over a communication network by the one or more member users of the shared album data structure.

In some implementations, a non-transitory computer readable medium has stored thereon software instructions that, when executed by at least one processor, cause the at least one processor to perform operations including creating an album data structure including an identification of one or more album images, receiving a set of recipient users for the album data structure, and adding the set of recipient users to the album data structure, where the set of recipient users includes a first recipient user associated with a first communication channel and a second recipient user associated with a second communication channel different from the first communication channel. The operations include receiving a share command applicable to the album data structure, and, in response to receiving the share command, causing a first message to be sent to a first recipient device used by the first recipient user using the first communication channel, where the first message includes a first link to the album data structure and includes a first type of information associated with the first communication channel. The operations include, in response to receiving the share command, causing a second message to be sent to a second recipient device of the second recipient user using the second communication channel, where the second message includes a second link to the album data structure and includes a second type of information associated with the second communication channel and different than the type of information in the first message.

In various examples of the computer readable medium, the first type of information associated with the first communication channel can include notification data to be displayed in a notification by the first recipient device of the first recipient user, the notification indicating that the album data structure is updated. The second type of information associated with the second communication channel can include one or more preview images corresponding to at least one of the album images.

BRIEF DESCRIPTION OF THE DRAWINGS

FIGS. 8 and 9 are diagrammatic illustrations of examples of an image display and selection interface for selecting images for sharing, according to some implementations;

FIGS. 10, 11, and 12 are diagrammatic illustrations of examples of a recipient display and selection interface, according to some implementations;

FIG. 24 is a diagrammatic illustration of an example user interface that has received and displayed an email message that indicates a received shared album, according to some implementations;

FIG. 25 is a diagrammatic illustration of an example of a shared album web page displayed in response to an email recipient user selecting a received link for a shared album, according to some implementations;

FIG. 26 is a diagrammatic illustration of an example user interface displayed on a device displaying an SMS message that indicates a received shared album, according to some implementations;

DETAILED DESCRIPTION

Figure 1:
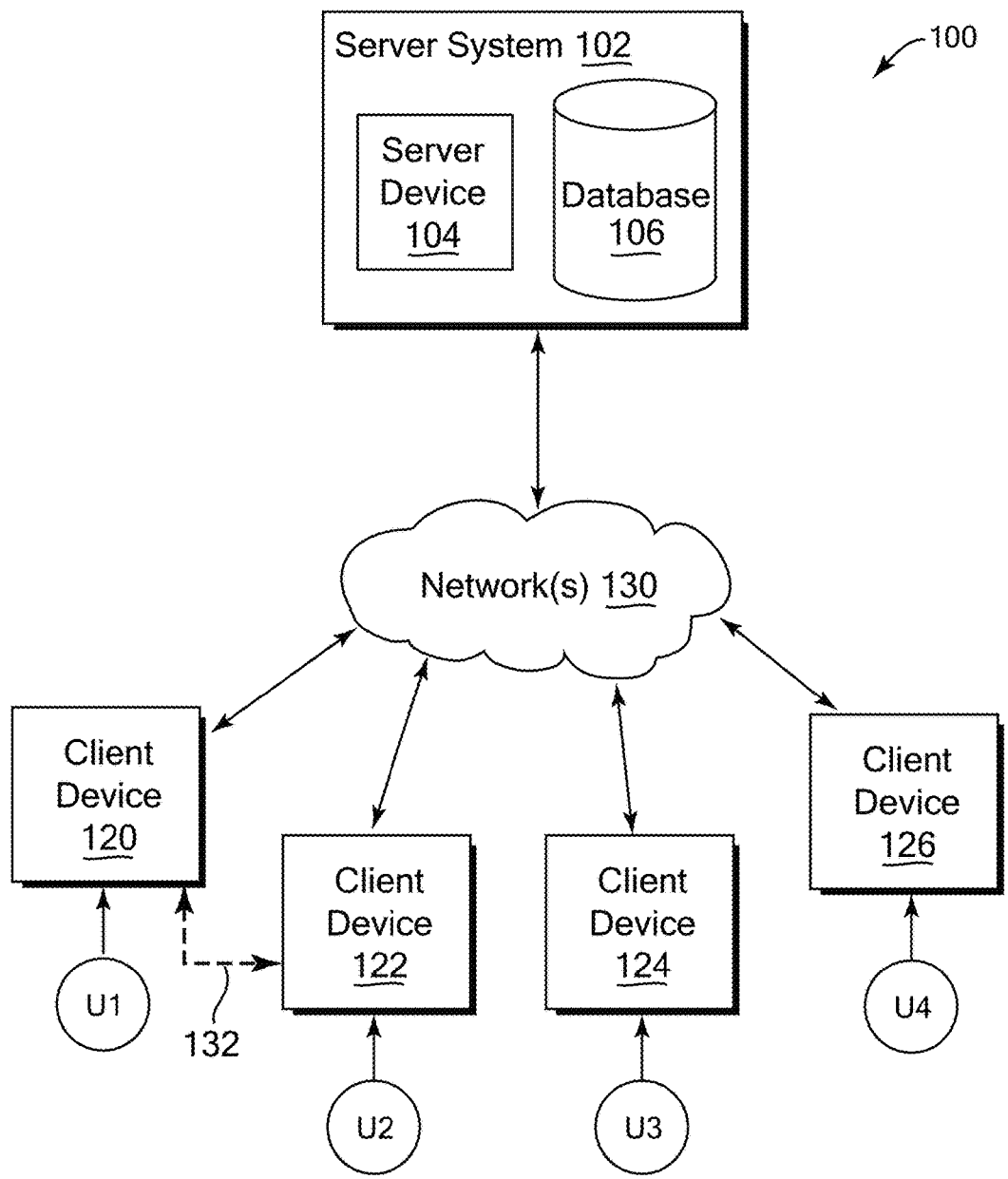
FIG. 1 is a block diagram of example systems and a network environment which may be used for one or more implementations described herein.

One or more implementations described herein relate to sharing content including images and image albums between devices on a communication network. In various examples, a shared album can be created by an owner user, and can include one or more images to share based on user input and/or automatic suggestions. Recipient users for the shared album can be determined based on user input and/or automatic suggestions, and messages can be sent to the recipient users to provide access to the shared album as member users of the shared album. Album members can add additional images as well as social content contributions (e.g., comments, ratings) to the shared album. Various interfaces provide viewing, editing, contributions, notifications, and summaries of album content and member users.

In some examples, a sharing user (e.g., owner of a created shared album) uses a graphical interface of an image management application running on a device (e.g., cell phone, tablet computer, desktop, etc.). The application can be connected with a network service account (e.g., photo sharing network service, a social network, etc.). The sharing user selects images (e.g., photos) desired to be shared with other users and which are to be included in the shared album.

In some implementations, the device can display suggested images to share and from which the user can select. Suggested images can be automatically determined by the device (without human intervention) based on any of a variety of criteria, including historical patterns of sharing activities and other activities by general users, and/or such activities by the sharing user and other users that have communicated with the sharing user. Characteristics of the images can also be examined, including location of capture, time of capture, and/or image content or features depicted in the images, which can be used to score the images to determine which images should be suggested to the user. The user can select images from the suggested images and/or from any other available images, where the selected images are to be included in the shared album.

The device can also or alternatively display a list of possible recipient users with which the sender user can share one or more images of the shared album. In some implementations, the list of possible recipient users displayed to the sender user can be suggested recipient users determined by the device based on any of several criteria. For example, the criteria can include past history patterns, recency, and frequency of communications by the sender user to particular other users. For example, other users that are frequently contacted by the sharing user can be suggested, and/or other users that are contacted by the sharing user at times and/or locations similar to the current time or location. Image recognition techniques can be performed on the selected images in the shared album to detect types of image content features. Detected features can be compared to image content features that the sharing user previously shared to particular users, to determine suggested recipient users with which to share the album images. The sharing user can select a set of multiple recipient users for the shared album from the list of possible (e.g., suggested) recipient users.

The shared album recipient users can include various users that use devices that communicate over a variety of different types of communication channels (e.g., communication modes or modalities). For example, some recipient users can be users of a similar image management application as the sharing user, e.g., installed on the devices used by the recipient users (indicated with a user account name and app icon). Some recipient users can be users logged into (or having) an account for the same network service that the sharing user is using to share the album, but do not have the image management application (e.g., indicated with a user account name). Some recipient users can be users that receive emails, e.g., via a standard email account (e.g., indicated with an email address), and some recipient users can be users that receive Short Message Service (SMS) messages on their phones (e.g., indicated with a phone number). For example, the selected recipient users can include a first recipient user associated with a first communication channel and a second recipient user associated with a second communication channel of a different type than the first channel.

A shared album data structure, representing a shared album of the selected images and accompanying data, can be created by a device and can include identifications of the selected images and the recipient users to which the shared album is shared. A share command is received by the device from the sharing user to initiate the sharing. The device sends messages to the recipient users using their associated communication channels. The messages can each include a link (or address) to the shared album structure and data. The messages can include different data depending on the communication channel used by the recipient user. For example, a message to a recipient user using the image management application can include a particular type of link and notification data for notifying the recipient user, while a message to an email recipient user can include a standard web link and pointers to one or more preview images to be displayed by the recipient device.

Recipient users using different types of communication channels may receive different indications of the received messages on their devices and can be provided with different capabilities to view and modify the shared album. For example, recipient users that use the image management application can receive the message as a notification that the shared album is now viewable by that user. These recipient users can use a variety of application functions allowing them to view the album images in a shared album interface, contribute comments to shared albums, contribute ratings (e.g., likes, dislikes, etc.) to shared albums, add their own images to the album, download album images to their own account or device, and invite other users to view and/or join the album. Application users can also receive notifications about later changes to the album.

In some implementations, the sharing user can receive indication(s) that one or more recipient users have accessed the shared album. For example, a device can determine when a recipient user has viewed the shared album images, e.g., via the image application sending the indication, via the recipient user following a web page link, etc. For example, web page viewing can be detected by providing the links in the sent messages as unique links (e.g., URLs) that are detectable when used. This view status of each recipient user (album member) can be stored in the shared album structure and displayed in a shared album viewing interface. Comments and ratings from recipient users (album members) can also be stored in the shared album structure and viewed in viewing interfaces.

In some implementations, suggested images from the recipient user's collection of images can be displayed to a recipient user in response to receiving access to a shared album as a recipient user. The recipient user can select one or more images from the suggested images to add to the received shared album. For example, suggested images to a recipient user can be based on the criteria used for an album owner, as well as based on the characteristics of the shared album and its member users. For example, suggested images can have similarities in timestamp, geographic location, and image content features as one or more of the images in the shared album.

In some implementations, recipient users on other types of communication channels can be more limited in the shared album functions they can use. For example, account recipients that do not have the application can be prompted to download the application. Email recipient users can receive the message that includes a web link. If an email recipient user follows such a web link, a web page can be displayed in a browser application on the device, where the web page displays the images of the shared album as well as member users of the shared album. SMS recipient users can receive only the web link and can similarly view the album images in a web browser by using the link. In some examples, some recipient users using some types of communication channels (e.g., standard email and SMS recipients) cannot comment on or rate the album photos, but can share the album with other users by sending the link to those users, and those users can request to join the album as member users.

Various described features can allow a system to provide shared albums of images and other content between users with a variety of functions to ease the sharing process and provide more relevant shared images to users. For example, suggested images and/or suggested recipient users for sharing as provided by features described herein can offer appropriate and relevant selection options to a user for sharing. This can be useful, for example, to a user that wishes to share photos, yet who has a large collection of photos to sort through and a large number of possible users with which to share. Image suggestions can make selections of images for sharing a convenient process for users, while giving users choices as to the images and recipient users for sharing. Recipient users of shared albums can be provided with automatic suggested images that are relevant to the images and/or member users of a shared album. With such automatic and relevant suggestions, users can be enabled to share more images with each other having strong user interest, thus building a stronger sharing and collaborative network between the users.

In addition, users of various different types of communication channels can receive access to and view shared album images, providing greater access and a larger number of users that can view a user's images without those users having to download applications or sign into particular network services to view the images of the album.

A system using one or more features described herein can reduce user time and effort in sharing images to users by automatically suggesting appropriate and relevant images and recipients for shared albums of images. Device memory use and processing resource use can be reduced by reducing tedious manual viewing and selection of images and recipient users by users having large sets of selection options. Described viewing interface features can reduce memory and processing resource use by users by providing convenient information related to shared album status and member status to users and reducing device use to determine such album and member status. Furthermore, described features can reduce the processing and communication resources used by devices of recipient users to receive and display album images without installing a particular viewing application or having a particular account. Consequently, a technical effect of one or more described implementations is that operation of image viewing devices is reduced in computational time and resources expended to obtain results, thus providing a technical solution to the technical problem of extensive device resources required for generation, transmission, and viewing of image albums shared among multiple devices and users. For example, a technical effect of described features is a reduction in the problem of consumption of system processing and transmission resources required for determination, selection, and viewing of images shared to other devices across communication networks.

Herein, features relating to images and image albums are described. Other types of content can also be used with features described herein. For example, videos (e.g., movies) having multiple image frames can be included in the term "images" and, e.g., suggested for inclusion in shared albums, collected in albums and album structures, shared, rated, and commented on by users similarly to the images described herein. Similarly, content types such as documents, audio files, games, and other media types can be similarly used with described features.

Implementations discussed herein do not require collection or usage of user personal information. In situations in which certain implementations discussed herein may collect or use personal information about users (e.g., user data, information about a user's social network, user's location and time at the location, user's biometric information, user's activities and demographic information), users are provided with one or more opportunities to control whether information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

An "image" as referred to herein can be a still image, single image, or standalone image, or can be an image included in a series of images, e.g., a frame in a video sequence of video frames, or an image in a different type of sequence of images. For example, implementations described herein can be used with single images or with video sequences of images. "Sharing" generally refers to a sharing user providing access to content to one or more recipient users over a network, e.g., including the internet and/or local networks, and wired and/or wireless networks. The provided access can allow the recipient users to view, download, comment or rate, etc. the shared content depending on the access privileges provided to the recipient users.

FIG. 1 illustrates a block diagram of an example network environment 100, which may be used in some implementations described herein. In some implementations, network environment 100 includes one or more server systems, e.g., server system 102 in the example of FIG. 1. Server system 102 can communicate with a network 130, for example. Server system 102 can include a server device 104 and a database 106 or other storage device. Network environment 100 also can include one or more client devices, e.g., client devices 120, 122, 124, and 126, which may communicate with each other and/or with server system 102 via network 130. Network 130 can be any type of communication network, including one or more of the Internet, local area networks (LAN), wireless networks, switch or hub connections, etc. In some implementations, network 130 can include peer-to-peer communication 132 between devices, e.g., using peer-to-peer wireless protocols.

For ease of illustration, FIG. 1 shows one block for server system 102, server device 104, and database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In some examples, database 106 and/or other storage devices can be provided in server system block(s) that are separate from server device 104 and can communicate with server device 104 and other server systems via network 130. Also, there may be any number of client devices. Each client device can be any type of electronic device, e.g., desktop computer, laptop computer, portable or mobile device, cell phone, smart phone, tablet computer, television, TV set top box or entertainment device, wearable devices (e.g., display glasses or goggles, head-mounted display (HIVID), wristwatch, headset, armband, jewelry, etc.), virtual reality (VR) and/or augmented reality (AR) enabled devices, personal digital assistant (PDA), media player, game device, etc. Some client devices may also have a local database similar to database 106 or other storage. In other implementations, network environment 100 may not have all of the components shown and/or may have other elements including other types of elements instead of, or in addition to, those described herein.

In various implementations, end-users U1, U2, U3, and U4 may communicate with server system 102 and/or each other using respective client devices 120, 122, 124, and 126. In some examples, users U1, U2, U3, and U4 may interact with each other via applications running on respective client devices and/or server system 102, and/or via a network service, e.g., a social network service or other type of network service, implemented on server system 102. For example, respective client devices 120, 122, 124, and 126 may communicate data to and from one or more server systems (e.g., system 102). In some implementations, the server system 102 may provide appropriate data to the client devices such that each client device can receive communicated content or shared content uploaded to the server system 102 and/or network service. In some examples, the users can interact via audio or video conferencing, audio, video, or text chat, or other communication modes or applications. In some examples, the network service can include any system allowing users to perform a variety of communications, form links and associations, upload and post shared content such as images, video, image montages, audio data, and other types of content, receive various forms of data, and/or perform socially-related functions. For example, the network service can allow a user to send messages to particular or multiple other users, form social links in the form of associations to other users within the network service, group other users in user lists, friends lists, or other user groups, post or send content including text, images, video sequences, audio sequences or recordings, or other types of content for access by designated sets of users of the network service, participate in live video, audio, and/or text videoconferences or chat with other users of the service, etc. In some implementations, a "user" can include one or more programs or virtual entities, as well as persons that interface with the system or network.

A user interface can enable display of images, video, data, and other content as well as communications, privacy settings, notifications, and other data on a client device 120, 122, 124, and 126 (or alternatively on server system 102). Such an interface can be displayed using software on the client device, software on the server device, and/or a combination of client software and server software executing on server device 104, e.g., application software or client software in communication with server system 102. The user interface can be displayed by a display device of a client device or server device, e.g., a display screen, projector, etc. In some implementations, application programs running on a server system can communicate with a client device to receive user input at the client device and to output data such as visual data, audio data, etc. at the client device.

In some implementations, server system 102 and/or one or more client devices 120-126 can provide an image management program. The image management program may allow a system (e.g., client device or server device) to provide options for displaying and manipulating images and shared albums of images, some examples of which are described herein. The image management program can provide associated user interface(s) that are displayed on a display device associated with the server system or client device. The user interface may provide various options to a user to select images and users, create albums, select editing and display modes, etc. for one or more images. Other applications can also be used with one or more features described herein, such as browsers, email applications, communication applications, etc.

Various implementations of features described herein can use any type of system and/or service. For example, social networking services, photo collection services or other networked services (e.g., connected to the Internet) can include one or more described features accessed by client and server devices. Any type of electronic device can make use of features described herein. Some implementations can provide one or more features described herein on client or server devices disconnected from or intermittently connected to computer networks. In some examples, a client device including or connected to a display device can examine and display images stored on storage devices local to the client device (e.g., not connected via a communication network) and can provide features and results as described herein that are viewable to a user.

Figure 2:
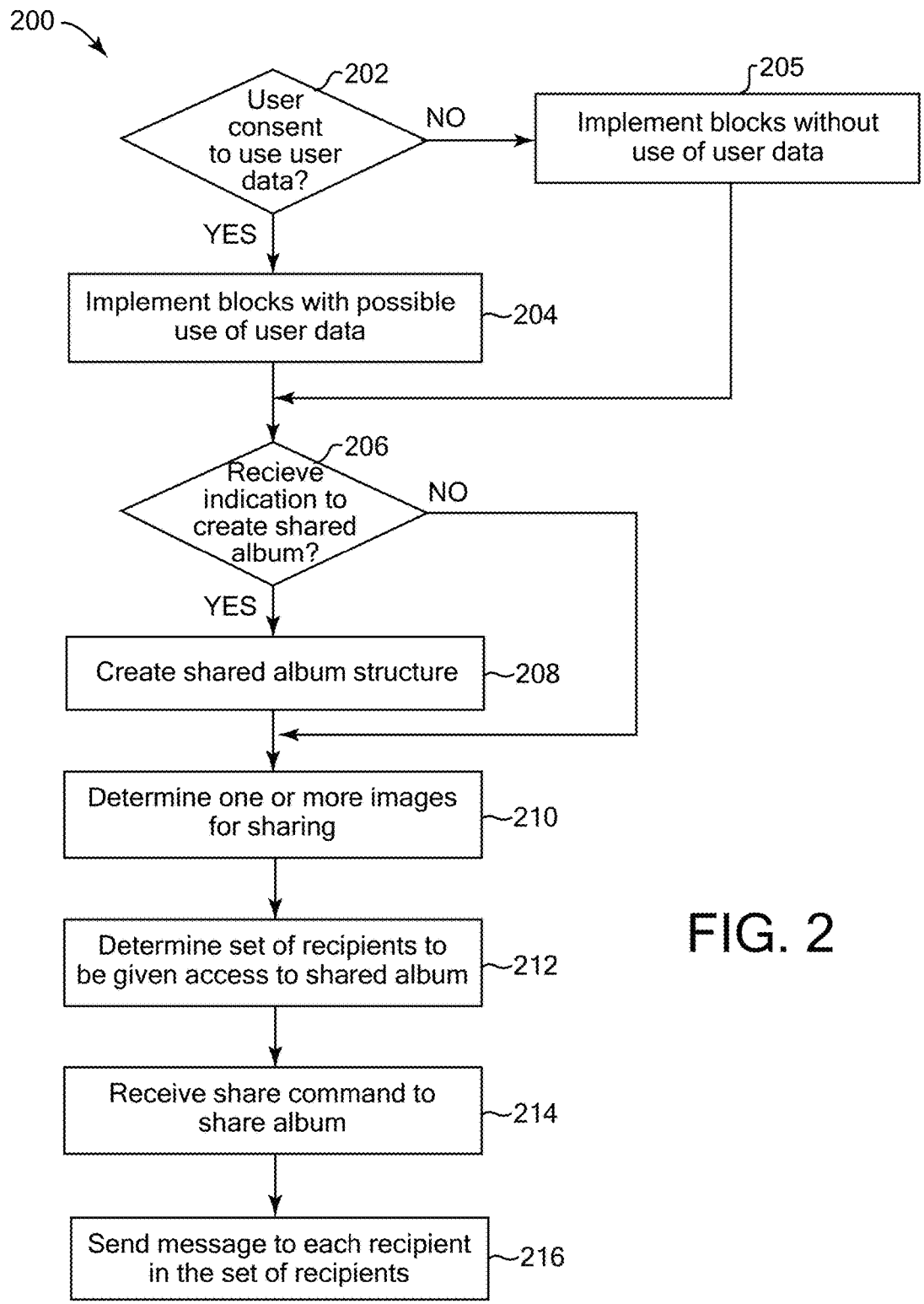
FIG. 2 is a flow diagram illustrating an example method to share an image album over a communication network, according to some implementations.

FIG. 2 is a flow diagram illustrating one example of a method 200 to share an image album over a communication network. In this example, one or more images can be shared in a newly-created shared album or can be added to an existing shared album.

In some implementations, method 200 can be implemented, for example, on a server system 102 as shown in FIG. 1. In other implementations, some or all of the method 200 can be implemented on one or more client devices 120, 122, 124, or 126 as shown in FIG. 1, one or more server devices, and/or on both server device(s) and client device(s). In described examples, the implementing system includes one or more digital hardware processors or processing circuitry ("processors"), and one or more storage devices (e.g., a database 106 or other storage). In some implementations, different components of one or more servers and/or clients can perform different blocks or other parts of the method 200.

Some implementations can initiate method 200 based on user input. A user may, for example, have selected the initiation of the method 200 from a displayed user interface. In some implementations, method 200 or portions thereof can be performed with guidance by the user via user input.

In some implementations, the method 200, or portions of the method, can be initiated automatically by a device. For example, the method (or portions thereof) can be periodically performed, or performed based on the occurrence of one or more particular events or conditions. For example, such events or conditions can include an particular application being opened by a user, obtaining one or more images that have been newly uploaded to or accessible by a device (e.g. a user device), a predetermined time period having expired since the last performance of method 200, and/or one or more other events or conditions occurring which can be specified in settings of a device implementing method 200. In some implementations, such conditions can be previously specified by a user in stored custom preferences of the user (accessible by a device or method with user consent). In one example, a server device can receive one or more selections of images, recipient users and/or other items from one or more users, and can perform the method 200 for the selected images. In another example, a device (server or client) can perform the method 200 with access to a large collection of accessible images, e.g., a user's collection of images (if user consent is received). In another example, a camera, cell phone, tablet computer, wearable device, or other client device can capture an image and can perform the method 200. In addition or alternatively, a client device can send one or more captured images to a server over a network, and the server can process the images using method 200.

In block 202, it is checked whether user consent (e.g., user permission) has been obtained to use user data in the implementation of method 200 (and methods 400, 500, and 600, described below). For example, user data can include user preferences, user images in an image collection (e.g., one or more albums of the user), information about a user's social network and contacts, user characteristics (identity, name, age, gender, profession, etc.), social and other types of actions and activities, content, ratings, and opinions created or submitted by a user, a user's geographical location, historical user data, etc. One or more blocks of the methods described herein may use such user data in some implementations. If user consent has been obtained from the relevant users for which user data may be used in the method 200, then in block 204, it is determined that the blocks of the methods herein can be implemented with possible use of user data as described for those blocks, and the method continues to block 206. If user consent has not been obtained, it is determined in block 205 that blocks are to be implemented without use of user data, and the method continues to block 206. In some implementations, if user consent has not been obtained, the remainder of method 200 is not performed, and/or particular blocks needing the user data are not performed.

In block 206, it is determined whether a device has received an indication to create a shared album. For example, an instruction may have been received at a user's device ("user device") from a user or other source to instruct that a shared album be created. In some examples, the instruction can be selection of a control or command by a user in a graphical interface displayed by a device, such as a client device or server device. The indication can be provided as other user input (e.g., voice command from a user, button or keyboard command provided by a user, motion command based on motion of a device by a user in physical space and sensed by motion sensors of the device, etc.).

In some cases, an indication to create a shared album is not received. For example, one or more shared albums may have previously been created and accessible to the method, and one or more other conditions can prompt the method to determine whether images should be shared (e.g., added) to an existing shared album, as in examples described below. If an indication to create a shared album is not received, then the method continues to block 210, described below.

If an indication to create a shared album has been received, block 208 is performed, in which a shared album structure is created. In some examples, the shared album structure can be a data structure created and stored in storage such as memory and/or other storage accessible to a device performing block 208. In some implementations, the shared album structure can include different sections for different types of data. For example, one section can provide identifications of images that are included in the shared album. Such identifications can be the image data itself, a portion of the image data, and/or pointers or other references to images stored in other storage. The shared album structure can also include other sections, such as a member user section in which identifications or indications of the users who have access to the album can be stored. Some implementations can include a social contribution data section that stores user contributions related to the shared album, e.g., comments, ratings, additional content, etc. Additional sections can also be included in some implementations, such as available controls to be displayed with shared album content in a shared album interface that is displayed for viewing users. Some examples of a shared album data structure are described below with reference to FIG. 27. The method continues to block 210.

In block 210, one or more images for sharing are determined, which are to be included in the shared album. The determined images can be digital images composed of multiple pixels, for example, and can be stored on one or more storage devices of the system or otherwise accessible to the device(s) implementing method 200, e.g., a connected storage device such as a local storage device, storage device connected to or in communication with a network accessible to the system, etc. For example, the images can be photos captured by one or more cameras, image frames extracted from captured video streams or other video data, or images derived from different sources. In some implementations, the determined images can be obtained from a stored collection of multiple images, e.g., from a user's collection or album(s), a pool of stored images submitted by users, etc. Automatic obtaining of images from a user's collection is performed with the user's consent as indicated in block 204, e.g., via stored user preferences accessed by block 210. The collections can be locally stored and accessible by the device performing method 200, and/or can be remotely stored on a storage, server, or client device, e.g., as one or more albums provided in account(s) of user(s) of a network service.

The images to be shared can be determined in one or more different ways, including selection of one or more images by a user, and/or automatic determination, suggestion, and/or selection of one or more images by one or more devices without user intervention. Some examples of determining the images to be shared are described below with respect to FIG. 4. The method then continues to block 212.

In some implementations, identifications of the determined images of block 210 can be stored in a shared album structure. For example, if a shared album structure was created in block 208, identifications of the determined images can be stored in that created structure. In some examples, the image data (e.g., pixel data) of the determined images can be stored in the shared album structure, and/or pointers or other references to the determined images can be stored in the shared album structure and the determined images are stored in other accessible storage. In some cases or implementations, the determined images are to be added to a pre-existing shared album (e.g., an album not just created in block 208), and the determined images can be temporarily stored before being sent for storage in a shared album structure for the existing shared album.

In block 212, a set of one or more recipient users are determined, where the recipient users are to be given access to the shared album including the one or more shared images determined in block 210. The set of recipient users can be determined in one or more different ways, including selection of one or more recipient users by a user, and/or automatic determination, suggestion, and/or selection of one or more recipient users by one or more devices without user intervention. Some examples of determining the recipient users for sharing are described below with respect to FIG. 5. In some implementations, the one or more determined recipient users can be added to existing member users of a pre-existing shared album.

In some implementations, identifications of the set of recipient users can be stored in the shared album structure. For example, if a shared album structure was created in block 208, identifications of the recipient users can be stored in that created structure. In some examples, the recipient users can be stored as one or more names and/or addresses (e.g., account names, email addresses, other network addresses, etc.). In some implementations, each different account name and network address of a user can be stored as a separate recipient user. In some cases or implementations, the sharing user is providing user input to add one or more images to an existing shared album, and the set of recipient users for the shared album has already been determined. The determined images of block 210 will thus be shared with those same recipient users. In some implementations, additional recipient users can be added to the shared album by the user providing user input that selects additional users, and/or one or more additional recipient users can be added automatically. The method then continues to block 214.

In some implementations, the sharing user can also select other options governing the sending of the shared album and/or how one or more recipient users can access the shared album. For example, the user can be provided an option (e.g., as a selection in a sharing interface) to allow or disallow recipient users to contribute images to the shared album, to add new users as members to the album, etc. Some examples are described below.

In block 214, a share command is received to share the shared album, e.g., to share the data referenced or stored in the shared album structure. This command causes the determined images to be made accessible (e.g., viewable) by each user in the set of recipient users determined as described above. In some implementations, the share command can be received as user input, e.g., a selection by a user of a "send" button in a graphical interface via touch input on a touchscreen, voice input, optical sensor input, or selection of a share function via motion input or other user input. In some implementations, if the shared album is a pre-existing shared album including one or more pre-existing images different than the determined images of block 210, then the share command can also cause one or more pre-existing images to be shared with the one or more recipients determined in block 212 (e.g., who may have not had access to the shared album previously).

In block 216, a sharing message is sent to each recipient user in the set of recipient users using a communication channel associated with that recipient user. In some implementations, multiple of the recipient users may be associated with different types of communication channels, and the message may include different types of information based on the type of communication channel associated with the recipient user that is to receive the message. For example, the message can include a link to allow the recipient user to access the shared album images, can include a preview of one or more images of the shared album (e.g., preview images corresponding to album images, and/or a subset of the album images), and/or can include other information. Some examples of sending messages to recipient users is described below with respect to FIG. 6. In some implementations, if the shared album is a pre-existing shared album, then one or more pre-existing member users of the shared album can also be sent a sharing message as a recipient user, to indicate the update of the shared album with the one or more determined images of block 210.

After receiving the sharing message, a recipient user can access the shared album. For example, a recipient user can provide user input on a recipient device to cause one or more of the images of the shared album to be displayed by the recipient device and viewed by the recipient user. Some examples of accessing and/or displaying a shared album are described below with reference to FIG. 7. In some implementations, in block 216, one or more of the album images (e.g., image data) can be sent to the recipient devices used by the recipient users over the respective communication channels.

Figure 3:
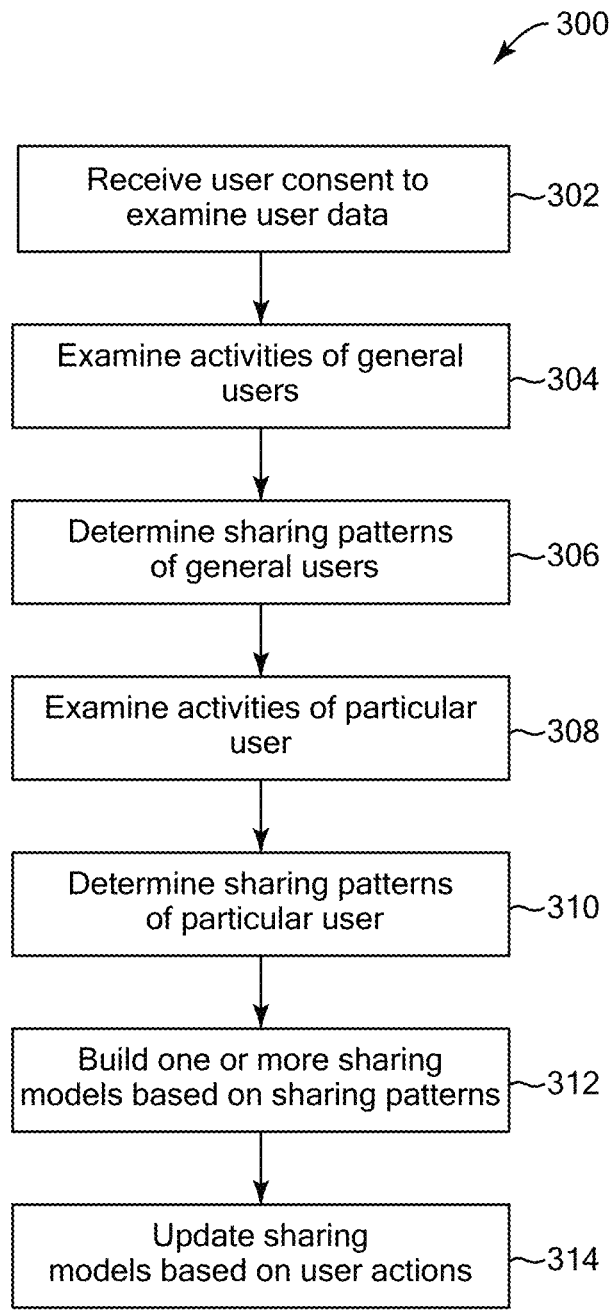
FIG. 3 is a flow diagram illustrating an example method to determine one or more sharing models that can be used in the determination of sharing suggestions, according to some implementations.

FIG. 3 is a flow diagram illustrating an example method 300 to determine one or more sharing models that can be used in the determination of sharing suggestions for a user. Method 300 can be performed at various times, e.g., prior to implementing method 200, by one or more devices, e.g., server devices and/or client devices. The results of various performances of method 300 can be combined, e.g., as updates to models. The sharing models determined by method 300 can be used by other methods described herein, e.g., methods of FIG. 4 and/or FIG. 5.

In block 302, user consent is received to examine user data of users (or this consent can be received at a different, previous time). For example, user data can include user preferences, geographic locations visited, images collected (e.g., captured and received photos), text content created (comments, ratings, opinions, etc.), social contacts (e.g., user information stored in contact lists on devices and/or user groups in network services such as social networking services), calendar data, historical user data and data indicating previous user activity involving devices and communication, etc. User data is not used in the blocks of method 300 for which user consent was not received by the user(s) associated with that user data. The user consent received also includes consent from a particular user for which sharing models and patterns are being determined.

In block 304, sharing activities and other activities of (consenting) multiple general users are examined over periods of time. For example, characteristics of these activities with one or more devices can be determined and stored over periods of time. For example, applications or other programs running on devices can provide data describing sharing activities of users of those devices, such as the occurrence of a user sharing an image (or other user content) to another user over a network. Various network services (e.g., internet services) such as photo collection and sharing services, email services, social networking services, and/or other network services can provide user data describing sharing activities of general users of those services. In some examples, the sharing activities can include sending content such as images, documents, video data, audio data, or other content to other users. Block 304 can examine the shared content for various factors, include time of sharing, location of sharing, metadata (e.g., EXIF data for images), detected content features (e.g., detected faces, objects, landscapes, landmarks, or other features in images).

Other user activities can also be examined. For example, communication activities such as instances of receiving and/or sending content from users can be counted or otherwise logged. In some implementations, times of day can be determined as to when sharing or other communication activities were performed by general users. In some implementations, if the users have given consent, geographic locations or environments can be determined as to where users performed sharing activities, e.g., based on GPS data of devices carried by users, and/or by examining the content of images (e.g., determining whether an image was captured outdoors based on outdoor features, e.g., landscape features, sunsets, etc., or whether the image was captured indoors based on room features, e.g., walls, furniture, etc.). In some implementations, a type of event or user activity can be determined at the time of sharing activities, e.g., a party or other social gathering, a holiday event, a sports game, a work meeting, shopping or other errand, etc. For example, types of events can be determined based on user calendar data, user to do lists, detecting types of content features in shared images (e.g., birthday cake, holiday decorations, sports playing, number of faces or persons, field weather feature (snow or overcast sky), or other well-known types of objects or other features).

In examining sharing activities and other user activities, block 304 does not determine or examine personal identities of people or other entities depicted or described in user content. For example, human faces can be detected in images without determining the identities of the persons having those faces. In some examples, the occurrence of one or more human faces depicted in an image, and/or the number of human faces detected in that image, can be logged by block 304. Similarly, people referred to in user content, e.g., users of a network service, do not have their identities examined. For example, a user name or network address of a user can be stored by block 304 to be examined for finding patterns in later blocks, but the person identity represented by the user name or network address is not identified or examined, and the user name and address is not retained after patterns are found as described below.

In block 306, sharing patterns of general users are determined based on the results of examining sharing activities and other user activities in block 304. Sharing patterns of general users can be based on users sharing content and communicating with other users, historical user data, and/or communicated user content (images shared, messages and other types of content sent and received, etc.). For example, sharing activities of users can be correlated with the users to which the content was shared (e.g., users who the user often communicates with), the type of content that was shared, the type of activity being performed by users at the time of the sharing activities, and/or other characteristics of users, used devices, or sharing activities. In some examples, a frequency of occurrence of sharing activities with other characteristics of users, content, or user activities can be determined, e.g., a number of occurrences of sharing activities for images in conjunction with type of image features shared, concurrent user activities, etc. In some implementations, the more frequent the sharing activity occurred, the greater the confidence or importance that can be assigned to that pattern (e.g., using a scale of confidence values or importance values). Some examples include determining a correlation between sharing activity and time of day, type of location, and/or type of content features depicted in content such as images. For example, a correlation can be determined between sharing images by the users and a particular type of event depicted in the shared images, e.g., a social gathering in which at least a certain number people are present (as depicted in one or more of the shared images), birthdays (based on depicted objects such as a cake), holidays (based on objects associated with the holiday depicted in the image, the date of image capture, etc.), a business event (based on geographic location of capture of the images), etc. In another example, a correlation can be determined between sharing images by the users and the type of content features depicted, e.g., images depicting faces are determined to have been shared the most, images depicting animals are determined to have been shared the next most, depicted landscape features are shared the least, etc.

In block 308, sharing activities and other activities of a particular user are examined, if consent from the particular user has been obtained. The particular user can be a user for which specific sharing models can be determined. For example, characteristics of these activities with one or more devices can be logged and stored over periods of time, providing historical user data for the particular user. For example, applications or other programs running on the particular user's devices can provide data describing sharing activities of the user, such as the occurrence of the user sharing images to other users over a network. Other user data can also be examined, e.g., locations visited by the user (e.g. as detected by GPS sensors on a device carried by the user), activities of the user as inferred by locations visited by the user, etc. Some implementations can use user data from various network services (e.g., internet services) such as photo collection and sharing services, email services, social networking services, and/or other network services that have data describing sharing activities of the particular user. In some examples, the sharing activities can include sending user content such as images, documents, video data, audio data, or other content to other users. Block 304 can examine the content for various factors, include detected content features (e.g., detected faces, objects, landscapes, landmarks, or other features in images).

In block 310, sharing patterns of the particular user are determined based on the results of examining sharing activities and other user activities in block 308. Sharing patterns of the particular user can be based on other users communicated with by the particular user, user data (preferences, geographic locations, etc.), historical user data, and/or user content (images shared, messages and other types of content sent and received, etc.). For example, sharing activities of the particular user can be correlated with the users to which the content was shared, the type of content that was shared, the type of content features depicted in shared images, the type of activity being performed by the user (or device) at the time of the sharing activities, and/or other characteristics of the user, device(s), or sharing activities. In some examples, a frequency of occurrence of sharing activities with particular characteristics of the user or user activities can be determined. In some implementations, the more frequent the sharing activity occurred, the greater the confidence or importance that can be assigned to that pattern (e.g., using a scale of confidence values or importance values). In some examples, block 310 can find correlations between sharing images and the type of content features (e.g., persons, landscapes, social gatherings, etc.) depicted in the image, and other correlations as described above for block 306.

In block 312, in some implementations, one or more sharing models can be built based on the sharing patterns determined in blocks 306 and 310 described above. Various techniques can be used to build predictive models based on the patterns that can provide an indication of how likely that a particular image will be shared by a user, or how likely that the user will share image(s) (regardless of the content features of the image). In some implementations, one or more sharing models can be built for a general user, and one or more different sharing models can be built for the particular user. Some implementations can combine the patterns from general users and from the particular user into a single sharing model. In some examples, some sharing models can indicate which other users are likely to be recipient users of a shared content item, e.g., having a likelihood greater than a threshold. In some implementations, a sharing model can provide an estimation such as a confidence or importance (e.g., indicated as a confidence score or importance score) of an image being shared. Some implementations of models can weight different factors differently, e.g., assign recency of previous sharing occurrences a higher weight than frequency of previous sharing occurrences, etc.

For example, characteristics related to a particular image can be determined by a device and input to the model, and the model can determine the likelihood that the image will be shared. These characteristics can include characteristics of the image, of the device used by the user, and/or of the user, e.g., as described by user data and other data. The characteristics can include the type(s) and descriptions (e.g., labels) of content features depicted in the image (e.g., tags added to images by users), the time and/or location the image was captured, metadata of the image, events occurring at the time of capture, frequency and recency of sharing other images and content by the particular user, etc.

In some examples, some sharing models can receive a particular image and current user or device characteristics and output a likelihood that the particular image will be shared at the current time by the particular user. In another example, if sharing patterns of the particular user indicate that the user tends to share images while traveling on a train or bus, and input data indicates that the user is currently traveling on a train, then a sharing model can output a likelihood of sharing for an image for the current time (e.g., to determine a suggested image to the user at the current time).

In some cases, a particular user may be a recipient user of a shared album that includes one or more images, and would like to see images of the particular user as suggestions to add to the existing shared album. Some models can determine a sharing likelihood for images based on the images that are included in the received shared album. For example, characteristics of the images of the shared album can be provided as inputs to the model. Images of the particular user can also be input to the model. The model can determine a likelihood that the images of the particular user will be added to the shared album by the particular user. In one example, sharing patterns may indicate that if the images included in a received shared album depict particular faces, then other images that depict at least one of those same faces and which were captured within a particular time window of the capture of the images in the shared album are likely to be added to the shared album. The model can provide a strong likelihood of sharing for images of the particular user that meet these conditions.

Some implementations can use multiple models. For example, one model can provide output based on patterns of general users, another model can provide output based on patterns of the particular user, and another model can provide output for the case of sharing images added to an existing shared album. Some implementations can assign different weights to different model results and combine the results. For example, particular user sharing patterns can be weighted higher than general user sharing patterns in determining a likelihood of sharing images.

In block 314, one or more models can be updated based on user actions. Block 314 can be performed at various times after creation of the models. The models can be updated based on user actions in response to prior suggested images for sharing (e.g., suggested images are described with respect to FIG. 4). In some examples, if a particular image is suggested to a user to share based on particular characteristics, and the user shares the suggested image, then the model relationship(s) that contributed to that result can be weighted higher. Similarly, if a suggested image is not shared by the user (e.g., within a particular time period after the suggestion), then the model relationship(s) contributing to the suggestion can be reduced in weight or influence. In some implementations, if a user rejects or does not select a suggested image, then similar suggestions to the rejected suggestion are not provided again under similar conditions, or are only provided again after a period of time.

Figure 4:
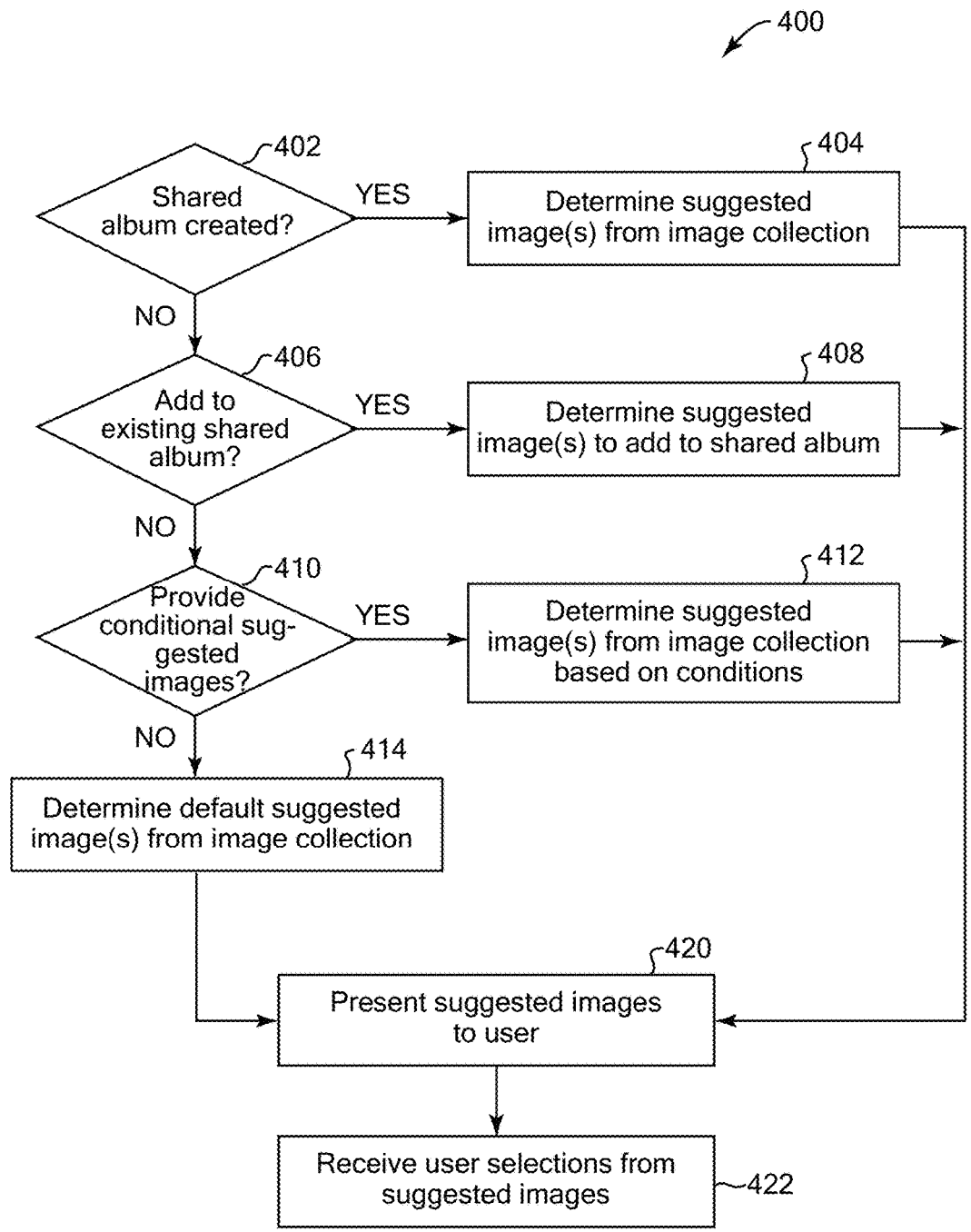
FIG. 4 is a flow diagram illustrating an example method to determine one or more images for sharing, according to some implementations.

FIG. 4 is a flow diagram illustrating an example method 400 to determine one or more images for sharing. In some implementations, method 400 can be used for block 206 of FIG. 2. Other methods can alternatively be used for block 206. User consent is obtained for use of user data as described above for blocks 202-205 of FIG. 2.

In block 402, it is determined whether a shared album is being created for the determined images. For example, if a shared album is being created, then the one or more determined images are to be the initial images in the shared album. For example, a user may be creating a shared album of images to share with other users. In some implementations, a shared album structure may have already been created and stored, e.g., in block 204 of FIG. 2. In other implementations, a shared album structure can be created after determination of the one or more images for sharing in method 400.

If a shared album is being created, block 404 is implemented, in which one or more suggested images are determined from a collection of images accessible by the user who is creating the shared album. For example, the user may own or have access to a number of photo albums or other albums of images and/or other content. The collection of images can be analyzed to determine which images should be suggested to the user for inclusion in the shared album. In some implementations, the collection of images can include images from multiple users (e.g., a group collection or company collection), or from one or more other sources.

The suggested images can be determined based on one or more of a variety of different factors. These factors can include characteristics of the images, including characteristics of the image content, e.g., content features depicted in the images. For example, if user consent has been obtained, features can include detected human faces, landmarks, landscape features, animals, and/or objects. Content features can be detected in images, if user consent has been obtained, using any of a variety of image recognition techniques, including facial recognition techniques that can examine image data for facial landmark features (e.g., eyes, nose, mouth, eyebrows, hair, teeth, etc.), human body recognition techniques examining for body features (arms, legs, head, torso, etc.), landmark recognition techniques, landscape recognition techniques examining for landscape features (e.g., blue sky, foliage, mountains, lakes, roads, buildings, bridges, etc.), object recognition techniques examining for a variety of types of objects (e.g., vehicles, devices, decorations, common household objects, etc.). Some image recognition techniques can compare image pixels and areas to reference patterns or images and/or use a variety of other techniques to detect types of content features in images. In some examples, method 400 can perform the image recognition techniques and/or send one or more images to a recognizer implemented on the device or a connected device, and receive recognition results from the recognizer. As an example, facial recognition techniques can detect a face in an image without determining the identity of the person who is depicted. For example, general facial features in the image can be detected to determine the position of a general face, without determining any person identity or characteristics or user data associated with the face. Some techniques can also provide detected estimated characteristics of detected features, such as whether a detected face is smiling or has another facial expression, an estimated age of a person based on skin analysis, etc.

The types of detected features can be used to evaluate whether images should be selected as suggested images for the created shared album. For example, a "sharing score" or "suggestion score" can be determined for and associated with an image to indicate the strength or suitability of the image as a suggested image, where a stronger or strengthened sharing score indicates greater suitability for sharing. In some implementations, sharing scores can be assigned a magnitude or value within a particular range of values, where one end of the range of values can be associated with increased suitability to be a suggested image. In some example implementations, one or more previously-created sharing models can be used to help determine suggested images for sharing, as described above with respect to FIG. 3. For example, a sharing model can provide a sharing score for a particular image in some implementations.

In this case of a newly-created shared album, the collection of images can be examined to find suggested images that depict content features relevant to current user or device characteristics and/or to a history of activities of the user creating the album. For example, current user or device characteristics can include a current chat or other communication activity with other user(s). This can cause images depicting content related to subjects in the current chat to have a higher sharing score than images not related to those subjects (e.g., labels of content features in images can also be examined). A current location and/or vacation status of the user/device can cause images depicting content features related to the current location or activity to be assigned a strengthened sharing score (e.g., a location of a tourist location, and the user is known to be on vacation from calendar user data or other user data, can cause images captured at that tourist location to have a strengthened sharing score). An application or other program currently being run on the user's device can cause images related to the application (or to data being processed or presented by the application) to have strengthened sharing scores than images not related to the application. For example, if an application on the device is displaying video content (e.g., movie) or a game application is being run on the device, then images related to the video content or game can be given strengthened sharing scores.

Images that the user is currently interested in can be assigned strengthened sharing scores. For example, images that the user has viewed frequently within a particular recent time period (e.g., the last week) can be assigned a strengthened sharing score than other images. Images that the user has labelled with descriptive labels can be similarly assigned strengthened sharing scores. Stored user preferences can indicate which images are strong sharing suggestions. Images depicting content that can be determined as "important" for the user can be assigned strengthened sharing scores. For example, important images of social or holiday events, having timestamps on a recognized holiday or a known vacation or event of the user (e.g., based on user calendar data), being captured at locations not in the normal routine of the user (e.g., not in areas near work and home), and other indicators can be used to determine whether an image is likely to be important to the user.

Past activities can also or alternatively be used to determine suggested images, as determined by historical user data. For example, images related (in content, location, time of capture, etc.) to particular past activities of the user may be given more importance, such as previous sharing activity, previous trips or vacations, social events with several other persons, communications with other users (chats, text messages, email, etc.), images depicting one or more types of features that were previously shared with any of those other users to have a strengthened sharing score. For example, a previous sharing of images depicting a particular person or other feature may have been previously shared by the user with other users at particular times of day. These characteristics can be examined to determine that different images having the same characteristics have a strengthened sharing score.

In some implementations, particular predefined characteristics can be associated with a weaker (e.g., smaller, worse, etc.) sharing score to images that have those characteristics to indicate less suitability for sharing. For example, frowning or other non-smiling faces or other facial expressions detected in an image can be associated with a weaker sharing score to that image. An image in the collection of images that is considered too similar to another image in that collection can be assigned a weaker similarity score (or can be ignored entirely), e.g., having a similarity score over a predefined threshold. The similarity score can be determined using one or more image similarity measurement techniques. In other examples, particular types of content can be associated with weaker sharing scores or score modifiers as indicated in stored user preferences, e.g., images that do not depict people, types of animals (insects, snakes, etc.), etc. In some implementations, the stored preferences of the user who created the shared album can control the assignment of weaker sharing score modifiers to images.

In some implementations, multiple factors and characteristics as described herein can be assigned individual sharing scores, and sharing scores from multiple different factors can be combined to provide a total sharing score for an image. For example, total sharing scores of images can be compared to determine which images should be suggested images, e.g., the images having the strongest (e.g., highest, best, etc.) total sharing scores.

Based on the described examination of images, one or more suggested images are selected from the collection of images. For example, images having the strongest (e.g., highest) sharing scores can be selected. In some implementations, a predetermined number or other particular number of suggested images are selected. Some implementations can provide images having a sharing score meeting a predefined score threshold. The method then continues to block 420, described below.

If a shared album is not being created as determined in block 402, then the method continues to block 406, where it is determined whether one or more images are to be added to an existing shared album. For example, the shared album may have been previously created and shared by the user, or the user (e.g., user account and/or one or more user devices) is a recipient user of the shared album that was created by a different user.

If images are to be added to an existing shared album, block 408 is implemented, in which suggested images are determined from the user's collection of images which are to be suggested to be added to the shared album. For example, the suggested images can have one or more similarities in characteristics to one or more images in the existing shared album. In some examples, images in the user's collection can be examined for similar image content to the content in the album images. For example, the shared album may include images depicting one or more persons, and images in the user's collection that are different from the images in the shared album and which also depict one or more of these persons can be assigned a strong sharing score to indicate a strong sharing suggestion. For example, to implement detection of the same persons in images, matches between faces in user images and faces in the album images can be determined without determining the identities of the persons depicted in the images. In some implementations, images that depict a greater number of the persons depicted in the shared album images can be assigned a stronger sharing score compared to images that depict fewer of the persons in the album images. Images that depict the user that created the shared album, or other users that are members of the shared album, can be assigned stronger sharing scores. Images that depict other types of similar features can also be assigned stronger sharing scores, e.g., particular objects indicating a common event (e.g., a sign having the same words, decorations indicating the same event, etc.). Other image metadata can also be examined to determine commonality between images to a particular event, such as geographic location and timestamp.

In some implementations, image content that is considered too similar to one or more images in the shared album can be assigned an average sharing score or be given a weakening (e.g., negative) score modifier. For example, user images that have a similarity score that meets a threshold when compared to album images, as determined by an image similarity measurement technique, can be considered undesirably similar. For example, this can avoid suggesting images that are too duplicative of (e.g., too similar in content to) images previously added to the existing shared album.

Some implementations can check images of the user's collection that have other similar characteristics to the images in the shared album. For example, images in the user's collection which have a time of capture that is similar to one or more of the album images can also be assigned a strengthened sharing score (e.g., a time of capture within a particular time range of the time of capture of the album images, such as 1 or 2 hours). Similarly, images in the user collection that have a similar location of capture to one or more of the album images (e.g., a location of capture within a particular radius of one or more locations of capture of the album images, e.g., 500 feet or 5 miles) can be assigned a strengthened sharing score. Images in the user's collection that depict content features that were discussed in user comments of the shared album can be assigned a stronger (strengthened) sharing score. Descriptive labels of the images that are similar to labels of one or more album images (e.g., have a high semantic similarity) can be assigned a strengthened sharing score. Other user data can be similarly examined for references to particular content that may be present in images of the collection of images.

In some implementations, a user's images that have a time of capture at a predetermined time relative to an album image can be provided a strengthened sharing score. For example, a user image that has a time of capture that is one year previous to the time of capture of image(s) in the album can be assigned a strengthened sharing score, since it may be likely that this image depicts the same type of event that happened one year previous (e.g., a previous birthday party, annual picnic, etc.). Other time periods can also be similarly examined for weekly events, monthly events, etc. In some implementations, additional similarities in these cases can also be examined to provide a stronger sharing score if those similarities are found. For example, the images may have the same or similar location of capture, have one or more of the same people present, etc.

In some implementations, the collection of user images can be examined to determine sharing scores and/or find suggested images similarly as described for block 404. For example, a sharing score for an image can be determined based on one or more factors described for block 404 as well as one or more factors described for block 408.

Based on the described examination of images, one or more suggested images are selected from the collection of images. For example, images having the strongest (e.g., highest) sharing scores can be selected. In some implementations, a predetermined number or other particular number of suggested images are selected. Some implementations can selected images having a sharing score meeting a predefined score threshold. The method then continues to block 420, described below.

If a sharing album has not been received as determined in block 406, then the method continues to block 410, where it is determined whether one or more automatic conditional image suggestions should be made. These can be image sharing suggestions provided even though the user has not instructed the creation of a shared album and is not adding images to an existing shared album. For example, the user may have indicated in stored user preferences or via other stored or input instructions that the user desires automatic suggestions of images for sharing, which are to be provided at times when one or more conditions (e.g., triggers) have occurred.

The conditions can take a wide variety of forms. For example, the user may have designated that suggested sharing images are to be provided at the user device at particular times, e.g., periodically such as once a week, once a month, etc. on a particular day, at a particular time of day, on particular holidays or other known recognized days, etc. The conditions can include particular conditional events that should take place, such as receiving messages, shared albums, or other user content from other users. The conditional events can include particular types of social events such as parties, birthdays, or other social gatherings. For example, the automatic suggestion can be made by the user device at a time after the device has determined that the event is over, e.g., based on the user determined to be traveling (or have traveled) away from the event location, the user arriving home, the next day arriving, etc.

The conditional events can include obtaining images by the user device. For example, obtaining images can include capturing images by the user with a camera on the user device (or with another camera in communication with the user device), e.g., where suggested images for sharing can be automatically provided by the user device when a predetermined time has expired after the last image was captured by the user. In another example, a conditional event can be obtaining an image on a user's client device from a different source, e.g., from another user over a network, from a server, etc. The conditions can include particular type(s) of content included in newly obtained images. For example, images having particular users, persons, or objects depicted can be provided in an automatic sharing suggestion (e.g., friends, objects indicating an event such as a birthday cake or Christmas tree, etc.). Conditions can include the user and user device arriving at a particular location or a type of location (e.g., home, vacation area, etc.). Conditions can include subjects mentioned in user comments made by the user, or other indications of user interest in an image as described above. Various multiple conditions as described above can also be combined to create more specific conditions to trigger automatic suggestions to be made.

If it is determined that an automatic suggestion should be provided, block 412 is implemented, in which suggested images are determined from the user's collection of images based on one or more conditions. In some implementations, these suggested images can be determined similarly as described above for a shared album newly created by the user. In some implementations, different images (or a different subset of images) can be suggested for automatically-triggered suggestions than for suggestions provided in response to user input selecting to create a shared album. For example, in some implementations, images suggested in block 404 for a user-created shared album can be based on current or past characteristics of the user or device, while images suggested in block 412 can be based on the predefined conditions that cause the automatic conditional suggestions to be provided (which in some cases may be similar to current characteristics used in block 404). For example, if the predefined conditions to cause automatic suggestions include obtaining images at a user device, then only those obtained images (or a subset of the obtained images) can be suggested for sharing. If the conditions include a particular conditional event, then only images related to the event can be suggested for sharing. The method then continues to block 420.

If automatic suggestions are not provided in block 410, e.g., because conditions for those suggestions have not been satisfied, then the method can proceed to block 414 in some implementations, in which default suggested images are determined from the image collection. For example, one or more images recently captured by the user can be default suggestions that can be presented to the user (e.g., in block 416) in a background display area or accessible window or menu on the user device, e.g., always available for sharing. Other implementations can provide no suggested images in block 414. The method then continues to block 420.

In block 420, the determined suggested images are presented to the user. For example, the suggested images can be displayed by a display device of the user device, e.g., a display screen, display projector, or other display device. Some implementations can provide a particular interface for viewing suggested images, some examples of which are described herein.

In block 422, user selections of one or more of the presented suggested images are received. For example, a user can select one or more of the suggested images using any of various forms of user input (touchscreen, voice input, motion input, etc.). The selected images are the determined images for sharing in the shared album. In some implementations, the user can also manually select particular images for sharing from the image collection, e.g., by browsing through the images in the collection.

If automatically-triggered suggested images were determined (e.g., in block 412), then user selections of one or more images may indicate that the user has agreed to share the selected images in a newly-created shared album. In such a case, a shared album is created, e.g., in block 422 or in a later block, similarly as described above for block 208. In some implementations, existing shared albums can also be checked to determine if the selected images are similar enough to the images in an existing shared album to be added to that existing shared album. Some implementations can prompt for and receive user input indicating an existing shared album to which to add the selected images.

Figure 5:
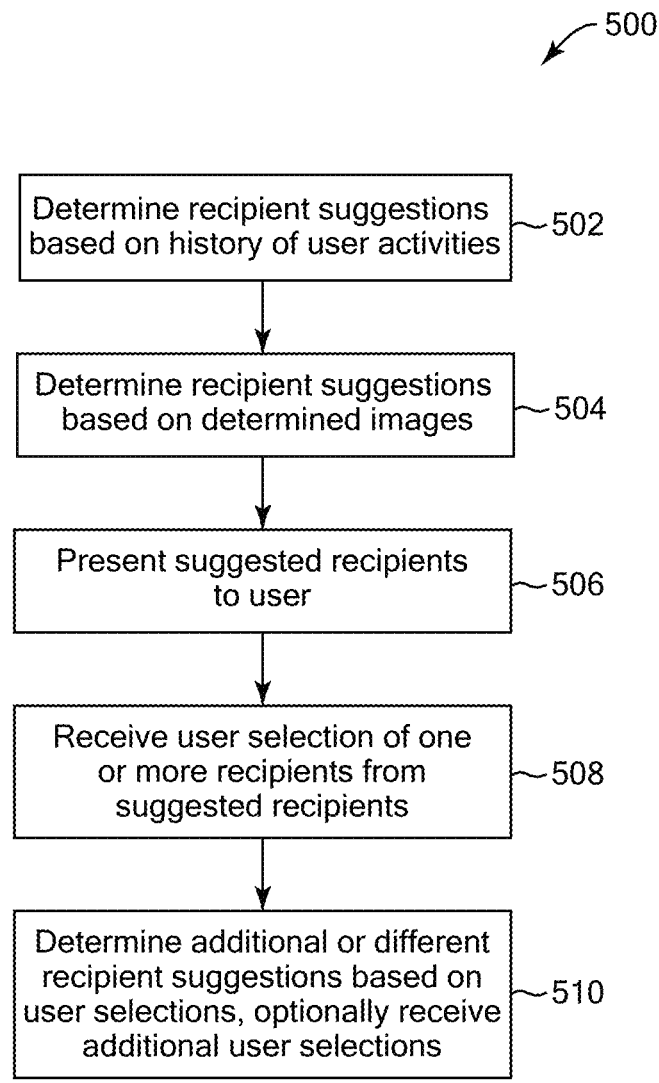
FIG. 5 is a flow diagram illustrating an example method to determine a set of recipient users to add to a shared album structure, according to some implementations.

FIG. 5 is a flow diagram illustrating an example method 500 to determine a set of recipient users to add to the shared album structure. In some implementations, method 500 can be used for block 208 of FIG. 2. Other methods can alternatively be used for block 208. User consent for use of user data is obtained as described above for blocks 202-205 of FIG. 2.

A recipient or recipient user as referred to in this method is a user who receives a shared album, e.g., receives a message, invitation, and/or shared album data allowing access of that user to the shared album. For example, the recipient user is added as a member of the shared album or is invited to join the shared album.

In some implementations, method 500 can be omitted if the shared album is an existing shared album to which the determined images are to be added. The existing shared album can include a number of user members or recipient users, including the shared album creator and users with which the creator user has shared the album. In some implementations of an existing shared album, recipient user suggestions can be determined in method 500 for a user as described below, and selected recipient users of these suggestions can be added to the existing recipient users (user members) of the existing shared album. In some implementations, recipient user suggestions can be automatically determined by the system and automatically added as recipient users to the shared album, e.g., without user intervention.

In block 502, recipient user suggestions are determined based on a history of user activities with user devices. In some implementations, various users can be evaluated to be suggested recipient users as indicated by a "recipient score" assigned to each examined recipient user, where a stronger score (e.g., higher score) indicates greater estimated suitability to be a recipient user (and a suggested recipient user). The examined users can be previous contacts of the sharing user, or can be users of a network service or other group of users. For example, the system can examine user interactions with other users via the user's devices communicating data with other user devices over a communication network, including prior sharing activities for images and other content, email messages, chat messages, text messages, comments, ratings, participation in device games by the user's devices and other users' devices, and other interactions. In some examples, the other users that the user has previously most frequently interacted with via the user's devices can be suggested recipient users for the shared album (or can be assigned a strengthened recipient score). In some implementations, the other users most frequently communicated with by the user's devices can be given a stronger recipient score. Some implementations can assign a strengthened recipient score to other users that most recently were in communications with the user's devices. In some implementations, frequency and recency of communications and other device activities can both provide adjustments to the recipient score, e.g., proportional adjustments based on the magnitude of frequency or recency, or particular adjustments if the frequency and/or recency magnitudes meet one or more predetermined thresholds.

In block 504, recipient user suggestions can be determined based on the one or more determined images to be shared in the shared album (and/or based on one or more album images in an existing shared album). For example, recipient users can be determined based on the content features of the determined images and/or other metadata of the images (geographic location of image capture, time of image capture, etc.). In some examples, stored user preferences may have been provided by the user, which may indicate desired recipient users for sharing based on particular types of content depicted in images. For example, the sharing user preferences may have indicated that images depicting vacation scenes and tourist areas are to be shared with particular users listed in the preferences. If the determined images have one or more content features of the type listed in such preferences, the associated recipient users listed in the preferences can be selected as suggested recipient users. Some implementations can determine recipient addresses of persons that are depicted in the determined images of block 210 (if user consent has been obtained by each of the persons depicted), and these persons can be provided as suggested recipient users.

Some implementations can combine factors involving previous user activities of block 502 with factors involving the determined images to be shared of block 504, to determine suggested recipient users. For example, if the user previously shared images depicting particular image features or a particular type of image features, and if any of those particular features or types of features are detected in the determined images, then the users who received the previous shared images can be determined to be suggested recipient users. In one example, it is determined that the user on numerous previous occasions has shared images of a baby with parent users. If one or more of the determined images of block 210 depicts the same baby (e.g., based on matching the face of the baby), then the parent recipient users can be provided as suggested recipient users.

In some implementations, one or more album images are provided in an existing shared album that has been shared with the user, and these album images can be used to determine one or more suggested recipient users to add to the existing shared album. For example, the system can determine one or more types of image features in one or more images of the shared album (e.g., monuments, landscape features, objects, persons, etc.) by processing image content and/or image metadata, and can determine whether the user has previously shared images having these same image types with other users (e.g., sent images to or received images from other users, or added other users to other shared albums having images depicting the same types of image features). The other users that have previously shared the same types of image features can be designated as suggested recipient users to be added to the shared album.

In block 506, the suggested recipient users determined in blocks 502 and/or 504 are presented to the user as suggested recipient users. For example, the suggested recipient users can be displayed in a list by a display device of the user device, e.g., a display screen, display projector, or other display device. Suggested recipient users (e.g., recipient candidates) can be displayed in an graphical interface of the device along with other recipient users indicated by user input, in some implementations.

In block 508, user selection of one or more of the presented suggested recipient users are received. For example, a user can select one or more of the suggested recipient users using any of various forms of user input (touchscreen, voice input, motion input, etc.). The selected recipient users are the determined recipient users for sharing the shared album. For example, the selected recipient users can be added to the created shared album structure as described above. The user can also provide user input to determine recipient users (user-provided recipient users). For example, the user can input a name of a recipient user. In some implementations, user input can include a name or a portion of name (e.g., as text, such as a contact name, account name, email address, phone number, etc.), and a stored set of recipient candidates can be searched for recipient names that match the input name or name portion. Matching names can be retrieved from storage and presented to the user in a list for selection by the user. In some implementations, the stored set of recipient candidates can include users in one or more contact lists, previous recipients of communications from the user, users of a network service, etc.

In block 510, additional or different recipient suggestions can be determined, or their presentation altered, based on one or more selections of suggested recipient users or other recipient users by the user in block 508 (and/or based on selections received at other times of method 200 or system operation). For example, if the user selects a particular recipient suggestion that matches a name input by the user, then other users that are related to this selected suggestion can be presented as suggested recipient users for additional possible selections by the user. In some examples, if the user selects a friend as a recipient user, other users can be presented as suggestions who are known to have been involved in the same past device communications or events that included the selected friend (if user consent has been obtained to determine such other users from user data and/or user images). In some implementations, blocks 510 and 508 can be performed in multiple such iterations, where the user selects a recipient suggestion (or otherwise selects a recipient user) in block 508 and additional or replacement recipient suggestions can be determined and presented in block 510.

Figure 6:
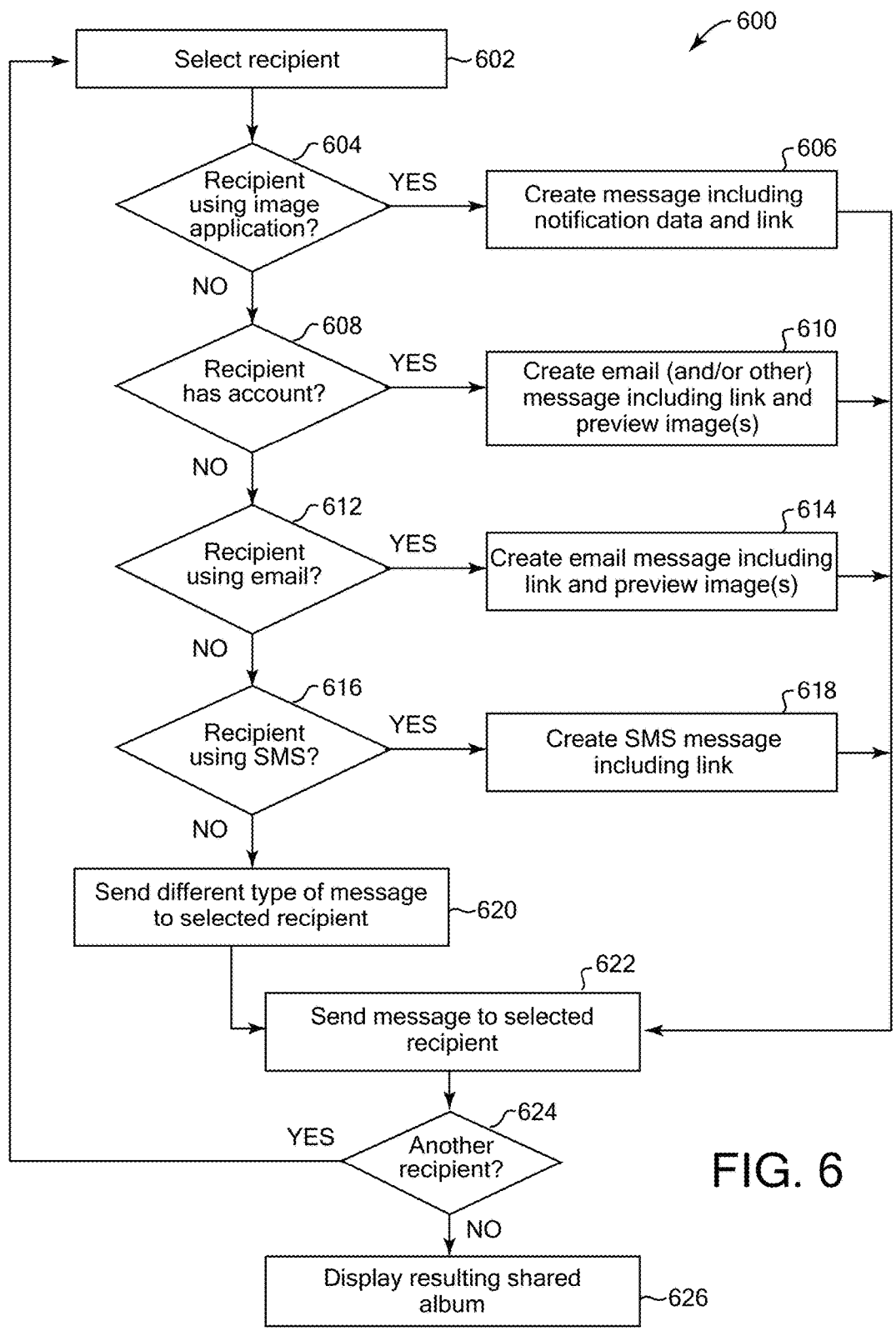
FIG. 6 is a flow diagram illustrating an example method to send a sharing message to recipient users of a shared album, according to some implementations.

FIG. 6 is a flow diagram illustrating an example method 600 to send a sharing message to recipient users of the shared album. In some implementations, method 600 can be used for block 212 of FIG. 2. Other methods can alternatively be used for block 212. User consent is obtained for use of user data as described above for blocks 202-205 of FIG. 2. In this example, one or more of the recipient users may be using different types of communication channels. In some implementations such as described below, the type of information included in a message to a recipient user using one type of communication channel can be different than the type of information included in a message to a recipient user using a different type of communication channel.

In some implementations, a recipient user may be referred to by multiple different recipient names used by the methods described herein. For example, a recipient user may have different names for different types of communication channels, e.g., an account name of "User1" and an email address name of "User1@service.com." In some implementations, each of these recipient names can be treated as a separate recipient user using a different communication channel. In some implementations, if information is obtained by the methods to indicate that multiple different recipient names refer to a single recipient user, then the recipient names can be consolidated to a single recipient name having one of the types, e.g., an account name for the network service in this example (or the single consolidated name type can be determined based on stored user preferences of the recipient user and/or the sending user, if available with user consent).

In block 602, one of the determined recipient users of the shared album is selected. In block 604, it is determined whether the selected recipient user is using a particular type of image management application intended for viewing the shared album. For example, the particular application (or other program) can be available to install and/or run on user devices and which allows several related functions for viewing and organizing images and other visual content in shared albums, some examples of which are described herein. In some examples, the application can allow a user to view and organize his own images, view images from other users, and create and view shared albums. In some implementations, this application can be installed on a user device if a user has an appropriate account in a particular network service. The particular network service can also be used by the sharing user. Via the account and network service, the sharing user's device can determine whether the selected recipient user has and/or is running the application on a recipient device.

If the selected recipient user is using the viewing application, then in block 606 the sending user device creates a sharing message that includes notification data and a link. The method then continues to block 622, described below. For example, the notification data can include a notification that is received by and displayed by the recipient device after receiving the message. The notification data can enable a "push" notification in some implementations, where the notification data is recognized by the recipient application (or other software) and causes the application to provide a notification to be displayed on the recipient device. For example, the notification can be an indication displayed on a display screen of the recipient device that a shared album has been shared with the recipient user.

The sharing message also can include a link that can be displayed by the recipient device, e.g., in the notification in some implementations. The link, when selected by the recipient user, causes the shared album images to be displayed by the recipient device in a shared album viewing interface of the image management application. In some implementations, this link can be a special type of link recognized by the application to display the shared album viewing interface of the application. For example, the shared album images can be downloaded from a server and displayed on a display screen of the recipient device in the shared album viewing interface. In addition, the application can determine whether any particular recipient user has selected the link to view the shared album in the viewing interface. Some example features of an example shared album viewing interface are described below with reference to FIGS. 15 and 18.

If the selected recipient user is not using the viewing application as determined in block 604, then the method continues to block 608, where it is determined if the selected recipient user has an account on a network service used by the user for sharing the shared album. In this case, the recipient user may have a user account name that is used by the recipient user, but does not have a viewing application (or other software) that recognizes notification data (similar to the notification data described above for block 606) to cause a notification to be displayed on the recipient device.

If the selected recipient user has such an account, then in block 610 the sending user device creates an email sharing message including a link and a preview, and/or creates one or more other types of account messages. For example, the email message can be addressed to an email account used by the recipient user, which can be an email account connected to the network service account in some implementations. The method then continues to block 622, described below. The recipient user can receive the email message similarly to other standard email messages, e.g., in response to the send message block 622 described below. Some implementations can check whether the recipient user is currently logged into the account, and if the recipient user is not currently logged in, will consider the recipient user an email recipient or other type of recipient user.

In some implementations, other types of account messages may be enabled by the network service account, allowing these other types of account messages to be created and sent in addition to or in place of the email message in block 610. For example, block 610 can include creating an account notification that can cause a notification or message to appear in one or more account services used by the recipient user. For example, the account notification can be different than the push notification recognized by the viewing application as described for block 606. Some implementations may provide the link in the other types of account messages.

In some implementations, the link included in the email message data (or other type of account message data) can be a web link to a shared album web page. This link can be a different type of link than the link provided to the viewing application recipient user described above for block 606. For example, in some implementations this link can be a standard web link as compared to a special link used by a viewing application as described above. In some implementations, this link in the message to the account recipient user can be a unique link, e.g., a unique Uniform Resource Locator (URL). Each unique link is different from the other unique links sent to other recipient users in method 600, even though they may all be links to the same shared album web page (e.g., for account, email, and SMS recipient users). The unique link allows a device (e.g., server device providing shared album functions) to detect when a particular recipient user selects the link to access the shared album web page, since that particular URL is not provided to any other recipient user.

Selection of the link by received user input from the recipient user on the recipient device causes a standard web page viewing application on the recipient device to be initiated, e.g., a web browser. The web browser application can download the album web page to be displayed on the recipient device. In some implementations, the album web page can include album information such as the content of the album (e.g., one or more images and/or videos in full resolution or greater resolution than preview images). Some implementations can also display a list of member users of the album on the album web page. For example, all the recipient users in the set of recipient users determined for the shared album can be displayed, as well as other users that have joined the album. In some implementations, various functions are available to the recipient user in the image management application which are related to the shared album described above, and some of these functions are not available to the account recipient user viewing the album web page, e.g., in a browser application.

The email message (or other message) created for the account recipient user in block 610 can also include one or more preview images of the album images. The preview images can be displayed in the email message, e.g., displayed on the recipient device when the email message (or other type of account message) is opened by the recipient user on the recipient device. For example, the preview images can be lower-resolution images or "thumbnails" that give an idea of the content of one or more images of the shared album. In some implementations, the preview images can be provided as a HTML preview included in an HTML email message, e.g., references or pointers to the preview image data can be included in the email message, where the pointers cause or enable the actual image data to be downloaded from a server device to the recipient device in response to the email message being displayed by a device. In some implementations, a subset or predetermined number of the album images are included as preview images in the account message. In some examples, a predefined number of images of the shared album, e.g., three, can be selected to be downsampled to a lower resolution and included in the account message. In some implementations, these can be the three images having the strongest (e.g., highest) sharing scores or having other known high relevancy to the recipient user or to the shared album.

In some implementations, an "install application" control (e.g., button or link) can also be included in message data sent to the recipient user (e.g., included in a single message or included in a message sent to the recipient user separately from the notification and preview images). Alternatively or additionally, the install control can be included and displayed in the shared album web page accessed using the link. When selected by the recipient user on the recipient device, this control causes the image application described in block 606 to be downloaded and installed on the recipient device, thereby allowing the shared album viewing interface of the viewing application to be used by the recipient user to view the shared album. In some implementations, this install control can be displayed prior to any join control (described below), or alternatively can be displayed simultaneously or after the join control.

If the selected recipient user does not have an account on the network service as determined in block 608 (or is not logged into an account in some implementations), then the method continues to block 612, where it is determined if the selected recipient user uses an email communication channel. For example, the recipient name that is being utilized in the methods described herein can include or be associated with a standard email address such as "User1@example.com." This can indicate that the recipient user uses an email communication channel.

If the selected recipient user is using an email communication channel, then in block 614 the sending user device creates an email message including a link and a preview. For example, the email message can be addressed to the email address that is the selected recipient user's name. The method then continues to block 622, described below. The recipient user can receive the email message similarly to other standard email messages, e.g., in response to the send message block 622 described below.

Similarly as described above for the account recipient user of block 610, the email message for the email recipient user created in block 614 can include a link to an album view, such as a web link to an album web page or similar displayed view. In some implementations, this link can be similar to the link used in the message to an account user as described above. For example, the link can be a unique URL enabling a device to determine when the recipient user has viewed the shared album web page. Selection of the link by received user input from the recipient user on the recipient device causes a standard web page viewing application on the recipient device to be initiated, such as a web browser application. The browser downloads the album web page, which is displayed on the recipient device. In various implementations, the album web page can include album information such as the content of the album (e.g., one or more images and/or videos in full resolution or greater resolution than preview images), a member list of the album, etc. In some implementations, the album web page viewed by the email recipient user does not include various functions available to the recipient user of a viewing application of block 606, examples of which are described below.

The email message created for the email recipient user in block 614 can also include one or more preview images of the album images. The preview images can be displayed in the email message, e.g., displayed on the recipient device when the email message is opened and displayed by the recipient user on the recipient device. The preview images can be similar to the preview images described above, e.g., a subset of lower-resolution images or "thumbnails" of selected shared album images.

In some implementations, a "sign up" and/or "install viewing application" control (e.g., button or link) can also be included in the email message data sent to the recipient user, and/or can be included and displayed in the shared album web page accessed using the link. When the "sign up" control is selected by the recipient user on the recipient device, the recipient device can display a sign up interface for the recipient user to create an account on the network service used by the shared album. Similarly, the install control can cause the image management application described in block 606 to be downloaded and installed on the recipient device, allowing the shared album viewing interface of the application to be used by the recipient user to view the shared album. In some implementations, the application can only be installed on the recipient device if an account for the recipient user exists on the network service.

If the selected recipient user is not using an email address as determined in block 612, then the method continues to block 616, where it is determined if the selected recipient user uses a phone communication channel, e.g., a Short Message Service (SMS) communication channel. For example, the recipient name that is being utilized in the methods described herein may be a standard telephone number. In some implementations this can indicate that the recipient user uses an SMS communication channel, which is a standard channel used by most mobile phones. Other techniques can also be used to determine whether the selected recipient user is using an SMS communication channel (e.g., if recipient user consent has been obtained, checking contact information or other known recipient user information to determine whether the phone number is for a cell phone or land line, where a land line phone may not have SMS capability).

If the selected recipient user is using an SMS communication channel, then in block 618 the sending user device creates an SMS sharing message including a link. For example, the SMS message can be addressed to the phone number that is the selected recipient's name. The method then continues to block 622, described below. The recipient user can receive the SMS message similarly to other standard SMS messages, e.g., in response to the send message block 622 described below.

Similarly as described above for the email recipient user of block 614, the SMS message for the SMS recipient user created in block 618 can include a link to an album view, such as a web link to an album web page or similar displayed view. In some implementations, this link can be different than the link used in the message to an account recipient user or to an email recipient user as described above. For example, the link can be a short link, e.g., a short URL that links to a web page that in turn links to the album web page having a standard (long) URL, e.g., to reduce the amount of data send via SMS. In some implementations, the link can be a unique URL enabling a device to determine if and when the SMS recipient user has viewed the shared album web page.

Selection of the link by received user input from the recipient user on the recipient device causes a standard web page viewing application on the recipient device to be initiated, such as a web browser application. The browser downloads the shared album web page and that web page is displayed on the recipient device. In various implementations, the album web page can include album information such as the content of the album (e.g., one or more images and/or videos in full resolution or greater resolution than preview images), a member list of the album, etc. In some implementations, the album web page viewed by the SMS recipient user does not include various functions available to the recipient user of an application of block 606, as described below.

In various implementations, a preview is not included in the SMS message. In some implementations, a "sign up" control and/or "install application" control (e.g., button or link) can also be included in the SMS message data sent to the recipient user, and/or can be included and displayed in the shared album web page accessed using the link. For example, these controls can be similarly provided as described above for the email message of block 614.

If the selected recipient user is not using an SMS address as determined in block 616, then the method continues to block 620, then a different type of message can be created for the selected recipient user if the type of communication channel used by the recipient user is known. If no communication channel is known for the recipient user, no message is created in method 600. The method then continues to block 622.

Block 622 can be performed after creating a message for the selected recipient user in any of blocks 606, 610, 614, 618, or 620 as described above. In block 622, the message is sent to the selected recipient user over the communication channel associated with the selected recipient user. For example, the message is sent over the communication networks to be received by the recipient device of the selected recipient user, and the recipient device performs appropriate functions in response according to the communication channel and software (e.g., displays a notification, provides the message in a list of messages, etc.).

In block 624, it is determined if there is another recipient user to receive a message. If so, block 602 is performed to select another recipient user to which to send a message for the shared album. If all recipient users have been sent messages and there is not another recipient in block 624, then in some implementations, block 626 is performed in which the resulting shared album can be displayed for the sharing user. For example, the shared images can be displayed in a shared album viewing interface using an image viewing application on the user device for the sharing user's review. In some implementations, the sharing user can provide user input at any time to instruct the user device to display and modify the shared album (e.g., its data and structure).

In some implementations, if the user is adding the determined images to an existing shared album, the determined images can be added to the shared album without sending the messages described above. In some implementations, messages can be sent to the members of the shared album, e.g., to indicate an update to the shared album.

In some implementations, the recipient users can be automatically added as member users of the shared album by being selected as recipient users. In various other implementations, a recipient user is not automatically caused to be a member user of the shared album. For example, a "join" button or other control can be included in the message sent to the recipient user, and/or can be included in the shared album viewing interface or shared album web page that is displayed in response to a link being selected by the recipient user. If the join control is selected by the recipient user, the recipient user is added as a member (e.g., added to the member list) for the shared album. In some implementations, only recipient users using particular types of communication channels, such as account, email and SMS, can be provided with a join control, while recipient users of other types of communication channels (e.g., image management application) can be automatically added as a member of the shared album by being selected as a recipient user.

In some implementations, one or more controls for user selection can be displayed based on the type of device used by a recipient user. For example, if a particular recipient device is a mobile device having a smaller display screen, then the "install application" control can be prioritized in the message sent to that recipient device. This can allow the image management application to be first downloaded before the shared album images are viewed, e.g., to provide a more suitable viewing experience to a mobile device using the application rather than a general web browser.

Figure 7:
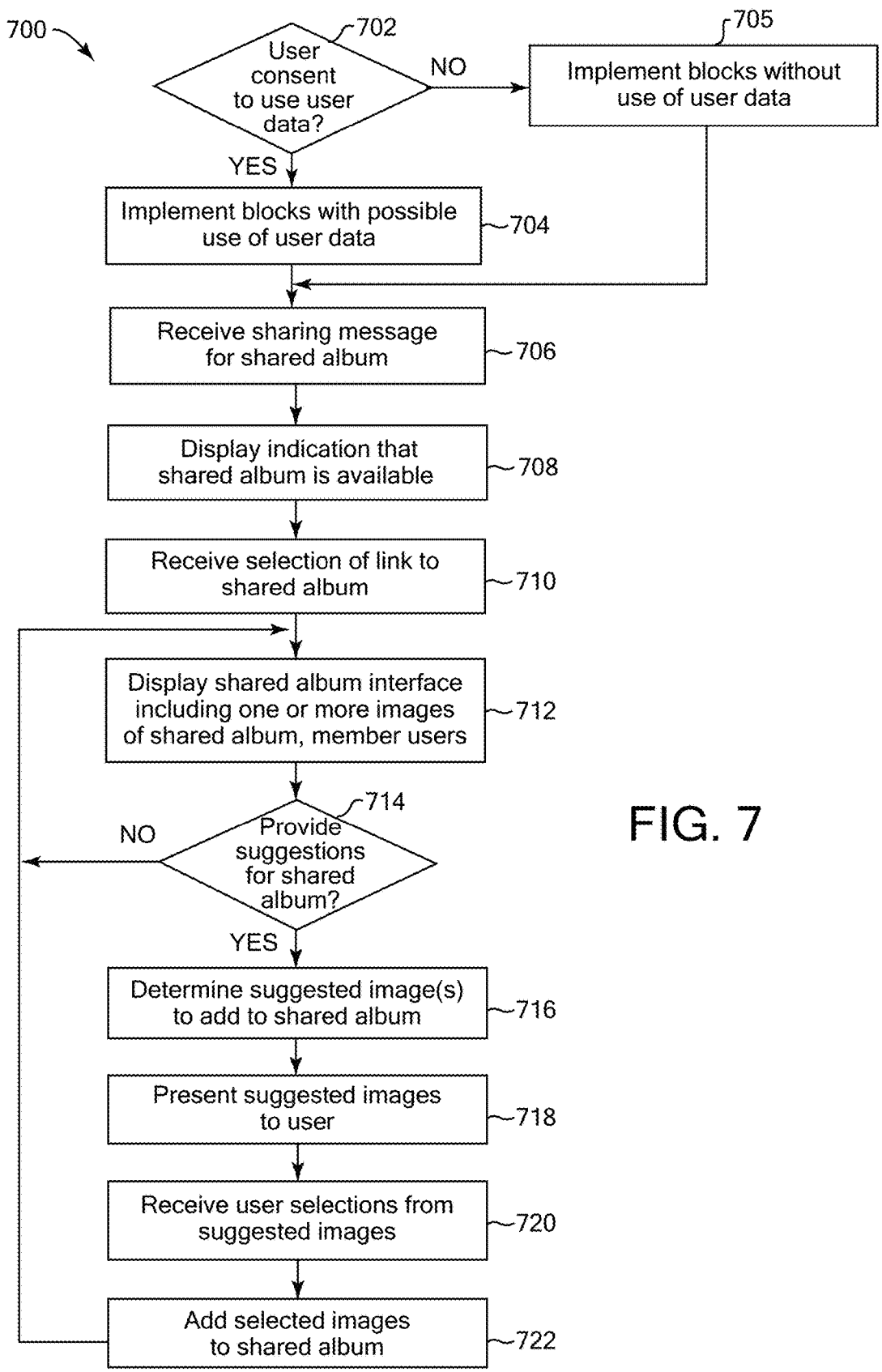
FIG. 7 is a flow diagram illustrating an example method to receive, display, and/or edit a shared album using a device, according to some implementations.

FIG. 7 is a flow diagram illustrating a method 700 to receive, display, and/or edit a shared album using a device. Method 700 can be performed by a server device and/or client device. In some examples, method 700 can be performed by a recipient device that receives a message from a sending device providing access to a shared album, e.g., an example of which is described above for FIG. 2. Some portions of method 700 can be performed at any time to display and/or edit a shared album, and do not need to be performed, e.g., in response to receiving a message providing access or update to a shared album.

In block 702, it is checked whether user consent (e.g., user permission) has been obtained to use user data in the implementation of method 700. For example, user data can include user preferences, user biometric information, user characteristics (identity, name, age, gender, profession, etc.), information about a user's social network and contacts, social and other types of actions and activities, content, ratings, and opinions created or submitted by a user, a user's current location, historical user data, etc. One or more blocks of the methods described herein may use such user data in some implementations. If user consent has been obtained from the relevant users for which user data may be used in the method 700, then in block 704, it is determined that the blocks of the methods herein can be implemented with possible use of user data as described for those blocks, and the method continues to block 706. If user consent has not been obtained, it is determined in block 705 that blocks are to be implemented without use of user data, and the method continues to block 706. In some implementations, if user consent has not been obtained, blocks are to be implemented without use of user data and with generic or publicly-usable data.

In block 706, a sharing message is received from a device. For example, a recipient device can receive a sharing message sent by a sharing user device to enable access of the recipient device to an existing shared album, where examples of the message are described above with reference to FIGS. 2 and 6. In various examples, the sharing message can be a notification message for a viewing application that may be installed on the recipient device. The sharing message can be an email message or other account message for a recipient device having (e.g., logged into) an account for a network service used by the shared album and sending device. The sharing message can be an email message for a recipient device receiving emails at a particular email address. The sharing message can be an SMS message for a recipient device receiving messages at a particular phone number.

In block 708, in response to receiving the sharing message, an indication is caused to be displayed on the device, indicating that the shared album is available for access by the recipient device. For example, the indication can be a notification displayed on a display screen of the recipient device, and/or can be an audio, haptic, or other notification. In some examples, if the recipient device has the image management application installed, the application can cause a notification to be displayed that provides a link to a shared album viewing interface as described above. In other examples, if the recipient device is logged into an account for the network service, the received email message can be opened (e.g., based on user input from the recipient user) to display a link to a shared album web page and/or one or more preview images can be displayed (e.g., using pointers in the email pointing to image data downloaded to the receiving device, or by providing the preview image data in the message). Other standard account notifications can also be provided, e.g., a notification in a header of a graphical interface. Similarly, if the recipient device received a standard email message as an email recipient user, the received email message can be opened (e.g., based on user input from the recipient user) to display a link to a shared album web page and/or one or more preview images can be displayed. If the recipient device received an SMS message, the received SMS message can be opened (e.g., based on user input from the recipient user) to display a link to a shared album web page.

In block 710, selection of a link to the shared album is received, e.g., where the selection is provided based on user input received by the device from the device user. For example, the user can select a displayed link provided in the received message.

In block 712, a shared album interface is displayed on a display device of the recipient device in response to the selection of the link. For example, a device using the image management application can display a shared album viewing interface that displays the images of the shared album. A device that provided a link to a shared album web page can display the shared album web page in a browser of the recipient device, where the web page displays the images of the shared album.

The shared album interface displays one or more images of the shared album. In some examples, all the images of the shared album can be displayed via user input, e.g., by scrolling images into and out of the view of the display, displaying different pages of content showing own or more images on each page, etc. The image data for one or more the images of the shared album can be retrieved over a communication network, e.g., from one or more other devices such as server devices or client devices. For example, the image data for images contributed by other users to the shared album may be stored remotely from the recipient device. In some cases or implementations, one or more of the images may have its image data stored locally on the recipient device, e.g., images contributed to the shared album by the recipient user.

In addition, one or more members of the shared album are displayed in the shared album interface, including a view status of each member. For example, a list of members can be displayed in a shared album interface in which the images are being displayed. The list of members can include each recipient user of the shared album as described herein. The list of members can also include users that "joined" the shared album as a member, e.g., by sending a request to the album creator, receiving a link from a non-creator member, or other method without receiving a sharing message from the album creator user. The members can be displayed as text names, graphical images, icons, or avatars (if available), or in other forms.

The view status of the album members indicates whether each member user has accessed and viewed one or more images of the shared album. In some implementations, this view status can be determined based on information directly provided by an image management application as to whether the member user (e.g., recipient user) has opened the album in the shared album viewing interface. For example, view status data for each member user can be stored in the shared album data structure and provided to the recipient device over a communication network from a different device. In some implementations, view status of member users that did not use a viewing application can be determined and stored using unique links as described above. In various implementations, the member users that have viewed the shared album can be displayed differently than member users that have not viewed the shared album. For example, users that have viewed the album can be displayed in different color, highlight, additional text, bold or underlined text, etc. than the other users.

The shared album interface also can display member content contributions for the shared album. Member content contributions are provided by members of the album and can include text comments, other media comments, ratings, emoticons, and/or other contributions associated with particular images of the shared album or associated with the entire album. For example, such contributions can be added by members by selecting associated controls displayed in the shared album interface and providing the content via user input. In some implementations, only particular members may be able to provide contributions to the album. For example, users that view the shared album with the shared album viewing interface in the image management application may be able to perform all functions, including adding content contributions. Other users that view the shared album without using the application (e.g., as a web page) can be restricted from providing content contributions to the shared album. Users that are not members of the shared album can be restricted from viewing and/or providing content contributions to the album.

In addition, other controls can be displayed in the shared album interface to allow functions and/or manipulation of the shared album. In some examples, a member user can select appropriate controls to download one or more images of the shared album to the device over a network. Controls can allow a member user to add associated content contributions to the shared album as described above (e.g., comments, ratings, etc.). Controls can allow a member user to add additional images to the shared album, e.g., upload images from one source to a device (e.g., server device, client device, or other device) that stores the shared album. Controls, e.g., controls, can allow a member user to add additional members to the album. User input can designate one or more users (e.g., by specifying user addresses, account names, etc.) to be added to the shared album. For example, a member user who has been added to the shared album via an add member control can be sent a sharing message as described above.

In some implementations, particular member users may specifically be able to access one or more of these functions while other member users may not be able to access one or more of the functions depending on the type of communication channel used to receive the sharing message. For example, if the recipient device is running an image management application as described above (or, in some implementations, if the device has the image management application installed in its memory), then controls in the shared album interface can be enabled and available to perform functions including inputting content contribution data to a displayed shared album and to individual album images within the shared album such as comments and/or ratings (e.g., approvals/disapprovals, numerical ratings, etc.), adding images associated with the user to the shared album (e.g., selecting locally-stored images to have identifications of these images added to the shared album data structure), downloading album images to the user's own account or device, and inviting other users to view the shared album and/or join the shared album as a member user (e.g., send an invite to a user address or name). A communication channel using the image management application can also be enabled to receive notifications about changes made to the shared album by other member users.

In contrast, if the recipient device received the sharing message via a different type of communication channel than the image management application, one or more of these functions of the shared album interface can be disabled or otherwise disallowed for the user. For example, if an email communication channel was used, then all of the functions described above can be disabled (e.g., inputting content contributions, adding images to the shared album, downloading album images, and inviting other users). In some implementations, some types of communication channels can also have other functions disabled, such as the notifications of updates to the shared album.

In block 714, it is determined whether to provide suggested images from the recipient user's image collection which are suitable to add to the received shared album. For example, the recipient user can provide input instructing that the device display suggested images. In some implementations, the device can automatically provide suggested images suitable for the shared album in response to receiving the shared album, and/or in response to one or more predefined conditions occurring, e.g., similarly as described above for FIG. 4. If suggested images are not to be provided at the current time, the method can continue to display the shared album interface in block 712.

If suggested images are to be provided, block 716 is implemented, in which suggested images are determined from the recipient user's collection of images which are to be suggested to be added to the shared album. These suggested images can be determined similarly to the suggested images determined in block 408 of FIG. 4. For example, the suggested images can have one or more similarities in characteristics to one or more images in the shared album.

In block 718, the determined suggested images are presented to the user. For example, the suggested images can be displayed by a display device of the recipient device. Some implementations can provide a particular interface for viewing suggested images, some examples of which are described herein. In block 720, user selections of one or more of the presented suggested images are received. The selected images are the determined images for sharing in the shared album. In some implementations, the user can also manually select particular images for sharing from the image collection, e.g., by browsing through the images in the collection.

In block 722, the selected images are added to the shared album. For example, after the user selects a sharing command, pointers or other references to the selected images can be sent to a device storing the shared album structure for the shared album and stored in the structure, or image data itself can be stored in the structure. In some implementations, messages are sent to members of the shared album to indicate that the shared album has been updated. For example, the messages can include notifications, links, and/or preview images of the added images similarly as described above. Some implementations can then return to block 712 to display the shared album interface.

In some implementations, additional users can be added as members to a shared album by a member of the album. In some examples, if the user to be added has an account and has the image management application installed, then the user can be added directly using the controls of the shared album viewing interface of the application. In some implementations, a member user can send a link for the shared album to another user via standard communication channels, e.g., email or SMS. The other user can follow the link to display the shared album web page, where an option to join the album is provided. In some implementations, the other user can request to join the album by selecting such an option. The creator user of the album can be sent the request and be given the ability to add the requesting user to the album as a member. In some implementations, if a sent link to another user is a unique link (e.g., unique URL), and the other user uses the sent unique link, the server and/or creator user can determine which original recipient user sent the link to the other user.

Various blocks and operations of methods 200-700 can be performed in a different order than shown and/or at least partially simultaneously, where appropriate. For example, some implementations can perform blocks of the methods at various times and/or based on events not related to providing an image for display. In some implementations, blocks can occur multiple times, in a different order, and/or at different times or stages in the methods.

In some implementations, the methods 200-700 can be implemented, for example, on a server system (e.g., server system 102 shown in FIG. 1). In some implementations, one or more client devices (e.g., client devices shown in FIG. 1) can perform one or more blocks instead of or in addition to a server system performing those blocks. For example, images and other data of shared albums can be stored on a server device and sent to client devices, or can be stored on other client devices, etc.

FIGS. 8-26 are diagrammatic illustrations related to graphical interfaces and examples of providing and using shared albums using one or more features described herein. The images depicted in these examples can be digital photographs originally captured by a camera or similar types of images, for example. In some implementations, the interfaces and images shown in FIGS. 8-26 can be displayed by a display device (e.g., display screen) of a user device such as a client device 120, 122, 124, and/or 126 of FIG. 1, or a server system 102 in some implementations. In some examples, the user device can be a mobile device (cell phone, smartphone, tablet device, wearable device, etc.), laptop computer, etc., or can be a larger device, e.g., desktop computer, etc.

FIG. 8 shows an example of an image display and selection interface 800 which can be used by a user to view and select images for sharing. In this example, the user device displays interface 800 in response to determining that a user has selected to create a shared album, e.g., based on user input received in a different interface (e.g., selecting a create button or providing another command). Images 802 are displayed in interface 800 as suggested images to share with other users. Additional images can be displayed (if present) by scrolling the images on the screen, etc.

In this example, images 802 includes images that are suggested by the user device for the user to share. As described above with respect to FIGS. 3 and 4, images can be suggested based on any of a variety of different factors. In this example, the images include photos 804 captured by the user at a particular location within the last hour, where that location has been determined to be a park (e.g., using GPS coordinates and/or detection of outdoor features in the images). In addition, facial detection techniques have determined that many different people are at the location, and thus a social event is likely taking place. Images captured at social events can be provided with strong sharing scores, providing them with high ranking as images to suggest for sharing. In addition, object detection techniques may be able to determine that objects such as people holding drinks and food, tables with lots of items, and amusement activities such as people on slides are present in images captured at the same location, further indicating a social event that is suitable for image sharing.

Additional images can also be suggested. For example, images 806 captured within the last week and depicting multiple people can be considered good candidates for suggesting for sharing, since a social event is likely indicated. Additional images can also be suggested, such as the images captured by the user within a particular time period, e.g., the last month.

In FIG. 9, interface 800 is shown after the user has selected one of the suggested images 902, as indicated by the selection symbol 904. In some implementations, the user can select images in the interface 800 by touching the display of an image to be selected on a touchscreen. Other forms of user input can also be used, e.g., voice commands, input devices (e.g., joystick, stylus, mouse, etc.), motion commands or orientation commands (e.g., by moving the user device in physical space as detected by motion sensors such as accelerometers and/or gyroscopes, or moving the device to a particular spatial orientation), etc.

After selecting the image 902, the user selects the sharing control 906 which has been displayed in response to the user selecting one or more images. The selection of this control 906 commands the device to share the selected image(s). In other implementations, other types of user input can indicate to share the selected image (voice command, motion command, etc). In some implementations, the selection of control 906 or other command to share selected images causes a shared album structure to be stored in memory or other storage accessible to the device, as described above.

FIG. 10 shows an example of a recipient display and selection interface 1000 which can be displayed by the user device for a user to view and allowing selection of recipient users to share images (or other types of user content). In this example, the interface 1000 is displayed in response to the user selecting the share control 906 in image selection interface 800. In various implementations, interface 1000 can be displayed in response to other selections and/or conditions.

Interface 1000 allows a user to indicate which users are to be the recipient users of the shared album. For example, in some implementations, recipient users are able to access and view the images of the shared album as member users of the shared album. An address field 1001 can receive user input that specifies one or more particular recipient users for the shared album.

Interface 1000 also displays a list or set of suggested recipient users (recipient candidates) 1002, any or all of which can be selected by user input as suggested recipient users for a shared album that includes the images selected in interface 800. In this example, each suggested recipient user 1002 is associated with a different communication channel (e.g., different communication modality). For example, suggested recipient user 1004 can be using an email address that is displayed next to a name of the recipient user (e.g., where the name can be retrieved from a stored contact list, or associated with an email account or the email address). An icon 1006 (or other type of indicator, e.g., text) can indicate the communication channel determined by the device for the suggested recipient user 1004. Similarly, suggested recipient user 1008 has a displayed email address for a user account on the same network service as the user creating the shared album, and an icon 1010 indicates a detected communication channel of an image management application that has been installed on the recipient device(s) of suggested recipient user 1008. Suggested recipient user 1012 has a phone number displayed next to the contact name of the recipient user and an icon 1014 indicates a detected SMS communication channel for suggested recipient user 1012 to communicate SMS text messages by the cell phone of the suggested recipient user 1012. Suggested recipient user 1016 has a displayed email address for a user account on the same network service as the user creating the shared album, and an icon 1018 indicates a detected communication channel of a user account on the same network service as the user creating the shared album, with no (sharing-compatible) installed image management application detected for the recipient user 1016. Additional suggested recipient users can also be displayed.

In this example, the suggested recipient users 1002 have been determined to be potentially relevant to the selected sharing task of the user (which is sharing the selected image 902 in a shared album). Suggested recipient users can be determined as described above in FIG. 5, in some implementations. For example, the suggested recipient users 1002 can be users known from historical communications of the sharing user and may have been involved in previous user communications, e.g., previous sharing of user content (as sources or recipients of previous sharing activities), emails, chat sessions, text messages, postings on each other's social network activity streams or accounts, ratings of each other's content or contributions, etc.

In some examples, some suggested recipient users can be determined based on the images selected for sharing and/or based on stored user preferences. In one example, the user may have previously shared images with particular users, where those images depicted a social event similarly to the image 902, and/or were captured at a similar location as image 902. These same users can be included in the list of suggested recipient users 1002. In another example, the sharing user may have indicated in stored preferences data that particular users are to be suggested as recipient users when sharing images depicting a particular feature or associated with particular metadata, e.g., a social event, a particular type of object, a particular geographic location of capturing the image, a particular time or date of capturing the image, etc.

In FIG. 11, the user has input a portion of a recipient user's name in the address field 1001 of recipient interface 1000. This causes the user device to display a list of suggested recipient users 1102 that have a recipient name matching the portion of the name input by the user. The suggested recipient users 1102 can be matched from a larger set of possible suggested recipient users, e.g., all the users that have communicated with the user, or all of the users available on a network service used by the user, etc.

As shown in the example of FIG. 11, a single user is associated with each of the suggested recipient users 1102, where a different communication channel is used by each different suggested recipient name. For example, the user associated with the suggested recipient names has access to an image management application channel, an SMS communication channel, and an email communication channel. Some implementations can combine these separate recipient names into a single recipient name (e.g., the image management application name) if the user device has access to information indicating that the different recipient names belong to the same user. For example, information in an accessible contacts database can provide associations between these different channel address/names and a particular user name.

Figure 12:
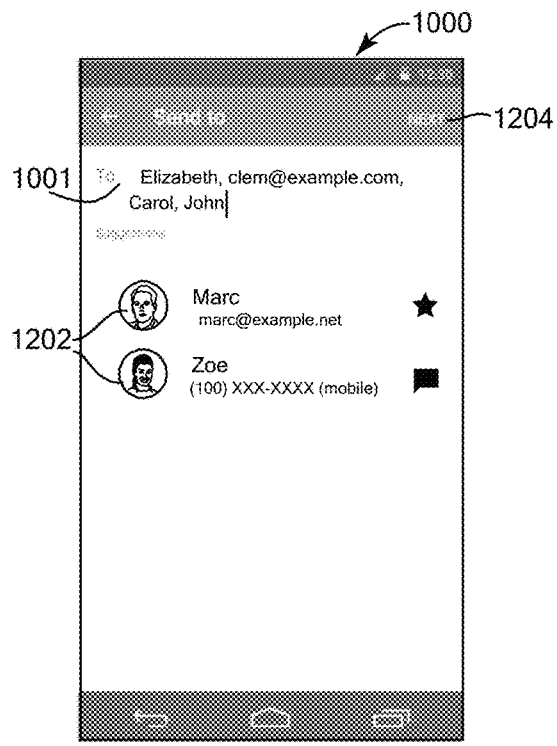

In FIG. 12, the user has added several recipient names to the set of recipient users for the shared album using recipient interface 1000. The selected recipient users are displayed in the address field 1001. For example, the recipient users may have been selected from a suggestion list and/or added to the set of recipient users directly by the user inputting recipient names (or portions of recipient names as in FIG. 11). In this example, the interface 1000 can display additional suggested recipient users 1202 that have been determined by the device based on one or more of the selected recipient users indicated in address field 1001. For example, the additional suggested recipient users 1202 may have been included in previous sharing activities and/or other communications of the sharing user with one or more of the other recipient users already selected by the sharing user and displayed in address field 1001. In some examples, the additional suggested recipient users 1202 may have been included as recipient users in a previous sharing of images by the sharing user that included the additional suggested recipient users 1202 as well as all of the selected recipient users in address field 1001. In some implementations, the additional suggested recipient users 1202 may have been included in a previous sharing of images by the sharing user for similar types of image content features as in the currently-selected images to share. In this example, suggested recipient users 1202 were included as recipient users for previous shared albums by the sharing user.

Interface 1000 can also include a "next" control 1204 that, when selected by user input, indicates that the user desires to display the next interface screen in the process of sharing (e.g., publishing) the shared album.

Figure 13:
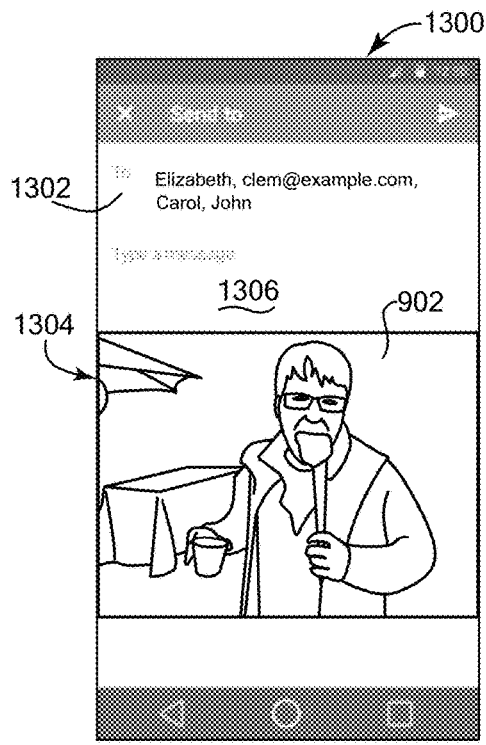
FIGS. 13 and 14 are diagrammatic illustrations of examples of a sharing interface allowing a sharing user to input user content for the shared album and to send the shared album, according to some implementations.

FIG. 13 shows an example of a sharing interface 1300 which can be provided by the user device to allow the sharing user to input or indicate associated user content for the shared album and to provide a sharing (e.g., sending) function for the shared album. In this example, the interface 1300 can be displayed in response to the user selecting the "next" control 1204 of interface 1000 as shown in FIG. 12. Interface 1300 can be displayed in response to other selections and conditions.

Interface 1300 displays the selected recipient users for the shared album in an address field 1302. The selected image 902 to be included in the shared album is displayed in a display area 1304 of the interface 1300. If multiple images are selected to be shared, multiple images can be displayed in display area 1304. In addition, a message field 1306 can be included in interface 1300 to receive user input that provides a message associated with the shared album that is being created or added to by the selected image 902. The input message can be displayed at recipient devices in notifications or in other accesses of the shared album by album member users.

Figure 14:
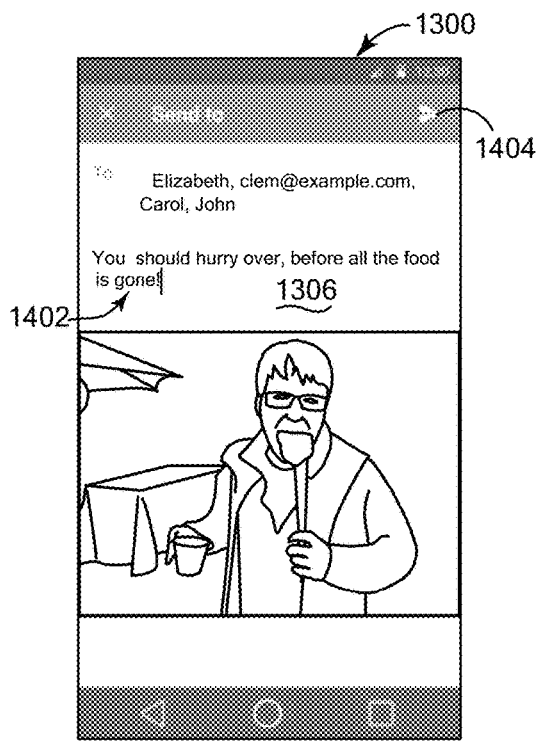

In FIG. 14, the sharing user has input a message 1402 in the message field 1306. The user also has the option to select a send control 1404 provided in the interface 1300. The send control 1404 causes the shared album to become available to the recipient users. For example, the user device sends out a message to each of the recipient users to indicate that the shared album is accessible for their viewing, examples of which are described above.

Figure 15:
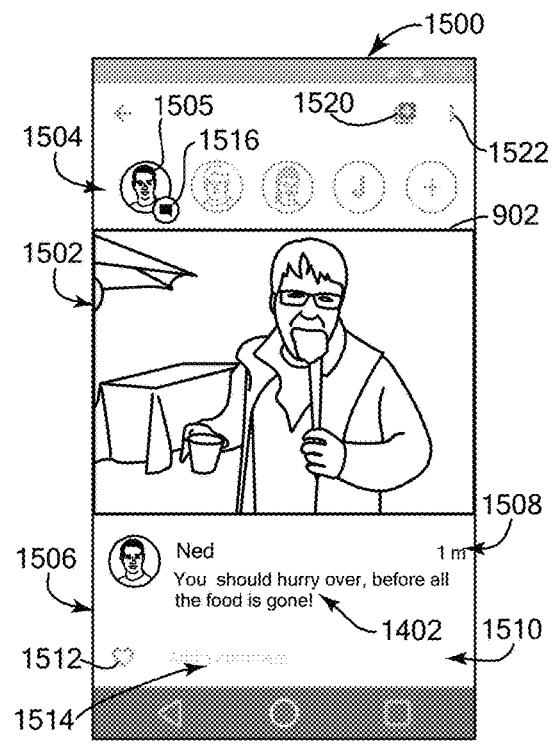
FIG. 15 is a diagrammatic illustration of an example of a shared album viewing interface allowing viewing of images of a shared album, according to some implementations.

FIG. 15 shows an example of a shared album viewing interface 1500 that can be used to view the images and other content of a shared album. In this example, the sharing user has accessed the viewing interface 1500 after sending the shared album using the send control 1404 of FIG. 14. The viewing interface 1500 can be provided by an image management application running on the sharing user's device, in some implementations.

Viewing interface 1500 includes an image display area 1502 in which one or more images of the shared album are displayed. In this example, there is currently one image 902 included in the shared album. Other types of content that are included in the shared album can also be displayed in image display area 1502, e.g., videos, documents, etc. Viewing interface 1500 also includes a member display area 1504 in which indications of member users of the shared album are displayed. In this example, graphical photos, icons, or avatars representing the album member users are displayed as member identifiers. Other implementations can display text names or other identifiers of member users. The member users of the shared album have access to viewing the shared album (at a minimum) and are, initially, the sharing/creator user 1505 (e.g., owner of the shared album) and the recipient users of a shared album (e.g., the recipient users shown in the address field 1302 of interface 1300 of FIG. 13 in this example). Additional users besides the initial recipient users of a created shared album can also be added as members to the shared album by the owner user or recipient users, in various implementations.

In this example interface 1500, album member users in the member display area 1504 can be shown with additional status information associated with the member users, where the status information is related to the shared album. For example, the member indicator for a member user can be displayed in a reduced-visibility form, e.g., "grayed out," to indicate that the member user has not yet viewed the shared album, e.g., has not yet accessed the shared album by displaying at least one album image on a device of the member user in a viewing interface 1500, a web page interface or browser, or other interface as described below. Other visual indications can alternatively be used to indicate such a non-viewing status of member users. In some implementations, a non-viewing status is indicated for a member if the member has not accessed one or more images of the shared album, e.g., has not viewed one or more images in the album in an accessed interface of an application such as an image management application or a browser. In some implementations, viewing preview images displayed in an email message of an email application, for example, may not cause the member user to be changed from non-viewing status to viewing status. After the member user has viewed the shared album, the associated member indicator can be displayed as having viewing status, e.g., displayed having full visibility (as shown by sharing user 1505), or can be highlighted in some manner to distinguish it from non-viewing status (e.g., a different color, brightness, etc.). The device can obtain the viewing status of a member user based on receiving information over a network indicating user access to the shared album, e.g., via an image management application running on the member user's device, selection of unique web page links displayed on the member user's device, etc. The owner user indicator can be always displayed in full visibility, as shown here for indicator 1505.

Viewing interface 1500 also includes a user content display area 1506. User contributions such as user comments, ratings, attachments, or other data can be displayed in area 1506. In this example, display area 1506 displays the message 1402 input by the sharing user in interface 1300 as shown in FIG. 14. A displayed time 1508 can be related to when the message was contributed, e.g., the amount of time in the past that the message was created relative to the current time.

User content display area 1506 can also include a contribution area 1510, which in this example can include a rating control 1512 and a comment field 1514. For example, a user can select the rating control 1512 to provide a favorable rating toward the shared album from that user (e.g., indicating liking the shared album). In some implementations, other ratings can also or alternatively be provided by rating control 1512 (e.g., dislikes, neutral ratings, etc.). Some implementations can provide individual ratings for each image in the shared album. A user can input a comment in comment field 1514 to provide another comment for the shared album or for an individual image of the shared album, e.g., similar to comment 1402. Other data from member users can also be associated with the shared album in other implementations.

In this example, additional status information can be displayed for member users of the shared album. For example, a member user that has input a comment to the shared album has a comment status indicator 1516 (e.g., icon or other indicator) displayed on or near his or her member indicator in the member display area 1504. Other indicators can be used in other implementations. In this example, the member indicator of the owner user of the shared album is provided with a comment status indicator 1516 displayed nearby. Other displayed status indicators for indicating other statuses are described below.

Interface 1500 can include other controls and functions. For example, an add button 1520 can be selected to allow the user to add more content to the shared album, including more images or other types of content (e.g., videos, documents, etc.). An application functions control 1522 can allow access to other functions of the image management application, e.g., options, settings, assistants, etc., some examples of which are described herein.

Figure 16:
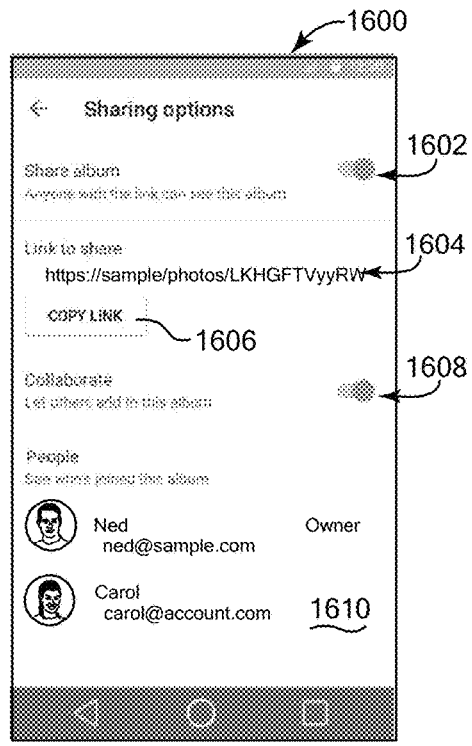
FIG. 16 is a diagrammatic illustration of an example of a sharing options interface, according to some implementations.

FIG. 16 shows an example of a sharing options interface 1600 that can be displayed for an owner user of a shared album (e.g., the sharing user in the examples above). Interface 1600 can be displayed in response to receiving a selection or command from the owner user. The sharing options interface 1600 can provide options controlling access to and control of the associated shared album by member users (other than the owner user). In this example, options interface 1600 includes a link share option 1602, where the owner user can select whether any user receiving a link to the shared album can access and view the shared album contents. For example, some implementations allow a member of the shared album to send a link for the album to other users that were not sent the shared album by the owner user (e.g., at the creation of the shared album). These other users can follow the link to access the shared album, e.g., view a shared album interface via an application or a web page as described in examples herein. This ability of other users to access the shared album can be disabled by toggling the link share option 602. In some implementations, an option can be provided to disallow all sharing of the album to other users by member users other than the owner user.

Sharing options interface 1600 also can include a specification of a link 1604 that can be sent to other users to enable the other users to access and view the shared album. For example, as described above, the link 1604 can be a web page link (e.g., URL) allowing a user to access a web page interface. Some implementations allow such a new user to request joining the shared album as a member, e.g., by selecting a join control in a web page interface. The copy link control 1606, when selected by a user, can cause the link to be copied into memory of the user device so that it can be later transmitted to another user, e.g., written or "pasted" into an email message, an SMS message, a chat session, or a different form of message.

Interface 1600 can also include a collaborate control 1608 that allows a user to select whether member users can add their own images to the shared album. A negative setting of the control 1608 disallows member users from adding images, although in some implementations the member users can still add contributions, e.g., comments, ratings, etc. to the shared album. Interface 1600 can also include a member user display area 1610 which can display all of the current members of the shared album.

Figure 17:
FIG. 17 is a diagrammatic illustration of an example of a notification display indicating access to a shared album, according to some implementations.

FIG. 17 shows an example of a notification display 1700 that can be provided on a recipient device to indicate access to a shared album. For example, display 1700 can be displayed on a mobile device when the mobile device has been inactive or unused by a recipient user, and the device is activated. In this example, the recipient device receives a message from the user device of the owner user that created a shared album as described above for FIGS. 8-14. In this example, since the recipient device has an appropriate image management application installed, the message includes a notification of a shared album, and the image management application (or other application in communication with the image management application) causes a notification 1702 to be displayed on the display 1700. In this example, the notification includes an indication that the sending user (owner user, in this example) has used an instance of the image management application ("Photos App") to share images in a shared album, and an indication of how many images are shared. A time of creation of the shared album (or time of the sharing of one or more photos) can also be displayed in the notification.

In some implementations, a recipient user can select the displayed notification 1702 to cause the device to display the shared album.

Figure 18:
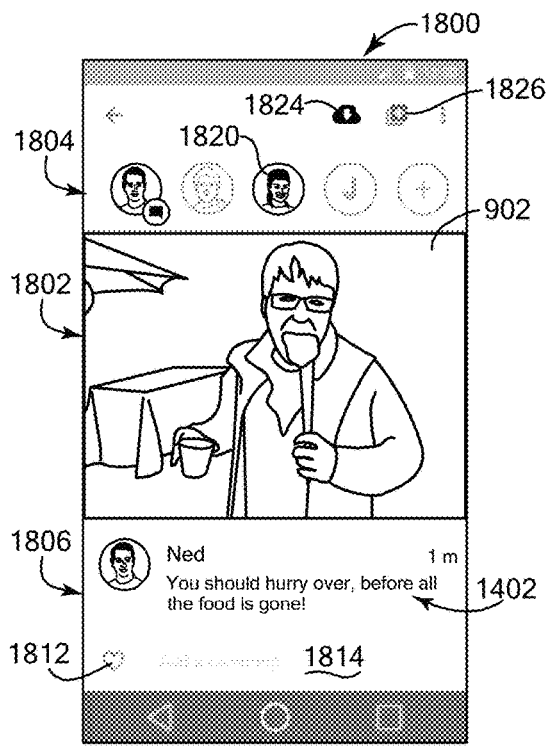
FIGS. 18 and 19 are diagrammatic illustrations of examples of a displayed shared album interface, according to some implementations.

FIG. 18 shows an example of a displayed shared album interface 1800 which can be similar to the shared album interface 1500 described above with reference to FIG. 15. In this example, interface 1800 is provided by an application installed on the recipient device, e.g., an image management application. The interface 1800 can be displayed, for example, in response to a recipient user selecting a notification or link that has been received in a message from the owner user to enable access to the shared album, such as selection of notification 1702 shown in FIG. 17.

Interface 1800 includes an image display area 1802 that displays the images (and/or other content) of the shared album (including image 902 in this example), a member display area 1804 that displays the shared album member users, and a user content display area 1806 that displays and allows input of member user contributions to the shared album, e.g., comments input in comment field 1814 and a rating selected via rating control 1812. In this example, user content display area 1806 includes the comment 1402 provided by the owner user as described for FIG. 14. In this example, the recipient user has viewed the shared album and so her member indicator 1820 is displayed having full visibility or is highlighted, indicating she has viewed the shared album.

Interface 1800 can include a download control 1824. If selected by the recipient user, this allows one or more of the images and/or comments of the shared album to be downloaded to the recipient device from a device or storage storing the images. An add control 1826 allows the recipient user to add images (or other types of content) to the shared album.

Figure 19:
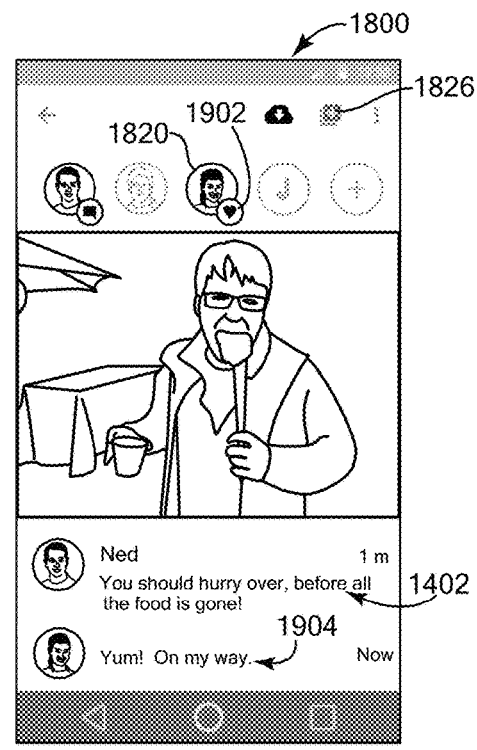

In the example of FIG. 19, the recipient user has input user contributions to the shared album using shared album interface 1800. For example, the recipient user has selected the rating control 1812 (shown in FIG. 18) to provide a positive rating for the shared album. In response, the interface 1800 displays a status indicator 1902 as associated with the member indicator 1820, to indicate that the associated member user has rated the shared album. In addition, the recipient user has input a comment 1904 in the comment field 1814 (shown in FIG. 18). In response, the interface 1800 displays the input comment 1904 in a sequence after existing message 1402. All member users of the shared album can view the ratings and comments input by the recipient user in this example.

Figure 20:
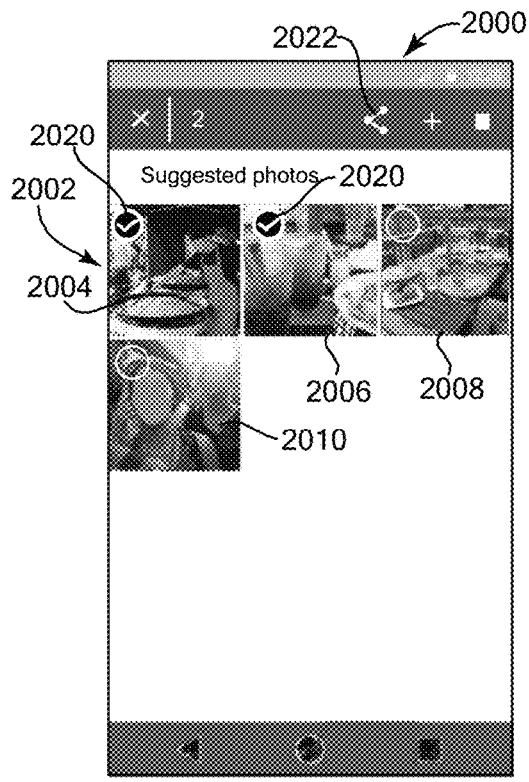
FIG. 20 is a diagrammatic illustration of an example of an image display and selection interface allowing a user to select images to be included in a shared album, according to some implementations.

FIG. 20 shows an example of an image display and selection interface 2000 allowing a user to select images (or other types of content) to be included in a shared album. For example, interface 2000 can be similar to interface 800 described above for FIG. 8. In this example, the recipient user has provided input to the interface 1800 of FIG. 18 to indicate that she would like to add images to the displayed shared album. For example, the recipient user can select the add control 1826 shown in FIG. 18. In response, interface 2000 can be displayed on the recipient device. In some implementations, a prompt or notification asking the recipient user to add images to the shared album can be automatically displayed by the recipient device, e.g., based on one or more predefined conditions (e.g., in response to receiving a shared album or update to a shared album, in response to the recipient device capturing and/or storing one or more new images, etc.).

Interface 2000 can display one or more suggested images 2002 for selection by the user. For example, suggested images can be retrieved from a collection of images accessible to the user. In this example, the suggested images can be obtained from one or more user albums and other collections of the recipient user, e.g., stored in one or more storage areas available to the user (e.g., local devices and storage, remote network storage, network service accounts, etc.). For example, images captured by the recipient device (or other camera device) and stored on the recipient device can be included in the collection of images.

For a recipient user that has received access to a shared album created by a different owner user, suggested images can be determined by the device based on one or more factors described above for an owner user (e.g., with respect to FIG. 8). In addition, suggested images can be determined based on one or more characteristics of the received shared album. These characteristics can include the images of the shared album, and/or the member users of the shared album. For example, the suggested images for a recipient user can be related to the characteristics of one or more images in the shared album, e.g., the content features depicted in the images of the shared album, time and/or location of capture of the images in the album, and/or can be related to the owner user that created the shared album and/or other recipient users (or other members) of the shared album. Suggested images can also be based on other factors as described above with respect to FIGS. 3, 4, and 8.

In the example of FIG. 20, the shared album includes an image 902 (shown in FIG. 18) that has metadata including a timestamp indicating time of capture, and/or location data indicating a geographical location at which the image was captured (e.g., provided by GPS sensors of the camera device capturing the image, or manually input by a user). The recipient device (and/or other connected devices, e.g., one or more other client devices or server devices) can determine suggested images 2002 based on this information. For example, images captured by the recipient device at approximately the same time as album image 902 (e.g., within a threshold time range of the capture of image 902, e.g., 2 hours) can have a stronger sharing score to indicate increased suitability as a suggested image. Similarly, images captured by the recipient device at approximately the same location as image 902 can have a stronger sharing score (e.g., within a threshold distance range of the capture location of image 902).

The content of the album image 902 can also be examined to help determine suggested images for the recipient user. For example, image 902 has been determined by the device(s) to be related to social gatherings, e.g., due to detecting multiple people in the image, a person eating food or drinking, etc. For example, image 902 has been determined by the device(s) to be possibly related to parties due to a detected drink in the hand of a person depicted in the image and/or other features (e.g., geographic location of capture). Thus, the device(s) can examine the images in the collection of the recipient user to find images that are also related to social gatherings and/or parties.

In this example, the recipient device has determined that one image 2004 has a similar geographic location and/or timestamp as image 902 (due to being captured by the recipient user at the same event). This indicates that image 2004 is likely to be a photo taken at the same event as image 902, and is assigned a very high sharing score and included in suggested images 2002. Another suggested image 2006 has a similar location, but has a timestamp approximately one year earlier than image 902, indicating that image 2006 may depict a possible previous instance of an annual event and thus receiving a high sharing score. Other suggested images 2008 and 2010 may not have a similar location and/or timestamp, but were found to depict content related to the content of the album image 902 (e.g., social gatherings, party setting, etc.). In this example, the images can be displayed in an order reflecting their sharing scores, e.g., images having the strongest sharing scores displayed first in a left-to-right, top-to-bottom order.

In the example of FIG. 20, the recipient user has selected two suggested images 2004 and 2006 to add to the shared album, as indicated by selection symbols 2020. The user can indicate to share these selected images by selecting a particular control, e.g., sharing control 2022.

Figure 21:
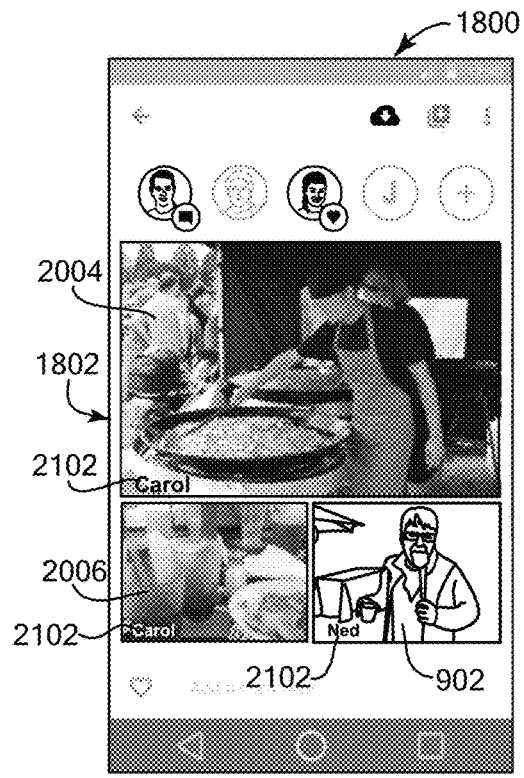
FIG. 21 is a diagrammatic illustration of an example of a shared album interface after images selected by the recipient user have been added to the shared album, according to some implementations.

FIG. 21 shows an example of the shared album interface 1800 after the images selected by the recipient user as shown in FIG. 20 have been added to the shared album. The images 2004 and 2006 added by the recipient user are displayed in the image display area 1802 of the interface 1800. The images can be displayed in various visual layouts. Images that cannot fit on the display screen can be accessed via scrolling, selection of controls, etc.

Each displayed image can also have a label 2102 added by the interface 1800, e.g., on a corner area or other side area of the image. Each label 2102 indicates the member user that contributed the associated image, e.g., a name of the member user.

In some implementations, a member user that has added images to the shared album can be designated with an added image status indicator indicating that the member has added photos. For example, icon 2304 of FIG. 23 can be used for the added image status indicator.

Figure 22:
FIG. 22 is a diagrammatic illustration of an example of a shared album summary interface that can be displayed on a user device, according to some implementations.

FIG. 22 shows an example of a shared album summary interface 2200 that can be displayed on a user device, e.g., as instructed by a user. Interface 2200 can present a summary listing of the shared albums of which the user is currently a member. For example, each entry 2202 can summarize information about a particular shared album, e.g., a title of the shared album (which can be input by the album owner), the member users, the time/day it was created or last modified by any member user, a representative image selected from the images in the album, etc. In various examples, the representative image can be selected as the most recently captured image, the image most recently-added to the shared album, the most highly rated image by member users, or based on other criteria. In some implementations, the user can select any of the displayed entries to cause the shared album interface 1800 for the selected album to be displayed on the device.

Figure 23:
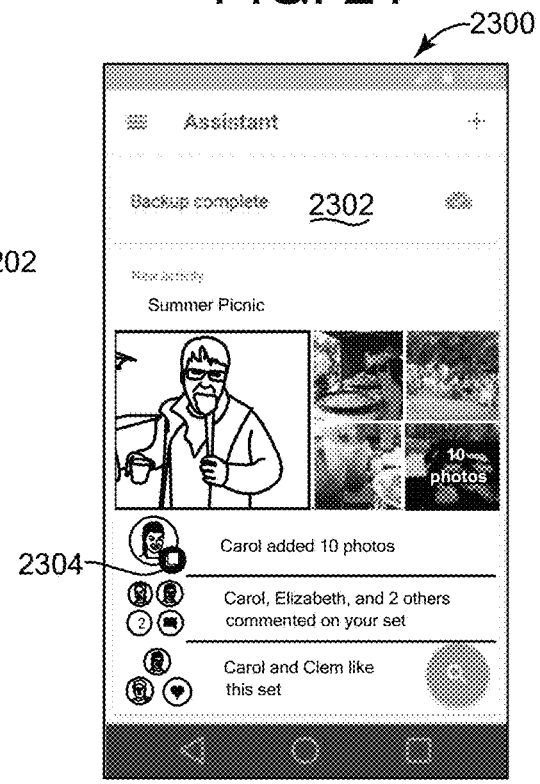
FIG. 23 is a diagrammatic illustration of an example of an assistant interface that can provide notifications and summary information related to shared albums, according to some implementations.

FIG. 23 shows an example of an assistant interface 2300 that can provide notifications and summary information to a user related to shared albums. For example, interface 2300 can be available on a user device in conjunction with an image management application and shared album interface 1800. Interface 2300 can notify the user of a variety of device tasks, including backing up captured images from a recipient client device to a server device over a network (as indicated by notification 2302). Interface 2300 can also summarize recent events, including the creation of a shared album. In this example, interface 2300 displays a subset of sample images from the shared album and includes the ability to display all of the images via user selection. The interface 2300 also displays summarization information indicating how many images were added to the shared album by which member users, the member users that have commented on a shared album, and the member users that have positively rated the shared album. A status icon 2304 can indicate a member user that has added images to the shared album, for example. In some implementations, interface 2300 can be presented as a "card" that summarizes one shared album, where other cards can be displayed to each summarize a respective associated shared album.

FIG. 24 shows an example of a user interface 2400 displayed on a device that has received and displayed an email message that indicates a received shared album. The recipient user in this example uses an email communication channel. The email message provides access to the shared album by the recipient user of the device. In this example, the recipient device has received an email with the title 2402 to indicate that an email related to a shared album is received. After receiving user input selecting the title 2402, the device displays the contents of the email message in interface 2400. The email display indicates transmission information including the sender user 2404, recipient user 2406, and date of transmission 2408.

Interface 2400 also displays a link 2410. For example, the link can be a link to a web page that includes a display of all of the images of the shared album. Interface 2400 also can display one or more preview images 2412 selected from the shared album. For example, the preview images can be an HTML preview displayable in an email application program. In some implementations, the preview images can be selected as representative images from the shared album, e.g., based on predefined criteria (some examples of which are described above for FIG. 23). Some implementations can provide the preview images also as the link to viewing the entire album, instead of displaying a separate link 2410.

In some implementations, an account user (that does not have the image management application installed) can view similar information from a received email message for a shared album. In addition or alternatively, an account user may view shared album notifications and links in other displayed interface features specific to the account. For example, the account may provide selectable flashing indicators, pop up windows, etc.

FIG. 25 shows an example shared album web page 2500 which can be displayed in response to an email recipient user selecting a received link for a shared album. In this example, the recipient user has selected the link 2410 shown in FIG. 24. This causes a browser application to be run on the recipient device, e.g., a web browser. The web browser application downloads the image data and other data describing the shared album, which has been formatted into a web page for purposes of the download. The web browser displays the shared album as a web page on the recipient device.

The displayed web page 2500 can include one or more images 2502 of the shared album, with a control 2504 to allow additional images of the shared album to be displayed. A list of member users 2506 can also be displayed in the web page 2500. The viewing status of these member users can also be displayed in the web page 2500. In this example implementation, the user accessing the web page cannot add images to the shared album and cannot add other user contributions to the shared album, e.g., comments and ratings, via the web page 2500. For example, the user can install the image management application to perform these functions in the shared album interface. Some implementations can display a link or other control (not shown) in the web page 2500 (or in the email of FIG. 24) that, when selected by a user, causes a download and install of the image management application on the user device. In other implementations, a user interface for the web browser displaying web page 2500 can allow addition of images, comments, and/or ratings, etc. to the shared album.

In some implementations, the user viewing web page 2500 can be considered a member user of the shared album by receiving the email message shown in FIG. 24. A member user indicator for the viewing user is thus displayed in the list of member users 2506 shown in web page 2500, and this indicator is fully displayed to indicate the user has viewed the shared album. In some implementations, the recipient user is not considered a member user of the shared album until explicitly requesting to join. For example, web page 2500 can include a join control 2510 that, when selected by the user, causes the user to become a user member of the album. In some implementations, selection of join control 2510 does not automatically cause the user to become a member user of the shared album. For example, selection of the control 2510 causes a join request to be sent to the owner user for the shared album (e.g., via email or other communication channel), who then grants the request to cause the user to become a member user, or denies the request so that the user does not become a user member.

FIG. 26 shows an example of a user interface 2600 displayed on a device that has received and displayed an SMS message that indicates a received shared album. The recipient user in this example uses an SMS communication channel. The SMS message provides access to the shared album by the recipient user of the device. In this example, the recipient device has received an SMS message that is displayed as a description 2602 to indicate that a shared album is accessible. A link 2604 is included in the SMS message and is also displayed. The interface 2600 also indicates transmission information including the date of transmission 2606.

The recipient user can select the link 2604 to cause a browser application, e.g., web browser, to be run on the recipient device. The web browser application downloads the image data and other data describing the shared album, which has been formatted into a web page for purposes of the download. The web browser can display the shared album as a web page on the recipient device. For example, a web page 2500 can be displayed as described above for FIG. 25.

Figure 27:
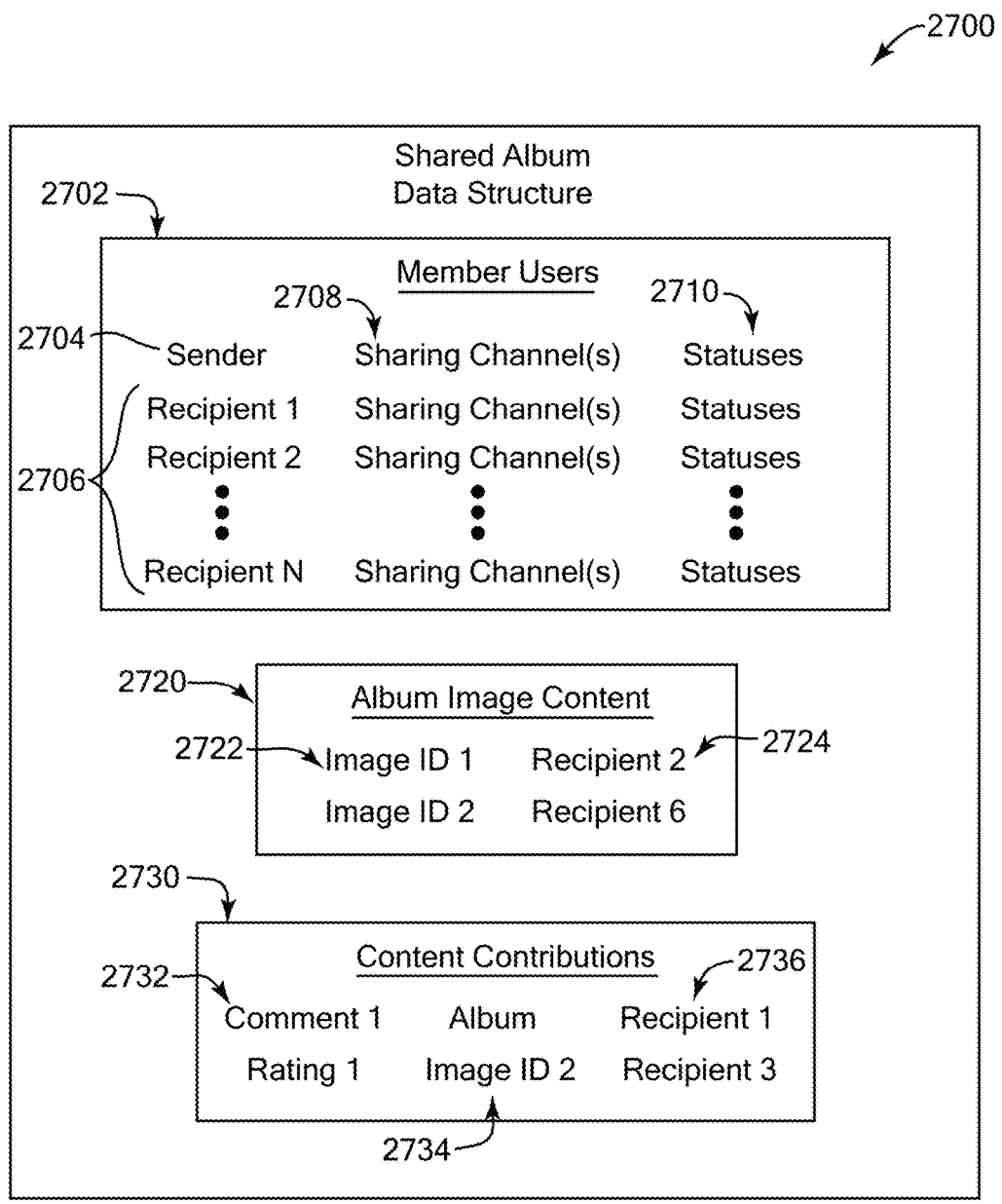
FIG. 27 is a diagrammatic illustration of an example of a shared album data structure.

FIG. 27 is a diagrammatic illustration of an example of a shared album data structure 2700. Data structure 2700 can be stored in storage accessible to the members users of the shared album, e.g., local storage of a user member's device and/or remote storage available to the device over a communication network, e.g., on one or more servers or client devices. The shared album data structure can alternatively organize and store data in other configurations, in multiple data structures, etc. The shared album 2700 can include additional shared album attributes (not shown), such as album name, time of creation, user access rights, etc.

Shared album data structure 2700 can include data describing member users 2702, indicating which users are members of the shared album implemented by the data structure 2700. The users 2702 include a sender 2704, who may have initially created the shared album and caused the data structure 2700 to be created, and one or more recipients 2706 who have been provided access to the data structure 2700 and who may have contributed content to the shared album data structure 2700. The users can be identified by one or more user names and/or network addresses used in one or more network service accounts, email service, phone message service, etc. In the example shown, each user is associated with one or more sharing channels 2708 indicating the communication channel(s) over which that user can receive sharing messages and access the shared album as described herein, such as user account, email, SMS, image management application, etc. In this example, each user is also associated with one or more statuses 2710 which indicate the current statuses of that user with respect to the shared album. For example, such statuses can include the viewing status of the user indicating whether the user has accessed or viewed the shared album (or the most recent update to the shared album), a comment status indicating that the user has contributed one or more comments to the shared album, a rating status indicating that the user has contributed one or more ratings to the shared album, and an added image status indicating that the user has contributed one or more images to the shared album. Such statuses can be displayed in a viewing interface based on the status information 2710, for example.

Shared album data structure 2700 can include data describing album image content 2720 which identifies the images included in the shared album. For example, image identifications 2722 can be pointers or other references to images stored at specified storage locations in accessible storage, such that the image data (e.g., pixel data, metadata such as timestamp, geographic location coordinates, etc.) of a referenced image is retrieved in response to accessing the image reference. In some implementations, the image data, or portion thereof, of one or more images can be stored in the album content data of the shared album data structure. The album image content 2720 can also identify a user 2724 associated with an identified image, who can be the owner of the image, e.g., the user that contributed the image to the shared album, or a different user having access rights to the image.

Shared album data structure 2700 can include data describing content contributions 2730 which can be, for example, social contributions including comments and ratings from member users of the shared album. For example, the content data 2732 of the content contributions (e.g., text, audio data, image data, etc.) can be stored in the data structure 2700, and/or pointers or other references can be stored in the data structure 2700 which reference the content data that is stored in other accessible storage. A reference 2734 can be associated with particular content data 2732 to indicate whether that content data refers to the shared album in its entirety, or refers to a particular image of the shared album (and indicates that particular image, if applicable). A user identification 2736 can be stored for particular content data 2732 to indicate the member user that contributed that particular content data.

Figure 28:
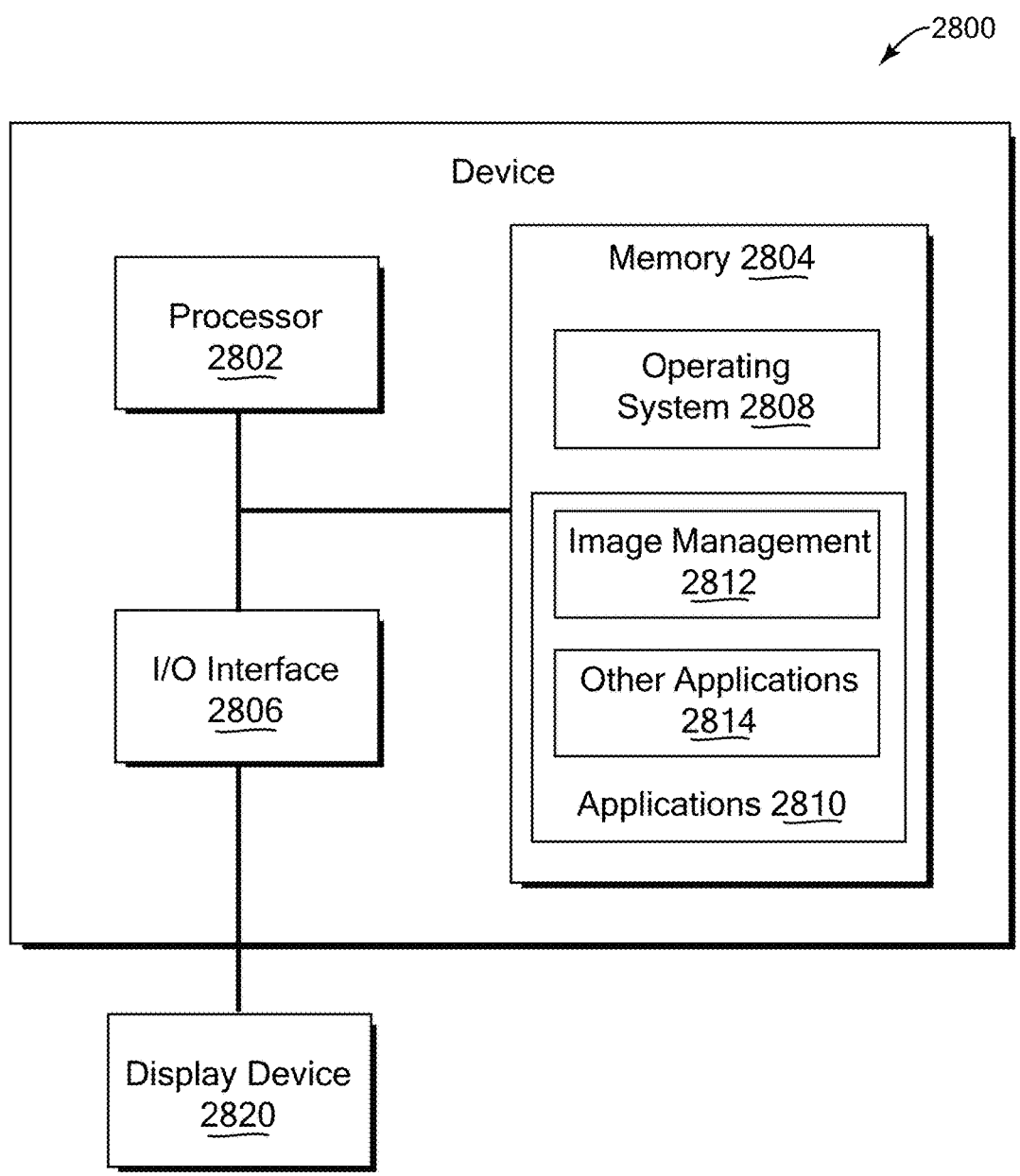
FIG. 28 is a block diagram of an example device which may be used for one or more implementations described herein.

FIG. 28 is a block diagram of an example device 2800 which may be used to implement one or more features described herein. In one example, device 2800 may be used to implement a computer device, e.g., a server device (e.g., server device 104 of FIG. 1), and perform appropriate method implementations described herein. Device 2800 can be any suitable computer system, server, or other electronic or hardware device. For example, the device 2800 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 2800 includes a processor 2802, a memory 2804, and input/output (I/O) interface 2806.

Processor 2802 can be one or more processors and/or processing circuits to execute program code and control basic operations of the device 2800. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 2804 is typically provided in device 2800 for access by the processor 2802, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 2802 and/or integrated therewith. Memory 2804 can store software operating on the server device 2800 by the processor 2802, including an operating system 2808 and one or more applications 2810, e.g., a graphics editing engine, web hosting engine, social networking engine, etc. In some implementations, applications 2810 can include instructions that enable processor 2802 to perform the functions described herein, e.g., some or all of the methods of FIGS. 2-7.

For example, applications 2810 can include an image management application 2812, which as described herein can provide image viewing, manipulation, sharing, and other functions, e.g., providing displayed user interfaces responsive to user input to display selectable options/controls and images based on selected options. In some implementations, the image management application(s) can include image editing to receive user input, select input images, modify pixels of images (e.g., by applying edit operations to an input image), and provide output data causing display of the images on a display device of the device 2800. Other applications or engines 2814 can also or alternatively be included in applications 2810, e.g., email applications, SMS and other phone communication applications, web browser applications, media display applications, communication applications, web hosting engine or application, social networking engine or application, etc. Any of software in memory 2804 can alternatively be stored on any other suitable storage location or computer-readable medium. In addition, memory 2804 (and/or other connected storage device(s)) can store images, shared album data, sharing models, user data and preferences, and other instructions and data used in the features described herein. Memory 2804 and any other type of storage (magnetic disk, optical disk, magnetic tape, or other tangible media) can be considered "storage" or "storage devices."

I/O interface 2806 can provide functions to enable interfacing the server device 2800 with other systems and devices. For example, network communication devices, storage devices (e.g., memory and/or database 106), and input/output devices can communicate via interface 2806. In some implementations, the I/O interface can connect to interface devices including input devices (keyboard, pointing device, touchscreen, microphone, camera, scanner, etc.) and/or output devices (display device, speaker devices, printer, motor, etc.). Display device 2820 is one example of an output device that can be used to display content, e.g., one or more images provided in an image sharing interface or other application as described herein. Display device 2820 can be connected to device 2800 via local connections (e.g., display bus) and/or via networked connections and can be any suitable display device, some examples of which are described below.

For ease of illustration, FIG. 28 shows one block for each of processor 2802, memory 2804, I/O interface 2806, and software blocks 2808 and 2810. These blocks may represent one or more processors or processing circuitries, operating systems, memories, I/O interfaces, applications, and/or software modules. In other implementations, device 2800 may not have all of the components shown and/or may have other elements including other types of elements instead of, or in addition to, those shown herein. While server system 102 is described as performing operations as described in some implementations herein, any suitable component or combination of components of system 102 or similar system, or any suitable processor or processors associated with such a system, may perform the operations described.

A client device can also implement and/or be used with features described herein, e.g., client devices 120-126 shown in FIG. 1. Example client devices can be computer devices including some similar components as the device 2800, e.g., processor(s) 2802, memory 2804, and I/O interface 2806. An operating system, software and applications suitable for the client device can be provided in memory and used by the processor, e.g., image management software, client group communication application software, etc. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device 2820, for example, can be connected to (or included in) the device 2800 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., methods 200 and/or 300) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

Implementations discussed herein do not require collection or usage of user personal information. In situations in which certain implementations discussed herein may collect or use personal information about users (e.g., user data, information about a user's social network, user's location and time, user's biometric information, user's activities and demographic information), users are provided with one or more opportunities to control whether the personal information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method to share images over a communication network, the method comprising:
   determining that a shared album data structure representing a shared album is accessible by a device, wherein the shared album data structure includes references to one or more album images included in the shared album;
   in response to determining that the shared album data structure is accessible by the device, determining, by the device, one or more suggested images from a collection of stored images associated with a particular user, wherein determining the one or more suggested images is based on:
      determining sharing scores by the device for the stored images, wherein the sharing scores are based on, at least in part, comparing one or more characteristics of the stored images to one or more corresponding characteristics of the one or more album images;
   causing display of the one or more suggested images by the device;
   receiving a selection of at least one selected image of the one or more suggested images based on user input received by the device from the particular user;
   receiving a plurality of recipient users for the shared album data structure;
   adding the at least one selected image to the shared album by causing an update of the shared album data structure to reference the at least one selected image, such that the at least one selected image is accessible via the shared album data structure over a communication network by the plurality of recipient users;
   determining that a first recipient user of the plurality of recipient users is associated with a first communication channel and a second recipient user of the plurality of recipient users is associated with a second communication channel;
   determining a type of the first communication channel, wherein the type of the first communication channel is a first type of communication channel;
   determining a type of the second communication channel, wherein the type of the second communication channel is a second type of communication channel different from the first type of communication channel;
   in response to determining that the first recipient user is associated with the first type of communication channel, providing in a first message a first link to the shared album data structure and first information having a first information type associated with the first type of communication channel;
   in response to determining that the second recipient user is associated with the second type of communication channel, providing in a second message a second link to the shared album data structure and second information having a second information type associated with the second type of communication channel, the second information type different than the first information type;
   receiving a share command applicable to the shared album data structure;
   in response to receiving the share command, causing the first message to be sent to a first recipient device of the first recipient user using the first communication channel; and
   in response to receiving the share command, causing the second message to be sent to a second recipient device of the second recipient user using the second communication channel.

2. The method of claim 1, further comprising:
   determining, by the device, one or more suggested recipient users for the at least one selected image, wherein the one or more suggested recipient users are determined based on recipient scores determined by the device for a plurality of users stored in a contact list associated with the particular user, wherein the recipient scores are based on, at least in part, comparing one or more determined content features of the at least one selected image to one or more content features of images previously shared by the particular user to one or more of the plurality of the users;
   causing display of the one or more suggested recipient users by the device;
   receiving a second selection of at least one selected recipient user of the one or more suggested recipient users,
   wherein the at least one selected recipient user is included in the plurality of recipient users to which the at least one selected image is accessible;
   in response to receiving the second selection of the at least one selected recipient user, determining one or more additional suggested recipient users based on the at least one selected recipient user;
   causing display of the one or more additional suggested recipient users by the device; and
   receiving a third selection of at least one additional selected recipient user of the one or more additional suggested recipient users, wherein the at least one additional selected recipient user is included in the plurality of recipient users to which the at least one selected image is accessible.

3. The method of claim 1, wherein the sharing scores are based on:
   general user sharing data describing historical sharing activities of multiple users, wherein the historical sharing activities include sharing of shared images associated with the multiple users with one or more other users over the communication network, and
   particular user sharing data describing historical sharing activities of the particular user of the device including sharing of shared images associated with the particular user with at least one other user over the communication network,
   wherein the particular user sharing data is weighted higher than the general user sharing data in determining the sharing scores.

4. The method of claim 3, wherein determining the one or more suggested images further includes determining one or more patterns in the historical sharing activities of the multiple users, wherein the one or more patterns include one or more correlations between the historical sharing activities and at least one of:

types of image features depicted in the shared images associated with the multiple users; and types of events depicted in the shared images associated with the multiple users.

5. The method of claim 1 further comprising:

receiving the shared album data structure by the device;

causing display on the device of at least one of the one or more album images of the shared album data structure; and causing display of identifications of the plurality of recipient users, wherein the plurality of recipient users are associated with the shared album.

6. The method of claim 1 wherein the first type of communication channel includes an image management application executing on the device and on the first recipient device, wherein the first link is associated with the image management application, and wherein the first information includes notification data usable by the image management application to cause a notification to be output on the first recipient device.

7. The method of claim 6 wherein the second type of communication channel includes a network account of the second recipient user and the image management application is not executing on the second recipient device, wherein the second link is configured to cause a web page to be displayed on the second recipient device in response to user input selecting the second link, and wherein the second information includes one or more pointers to one or more stored preview images corresponding to at least one of the one or more album images in the shared album, wherein the one or more stored preview images are accessible via the one or more pointers by the second recipient device.

8. The method of claim 1 wherein the first type of communication channel includes an email communication channel, wherein the first link includes a web link configured to cause a web page to be displayed on the first recipient device in response to user input selecting the web link, and wherein the second information includes one or more pointers to one or more stored preview images corresponding to at least one of the one or more album images in the shared album, wherein the one or more stored preview images are accessible via the one or more pointers by the first recipient device.

9. The method of claim 8 wherein the second type of communication channel includes an image management application executing on the device and on the second recipient device, wherein the second link is associated with the image management application, and wherein the second information includes notification data usable by the image management application to cause a notification to be output on the second recipient device.

10. The method of claim 1 wherein the first type of communication channel includes an SMS communication channel, and wherein the first link includes a web link configured to cause a web page to be displayed on the first recipient device in response to user input selecting the web link.

11. The method of claim 1 wherein the first type of communication channel includes an email communication channel, wherein the first information includes one or more pointers to one or more stored preview images corresponding to at least one of the one or more album images of the shared album, wherein the second type of communication channel includes a Short Message Service (SMS) communication channel, wherein the second message excludes at least one of the one or more pointers to the one or more stored preview images.

12. The method of claim 1 wherein the first link includes a web link to a shared album web page including the one or more album images included in the shared album, wherein the web link is a unique link that is different from links sent to other recipient users of the plurality of recipient users.

13. A device comprising:

a display;

a storage device; and at least one processor operative to access the storage device and the display and configured to:

determine one or more suggested images from a collection of stored images associated with a user of the device based on the at least one processor determining sharing scores for the stored images, wherein the sharing scores are based on, at least in part, comparing one or more characteristics of the one or more suggested images to one or more corresponding characteristics of one or more album images included in a shared album implemented as a shared album data structure in storage;

cause the one or more suggested images to be displayed by the display;

receive at least one selected image of the one or more suggested images selected by user input received by the device from the user; and cause an update of the shared album data structure to include the at least one selected image, wherein the at least one selected image is accessible via the shared album data structure over a communication network by one or more member users of the shared album data structure;

receive a sharing message over a communication network identifying the shared album; and in response to receiving the sharing message, cause at least one of the one or more album images to be displayed in a shared album viewing interface on the display, wherein:

the at least one processor is configured to determine a type of communication channel over which the sharing message is received;

in response to determining that the type of communication channel over which the sharing message is received is a first type of communication channel, the at least one processor is configured to cause one or more user interface controls to be provided in the shared album viewing interface that enable a user of the device to perform one or more shared album functions including at least one of:

adding user images to the shared album using the shared album viewing interface, downloading of the album images to the device using the shared album viewing interface, or inviting, using the shared album viewing interface, one or more other users to at least one of: view or join the shared album; and in response to determining that the type of communication channel over which the sharing message is received is a second type of communication channel that is different than the first type of communication channel, the at least one processor is configured to cause the shared album viewing interface to exclude the one or more user interface controls.

14. The device recited in claim 13 wherein, in response to the sharing message being received while the device is running an image management application, the shared album viewing interface is displayed by the image management application, and wherein the at least one processor is further configured to cause one or more content contribution controls to be displayed in the shared album viewing interface, the one or more content contribution controls selectable by user input to enable one or more content contributions designated by a user to be added to the shared album.

15. The device recited in claim 13 wherein the second type of communication channel is one of: an email communication channel and or a Short Message Service (SMS) communication channel.

16. The device recited in claim 13, wherein the one or more shared album functions include adding content contribution data to the shared album,
wherein the content contribution data includes at least one of: comments and ratings, wherein the comments and the ratings are associated with at least one of the one or more album images, wherein the content contribution data is displayed in the shared album viewing interface.

17. A non-transitory computer readable medium having stored thereon software instructions that, when executed by at least one processor, cause the at least one processor to perform operations including:
creating an album data structure including an identification of one or more album images, wherein the album data structure is accessible by a device;
determining one or more suggested images from a collection of stored images associated with a particular user, wherein determining the one or more suggested images is based on determining sharing scores for the stored images, wherein the sharing scores are based on, at least in part, comparing one or more characteristics of the stored images to one or more corresponding characteristics of the one or more album images;
causing the one or more suggested images to be displayed by the device;
receiving at least one selected image of the one or more suggested images selected by user input received by the device from the particular user;
causing an update of the album data structure to reference the at least one selected image;
receiving a set of recipient users for the album data structure;
adding the set of recipient users to the album data structure such that the at least one selected image is accessible via the album data structure over a communication network by the set of recipient users;
determining that a first recipient user of the set of recipient users is associated with a first communication channel and a second recipient user of the set of recipient users is associated with a second communication channel;
determining a type of the first communication channel, wherein the type of the first communication channel is a first type of communication channel;
determining a type of the second communication channel, wherein the type of the second communication channel is a second type of communication channel different from the first type of communication channel;
in response to determining that the first recipient user is associated with the first type of communication channel and that the type of the first communication channel is the first type of communication channel, providing in a first message a first link to the album data structure and a first type of information associated with the first type of communication channel;
in response to determining that the second recipient user is associated with the second type of communication channel and that the type of the second communication channel is the second type of communication channel, providing in a second message a second link to the album data structure and a second type of information associated with the second type of communication channel, the second type of information different than the first type of information;
receiving a share command applicable to the album data structure;
in response to receiving the share command, causing the first message to be sent to a first recipient device of the first recipient user using the first communication channel; and
in response to receiving the share command, causing the second message to be sent to a second recipient device of the second recipient user using the second communication channel.

18. The non-transitory computer readable medium of claim 17 wherein the first type of information associated with the first type of communication channel includes notification data to be displayed in a notification by the first recipient device of the first recipient user, the notification indicating that the album data structure is updated, and
wherein the second type of information associated with the second type of communication channel includes one or more preview images corresponding to at least one of the one or more album images.

* * * * *